United States Patent
Kuwata

(10) Patent No.: US 6,760,489 B1
(45) Date of Patent: Jul. 6, 2004

(54) APPARATUS AND METHOD FOR IMAGE DATA INTERPOLATION AND MEDIUM ON WHICH IMAGE DATA INTERPOLATION PROGRAM IS RECORDED

(75) Inventor: Naoki Kuwata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/280,704

(22) Filed: Mar. 30, 1999

(30) Foreign Application Priority Data

| Apr. 6, 1998 | (JP) | 10-093739 |
| Apr. 6, 1998 | (JP) | 10-093741 |
| Apr. 6, 1998 | (JP) | 10-093742 |
| Apr. 6, 1998 | (JP) | 10-093743 |

(51) Int. Cl.[7] .......................... H04N 1/393; G06K 9/32
(52) U.S. Cl. .................. 382/300; 358/448; 358/443; 358/451
(58) Field of Search ...................... 358/443, 448, 358/451, 464, 522, 525, 521, 465, 466; 382/300, 209, 168, 170, 176, 155

(56) References Cited

U.S. PATENT DOCUMENTS

| 5,008,752 | A | | 4/1991 | Van Nostrand | 348/581 |
| 5,048,105 | A | | 9/1991 | Adachi | 382/300 |
| 5,754,710 | A | * | 5/1998 | Sekine et al. | 382/300 |
| 6,195,459 | B1 | | 2/2001 | Zhu | 382/176 |
| 6,263,120 | B1 | * | 7/2001 | Matsuoka | 382/300 |

FOREIGN PATENT DOCUMENTS

| EP | 0 244 141 A2 | 11/1987 | G06F/15/62 |
| EP | 0 724 22 A | 7/1996 | |
| EP | 0 785 529 A1 | 7/1997 | G06T/3/40 |
| JP | 58-27146 | 2/1983 | G03F/1/00 |
| JP | 60-63589 | 4/1985 | G09G/1/06 |
| JP | 63-67078 | 3/1988 | H04N/1/40 |
| JP | 63-311865 | 12/1988 | H04N/1/387 |
| JP | 64-67074 | 3/1989 | H04N/1/40 |
| JP | 1-126078 | 5/1989 | H04N/1/46 |
| JP | 1-290373 | 11/1989 | H04N/1/387 |
| JP | 2-9268 | 1/1990 | H04N/1/387 |
| JP | 2-155760 | 6/1990 | B41J/2/44 |
| JP | 2-278478 | 11/1990 | G06F/6/00 |
| JP | 2-308378 | 12/1990 | G06F/15/66 |
| JP | 4-33071 | 2/1992 | G06F/15/70 |
| JP | 4-81981 | 3/1992 | G06F/15/66 |
| JP | 4-81982 | 3/1992 | G06F/15/66 |
| JP | 4-288773 | 10/1992 | H04N/1/40 |
| JP | 5-22578 | 1/1993 | H04N/1/387 |

(List continued on next page.)

OTHER PUBLICATIONS

Mr. Hitoshi Kiya, "Resolution Conversion and Enlargement of Digital Images", Apr. 1998, pp. 194–202.
Adobe Photoshop 4.0J pp. 45–49.
Patent Abstracts of Japan vol. 1997, No. 12, Dec. 25, 1997 & JP 09 212677 A (Canon Inc.) Aug. 15, 1997.

Primary Examiner—Cheukfan Lee
(74) Attorney, Agent, or Firm—Sughrue Mion, PLLC

(57) ABSTRACT

An image data interpolation apparatus includes an image data obtaining unit for obtaining image data representing an image as dot-matrix picture elements, a picture element interpolating unit capable of selectively executing one of a plurality of interpolating processes when the image data is interpolated so that the number of constituent picture elements thereof is increased, a feature amount obtaining unit for obtaining a feature amount concerning the image data with respect to the selected interpolating process, and an interpolating process selecting unit for selecting one of the interpolating processes capable of obtaining an optimum result of interpolation according to the feature amount obtained by the feature amount obtaining unit and causing the picture element interpolating unit to execute the selected interpolating process.

34 Claims, 50 Drawing Sheets

FOREIGN PATENT DOCUMENTS

| | | | | |
|---|---|---|---|---|
| JP | 5-46756 | 2/1993 | ........... | G06F/15/66 |
| JP | 5-81421 | 4/1993 | ........... | G06F/15/66 |
| JP | 5-84969 | 4/1993 | ............. | B41J/2/44 |
| JP | 05-087738 A | 4/1993 | | |
| JP | 5-130398 | 5/1993 | ............ | H04N/1/40 |
| JP | 5-189562 | 7/1993 | ............ | G06F/15/70 |
| JP | 5-225323 | 9/1993 | ............ | G06F/15/66 |
| JP | 5-300375 | 11/1993 | ............ | H04N/1/40 |
| JP | 6-150059 | 5/1994 | ............. | G06K/9/20 |
| JP | 6-225140 | 8/1994 | ............ | H04N/1/40 |
| JP | 7-50752 | 2/1995 | ........... | H04N/1/387 |
| JP | 7-73308 | 3/1995 | ............. | G06T/5/00 |
| JP | 7-93531 | 4/1995 | ............. | G06T/3/40 |
| JP | 7-107268 | 4/1995 | ........... | H04N/1/387 |
| JP | 7-107273 | 4/1995 | ........... | H04N/1/393 |
| JP | 7-131634 | 5/1995 | ........... | H04N/1/387 |
| JP | 8-305843 | 11/1996 | ............. | G06T/3/40 |
| JP | 9-27901 | 1/1997 | ........... | H04N/1/393 |
| JP | 9-50515 | 2/1997 | ............. | G06T/3/40 |
| JP | 9-50519 | 2/1997 | ............. | G06T/5/00 |
| JP | 9-51428 | 2/1997 | ........... | H04N/1/393 |
| JP | 9-93426 | 4/1997 | ........... | H04N/1/393 |
| JP | 9-130597 | 5/1997 | ........... | H04N/1/393 |
| JP | 9-252400 | 9/1997 | ........... | H04N/1/393 |
| JP | 9-252401 | 9/1997 | ........... | H04N/1/393 |
| JP | 9-321981 | 12/1997 | ........... | H04N/1/393 |
| JP | 10-20422 | 1/1998 | ........... | G03B/42/02 |
| JP | 10-20847 | 1/1998 | ............. | G09G/5/36 |
| WO | 96/16380 | 5/1996 | ............. | G06T/3/40 |

\* cited by examiner

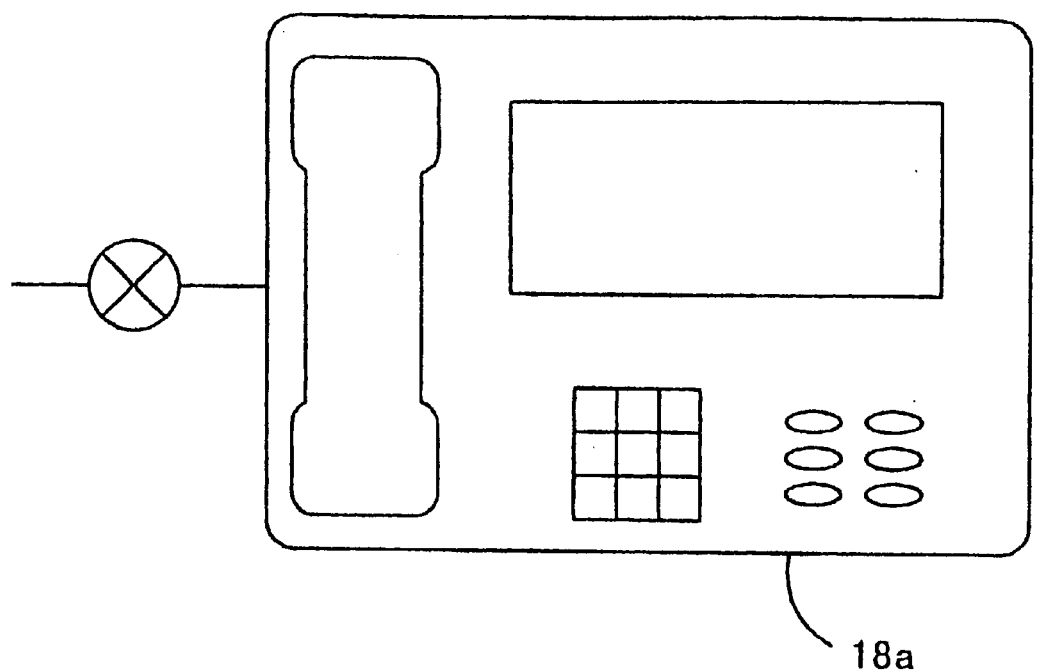
F I G. 5
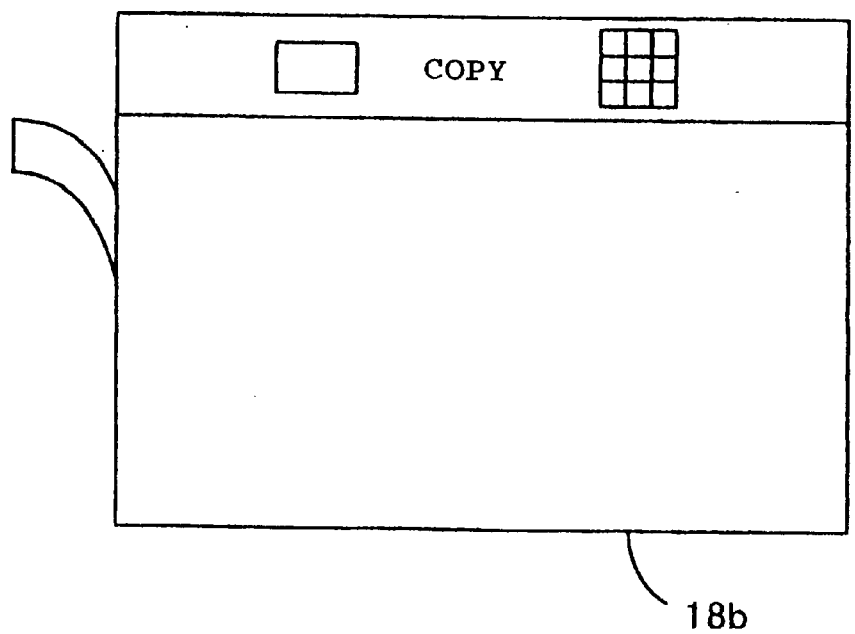
F I G. 6

PICTURE ELEMENT NUMBER
DISTRIBUTION

◯ EXISTING PICTURE ELEMENT

○ EXISTING PICTURE ELEMENT
□ INTERPOLATED PICTURE ELEMENT

| PICTURE ELEMENT | ORIGINAL | x1 | x2 | x3 | x4 | f1 | f2 | f3 | f4 | CUBIC |
|---|---|---|---|---|---|---|---|---|---|---|
| P0 | 64 | | | | | | | | | |
| | 64 | | | | | | | | | |
| | 64 | | | | | | | | | |
| | 64 | | | | | | | | | |
| P1 | 64 | 1 | 0 | 1 | 2 | 0 | 1 | 0 | 0 | 64 |
| P11 | | 1.25 | 0.25 | 0.75 | 1.75 | −0.14063 | 0.890625 | 0.296875 | −0.04688 | 64 |
| P12 | | 1.5 | 0.5 | 0.5 | 1.5 | −0.125 | 0.625 | 0.625 | −0.125 | 64 |
| P13 | | 1.75 | 0.75 | 0.25 | 1.25 | −0.04688 | 0.296875 | 0.890625 | −0.14063 | 64 |
| P2 | 64 | 1 | 0 | 1 | 2 | 0 | 1 | 0 | 0 | 64 |
| P21 | | 1.25 | 0.25 | 0.75 | 1.75 | −0.14063 | 0.890625 | 0.296875 | −0.04688 | 61 |
| P22 | | 1.5 | 0.5 | 0.5 | 1.5 | −0.125 | 0.625 | 0.625 | −0.125 | 56 |
| P23 | | 1.75 | 0.75 | 0.25 | 1.25 | −0.04688 | 0.296875 | 0.890625 | −0.14063 | 55 |
| P3 | 64 | 1 | 0 | 1 | 2 | 0 | 1 | 0 | 0 | 64 |
| P31 | 80 | 1.25 | 0.25 | 0.75 | 1.75 | −0.14063 | 0.890625 | 0.296875 | −0.04688 | 77 |
| P32 | 96 | 1.5 | 0.5 | 0.5 | 1.5 | −0.125 | 0.625 | 0.625 | −0.125 | 88 |
| P33 | 112 | 1.75 | 0.75 | 0.25 | 1.25 | −0.04688 | 0.296875 | 0.890625 | −0.14063 | 103 |
| P4 | 128 | 1 | 0 | 1 | 2 | 0 | 1 | 0 | 0 | 128 |
| P41 | 144 | 1.25 | 0.25 | 0.75 | 1.75 | −0.14063 | 0.890625 | 0.296875 | −0.04688 | 153 |
| P42 | 160 | 1.5 | 0.5 | 0.5 | 1.5 | −0.125 | 0.625 | 0.625 | −0.125 | 168 |
| P43 | 176 | 1.75 | 0.75 | 0.25 | 1.25 | −0.04688 | 0.296875 | 0.890625 | −0.14063 | 179 |
| P5 | 192 | 1 | 0 | 1 | 2 | 0 | 1 | 0 | 0 | 192 |
| P51 | 192 | 1.25 | 0.25 | 0.75 | 1.75 | −0.14063 | 0.890625 | 0.296875 | −0.04688 | 201 |
| P52 | 192 | 1.5 | 0.5 | 0.5 | 1.5 | −0.125 | 0.625 | 0.625 | −0.125 | 200 |
| P53 | 192 | 1.75 | 0.75 | 0.25 | 1.25 | −0.04688 | 0.296875 | 0.890625 | −0.14063 | 195 |
| P6 | 192 | 1 | 0 | 1 | 2 | 0 | 1 | 0 | 0 | 192 |
| P61 | | 1.25 | 0.25 | 0.75 | 1.75 | −0.14063 | 0.890625 | 0.296875 | −0.04688 | 192 |
| P62 | | 1.5 | 0.5 | 0.5 | 1.5 | −0.125 | 0.625 | 0.625 | −0.125 | 192 |
| P63 | | 1.75 | 0.75 | 0.25 | 1.25 | −0.04688 | 0.296875 | 0.890625 | −0.14063 | 192 |
| P7 | 192 | 1 | 0 | 1 | 2 | 0 | 1 | 0 | 0 | 192 |
| P71 | | 1.25 | 0.25 | 0.75 | 1.75 | −0.14063 | 0.890625 | 0.296875 | −0.04688 | 192 |
| P72 | | 1.5 | 0.5 | 0.5 | 1.5 | −0.125 | 0.625 | 0.625 | −0.125 | 192 |
| P73 | | 1.75 | 0.75 | 0.25 | 1.25 | −0.04688 | 0.296875 | 0.890625 | −0.14063 | 192 |
| P8 | 192 | 1 | 0 | 1 | 2 | 0 | 1 | 0 | 0 | 192 |
| P81 | | 1.25 | 0.25 | 0.75 | 1.75 | −0.14063 | 0.890625 | 0.296875 | −0.04688 | 192 |
| P82 | | 1.5 | 0.5 | 0.5 | 1.5 | −0.125 | 0.625 | 0.625 | −0.125 | 192 |
| P83 | | 1.75 | 0.75 | 0.25 | 1.25 | −0.04688 | 0.296875 | 0.890625 | −0.14063 | 192 |
| P9 | 192 | 1 | 0 | 1 | 2 | 0 | 1 | 0 | 0 | |

FIG. 26

| | PICTURE ELEMENT | ORIGINAL | x1 | x2 | x3 | x4 | f1 | f2 | f3 | f4 | HYBRID BICUBIC |
|---|---|---|---|---|---|---|---|---|---|---|---|
| 64 | P0 | 64 | | | | | | | | | |
| 64 | | | | | | | | | | | |
| 64 | | | | | | | | | | | |
| 64 | | | | | | | | | | | |
| 64 | P1 | 64 | 1 | 0 | 1 | 2 | 0.00 | 1.00 | 0.00 | 0.00 | 64 |
| 64 | P11 | | 1.25 | 0.25 | 0.75 | 1.75 | -0.20 | 0.95 | 0.36 | -0.11 | 64 |
| 64 | P12 | | 1.5 | 0.5 | 0.5 | 1.5 | -0.21 | 0.71 | 0.71 | -0.21 | 64 |
| 64 | P13 | | 1.75 | 0.75 | 0.25 | 1.25 | -0.11 | 0.36 | 0.95 | -0.20 | 64 |
| 64 | P2 | 64 | 1 | 0 | 1 | 2 | 0.00 | 1.00 | 0.00 | 0.00 | 64 |
| 64 | P21 | | 1.25 | 0.25 | 0.75 | 1.75 | -0.20 | 0.95 | 0.36 | -0.11 | 57 |
| 64 | P22 | | 1.5 | 0.5 | 0.5 | 1.5 | -0.21 | 0.71 | 0.71 | -0.21 | 50 |
| 64 | P23 | | 1.75 | 0.75 | 0.25 | 1.25 | -0.11 | 0.36 | 0.95 | -0.20 | 51 |
| 64 | P3 | 64 | 1 | 0 | 1 | 2 | 0.00 | 1.00 | 0.00 | 0.00 | 64 |
| 80 | P31 | | 1.25 | 0.25 | 0.75 | 1.75 | -0.20 | 0.95 | 0.36 | -0.11 | 73 |
| 96 | P32 | | 1.5 | 0.5 | 0.5 | 1.5 | -0.21 | 0.71 | 0.71 | -0.21 | 82 |
| 112 | P33 | | 1.75 | 0.75 | 0.25 | 1.25 | -0.11 | 0.36 | 0.95 | -0.20 | 99 |
| 128 | P4 | 128 | 1 | 0 | 1 | 2 | 0.00 | 1.00 | 0.00 | 0.00 | 128 |
| 144 | P41 | | 1.25 | 0.25 | 0.75 | 1.75 | -0.20 | 0.95 | 0.36 | -0.11 | 157 |
| 160 | P42 | | 1.5 | 0.5 | 0.5 | 1.5 | -0.21 | 0.71 | 0.71 | -0.21 | 174 |
| 176 | P43 | | 1.75 | 0.75 | 0.25 | 1.25 | -0.11 | 0.36 | 0.95 | -0.20 | 183 |
| 192 | P5 | 192 | 1 | 0 | 1 | 2 | 0.00 | 1.00 | 0.00 | 0.00 | 192 |
| 192 | P51 | | 1.25 | 0.25 | 0.75 | 1.75 | -0.20 | 0.95 | 0.36 | -0.11 | 205 |
| 192 | P52 | | 1.5 | 0.5 | 0.5 | 1.5 | -0.21 | 0.71 | 0.71 | -0.21 | 206 |
| 192 | P53 | | 1.75 | 0.75 | 0.25 | 1.25 | -0.11 | 0.36 | 0.95 | -0.20 | 199 |
| 192 | P6 | 192 | 1 | 0 | 1 | 2 | 0.00 | 1.00 | 0.00 | 0.00 | 192 |
| 192 | P61 | | 1.25 | 0.25 | 0.75 | 1.75 | -0.20 | 0.95 | 0.36 | -0.11 | 192 |
| 192 | P62 | | 1.5 | 0.5 | 0.5 | 1.5 | -0.21 | 0.71 | 0.71 | -0.21 | 192 |
| 192 | P63 | | 1.75 | 0.75 | 0.25 | 1.25 | -0.11 | 0.36 | 0.95 | -0.20 | 192 |
| 192 | P7 | 192 | 1 | 0 | 1 | 2 | 0.00 | 1.00 | 0.00 | 0.00 | 192 |
| 192 | P71 | | 1.25 | 0.25 | 0.75 | 1.75 | -0.20 | 0.95 | 0.36 | -0.11 | 192 |
| 192 | P72 | | 1.5 | 0.5 | 0.5 | 1.5 | -0.21 | 0.71 | 0.71 | -0.21 | 192 |
| 192 | P73 | | 1.75 | 0.75 | 0.25 | 1.25 | -0.11 | 0.36 | 0.95 | -0.20 | 192 |
| 192 | P8 | 192 | 1 | 0 | 1 | 2 | 0.00 | 1.00 | 0.00 | 0.00 | 192 |
| 192 | P81 | | 1.25 | 0.25 | 0.75 | 1.75 | -0.20 | 0.95 | 0.36 | -0.11 | 192 |
| 192 | P82 | | 1.5 | 0.5 | 0.5 | 1.5 | -0.21 | 0.71 | 0.71 | -0.21 | 192 |
| 192 | P83 | | 1.75 | 0.75 | 0.25 | 1.25 | -0.11 | 0.36 | 0.95 | -0.20 | 192 |
| 192 | P9 | 192 | 1 | 0 | 1 | 2 | 0.00 | 1.00 | 0.00 | 0.00 | |

|  | −1 |  |
|---|---|---|
| −1 | 4 | −1 |
|  | −1 |  | th=32

FIG. 33B

| 100 | 100 | 100 |
|---|---|---|
| 100 | 100 | 70 |
| 100 | 70 | 60 |

|    |    |    |
|----|----|----|
| −1 | −1 | −1 |
| −1 | 8  | −1 |
| −1 | −1 | −1 | th=64

FIG. 34B

|     |     |     |
|-----|-----|-----|
| 100 | 100 | 100 |
| 100 | 100 | 70  |
| 100 | 100 | 60  |

FIG. 34C    100×8+100×(−1)+100×(−1)+100×(−1)+100×(−1)
+70×(−1)+100×(−1)+70×(−1)+60×(−1)=100

IF E<-TH OR E>TH, THEN EDGE PICTURE ELEMENT

TO 3X3 PICTURE ELEMENT WITH NOTED
PICTURE ELEMENT (SHADED PORTION)
AS CENTER
FLAG=1 IF ONLY ONE EDGE PICTURE
ELEMENT EXISTS AND OTHERWISE, FLAG=0

EDGE AMOUNT E th=32

FIG. 37A

| | x=0 | 1 | 2 | 3 | 4 |
|---|---|---|---|---|---|
| y=0 | 40 | 20 | 20 | 18 | 38 |
| 1 | 12 | 38 | 39 | 8 | 10 |
| 2 | 20 | 16 | 8 | 4 | 2 |
| 3 | 0 | 10 | 10 | 14 | 14 |

FLAG

FIG. 37B

| | x=0 | 1 | 2 | 3 | 4 |
|---|---|---|---|---|---|
| y=0 | 1 | 1 | 1 | 1 | 1 |
| 1 | 1 | 1 | 1 | 1 | 1 |
| 2 | 1 | 1 | 1 | 1 | 0 |
| 3 | 0 | 0 | 0 | 0 | 0 |

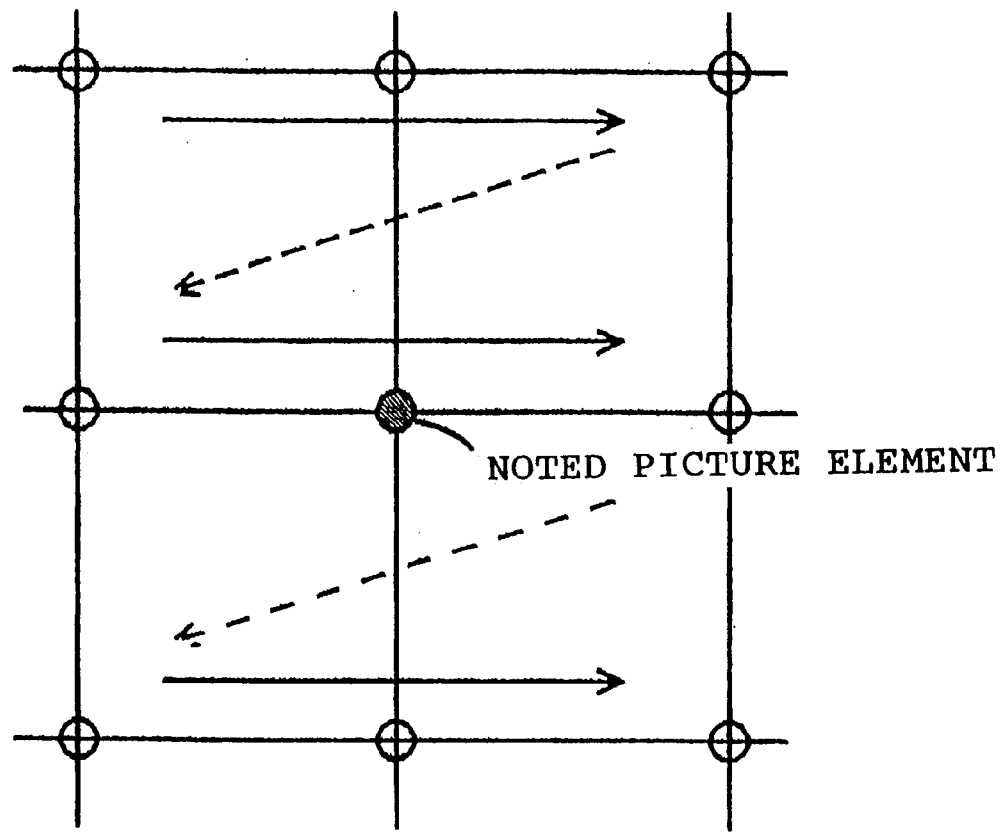
F I G. 39

○ EXISTING PICTURE ELEMENT

/// CORRESPONDING REGION

RELATION BETWEEN REGION
AND TYPICAL PICTURE ELEMENT

◯ EXISTING PICTURE ELEMENT

☐ INTERPOLATED PICTURE ELEMENT

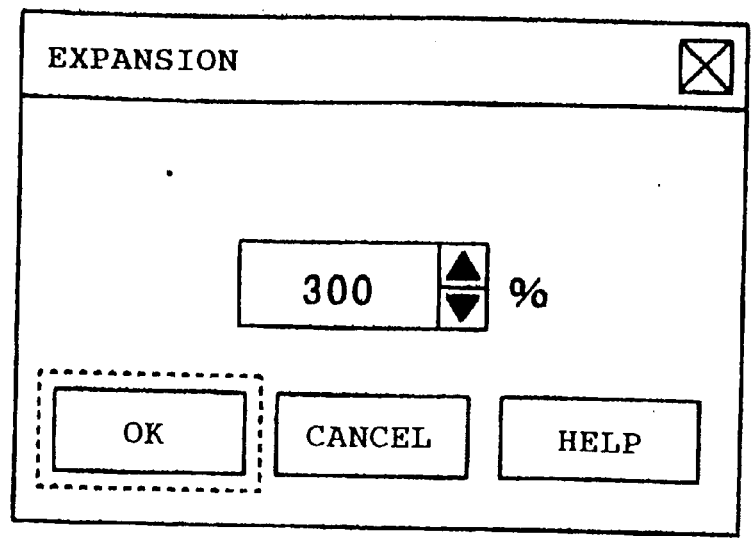
F I G. 5 6
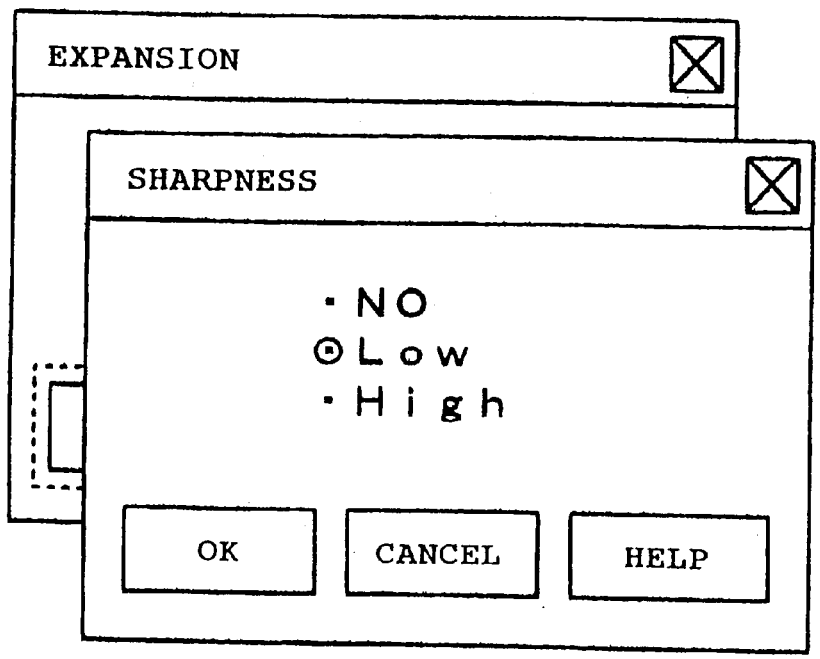
F I G. 5 7

APPARATUS AND METHOD FOR IMAGE DATA INTERPOLATION AND MEDIUM ON WHICH IMAGE DATA INTERPOLATION PROGRAM IS RECORDED

BACKGROUND OF THE INVENTION

1. Field of the Invention

This invention relates to an apparatus and a method for interpolating image data comprising dot matrix picture elements by a predetermined scale factor and a medium on which an image data interpolation program is recorded.

2. Description of the Prior Art

An image is represented as dot matrix picture elements when treated in a computer, and each picture element is represented by a gradation value. For example, a photograph and computer graphics are sometimes displayed on a screen of the computer by 640-dot picture elements in the horizontal direction and 480-dot picture elements in the vertical direction.

On the other hand, color printers have recently been improved in their performances rapidly and now have a high accurate dot density, for example, 720 dot/inch (dpi). When an original image composed of 640×480 dots is printed so that a printed image corresponds to the original one in the dots, the printed image becomes smaller than the original one. In this case, images to be printed have various gradation values, and the color printers have different resolutions. Accordingly, the original image data is required to be interpolated between dots before converted to printing image data.

The prior art has provided, as techniques for interpolating the dots, a nearest neighbor interpolation method (hereinafter, "nearest method") and a cubic convolution interpolation method (hereinafter, "cubic method"). Further, publication No. 6-225140 of a Japanese patent application discloses a technique for providing dot patterns so that an edge takes such an enlarged form as to be smoothed when edge smoothing is performed after dots have been interpolated.

The aforesaid interpolation techniques have the following problems. The nearest and cubic methods have their respective advantages and disadvantages. It is difficult for users to select either method in view of the relation between the interpolation technique and an interpolating scale factor. Further, when either method is selected and applied to an image unsuitable therefor, there is a possibility of a reduction in the quality of interpolation.

In the invention disclosed in the above-mentioned publication No. 6-225140, an interpolating scale factor is inevitably fixed since the dot patterns are previously provided. Accordingly, the interpolation cannot be applied to a case of any scale factor. Further, when color images are interpolated, the number of dot patterns to be previously provided becomes enormous and accordingly cannot previously be prepared.

SUMMARY OF THE INVENTION

Therefore, an object of the present invention is to provide an image data interpolation apparatus and method wherein image data including color image data can efficiently be interpolated, and a medium on which such an image data interpolation program is recorded.

The present invention provides an image data interpolation apparatus comprising an image data obtaining unit for obtaining image data representing an image as dot-matrix picture elements, a picture element interpolating unit capable of selectively executing one of a plurality of interpolating processes when the image data is interpolated so that the number of constituent picture elements thereof is increased, a feature amount obtaining unit for obtaining a feature amount concerning the image data with respect to the selected interpolating process, and an interpolating process selecting unit for selecting one of the interpolating processes capable of obtaining an optimum result of interpolation according to the feature amount obtained by the feature amount obtaining unit and causing the picture element interpolating unit to execute the selected interpolating process.

In the invention thus constituted, the picture element interpolating unit is capable of selecting and executing one of the plurality of interpolating processes when interpolation is to be executed so that the number of constituent picture elements of the image data representing the image as dot-matrix picture elements is increased. When the image data obtaining unit obtains image data to be interpolated, the feature amount obtaining unit obtains a feature amount concerning the image data with respect to the selected interpolating process. The interpolating process selecting unit selects one of the interpolating processes capable of obtaining an optimum result of interpolation according to the feature amount obtained by the feature amount obtaining unit and causing the picture element interpolating unit to execute the selected interpolating process. Thus, the image data interpolation apparatus obtains the feature amount of the image and selects an optimum interpolating process by itself.

The technique for selecting an optimum interpolating process according to a feature of the image should not be limited to a substantial apparatus. It can easily be understood that the technique is functioned as a method. Accordingly, the invention also provides an image data interpolation method comprising the steps of obtaining image data representing an image as dot-matrix picture elements, obtaining a related feature amount when an interpolating process is executed for the image data, selecting an interpolating process capable of achieving an optimum result of interpolation according to the obtained feature amount, and processing the image data by the selected interpolating process. Thus, it is sure that the technique is not limited to a substantial device but is effective as a method.

The aforesaid image data interpolation apparatus may exist independently or may be incorporated into equipment. In other words, the scope of the present invention covers various forms of implementation. Further, the device may be implemented by hardware or software.

When the apparatus is implemented by software, the invention applies equally to a medium on which the software is recorded. As one example, the invention further provides a medium on which an image data interpolation program is recorded, the program causing a computer to execute an interpolating process so that the number of constituent picture elements is increased by a predetermined interpolating scale factor for image data representing an image as dot-matrix picture elements in the computer, the program executing an image obtaining step of obtaining the image data, a feature amount obtaining step of obtaining a related feature amount when an interpolating process is executed for the image data, and an interpolating process selecting step of selecting an interpolating process capable of achieving an optimum result of interpolation according to the obtained feature amount and causing the picture element interpolating step to execute the selected interpolating process.

The recording medium may be a magnetic recording medium, a photo-electromagnetic recording medium, any type of recording medium which will be developed in the feature. Further, it can be understood that the medium may be a first or second copy and that a telecommunication line may also be used to supply the program. Further, there is no difference as regards the concept of the invention even if one part is software and another part is hardware, or when it is in such a form that one part is stored on a recording medium which can be read when necessary.

Accordingly, the invention can provide an image data interpolation apparatus and method both of which can readily achieve an optimum result of interpolation since an interpolating process according to the feature of the image is executed, and a medium on which such an image data interpolation program from which the optimum result of interpolation can also be achieved is recorded.

BRIEF DESCRIPTION OF THE DRAWINGS

Other objects, features and advantages of the present invention will become clear upon reviewing the following description of the preferred embodiments made with reference to the accompanying drawings, in which:

FIG. 5 is a schematic block diagram of further another application example of the image data interpolation apparatus;

FIG. 6 is a schematic block diagram of further another application example of the image data interpolation apparatus;

FIG. 26 is a table showing an application example of the cubic method;

FIG. 27 is a table showing an application example of the hybrid bicubic method;

FIGS. 30A and 30B schematically illustrate an interpolating process with an integer scale factor;

FIGS. 33A to 33C illustrate an example of an edge detecting filter;

FIGS. 34A to 34C illustrate another example of the edge detecting filter;

FIGS. 37A and 37B illustrate an edge amount and the setting of a flag;

FIG. 39 illustrates formation of a block on the basis of the noted picture element;

FIG. 56 illustrates a screen designating an expanding process;

FIG. 57 illustrates a screen designating sharpness;

DETAILED DESCRIPTION OF THE PREFERRED EMBODIMENTS

Figure 1:
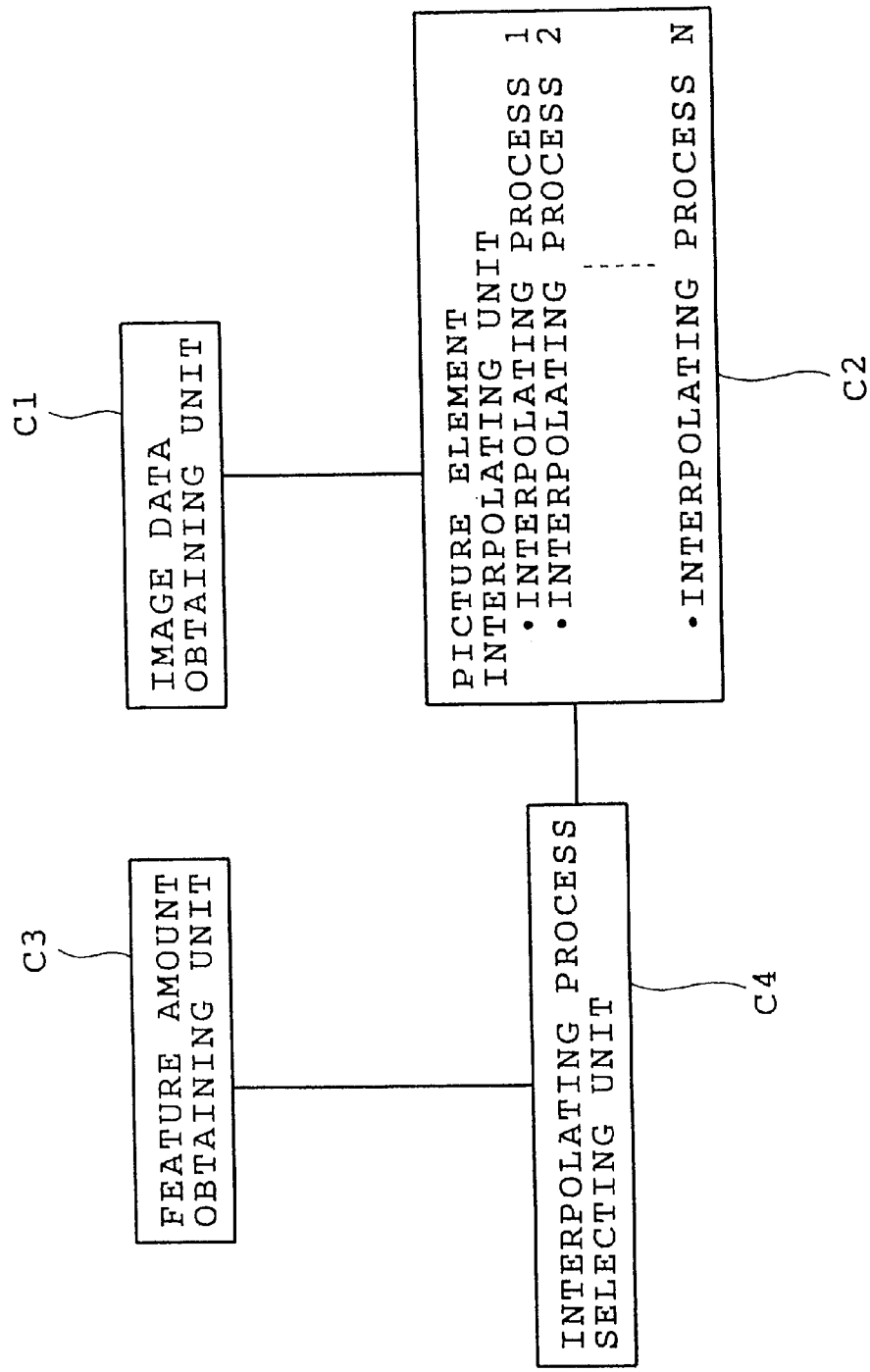
FIG. 1 is a schematic block diagram of an image data interpolation apparatus of one embodiment in accordance with the present invention.

An embodiment of the present invention will be described with reference to the drawings. Referring to FIG. 1, a basic arrangement of an image data interpolation apparatus in accordance with the invention is shown. When a digital processing is premised, an image is represented by dot-matrix picture elements. Image data is composed of number of data each indicative of the picture element. In a system for processing image data in the unit of picture elements, the image is scaled up and down in the unit of picture elements. The image data interpolation apparatus of the embodiment is provided for scaling up the image in the unit of picture elements. The apparatus comprises an image data obtaining unit C1, a picture element interpolating unit C2, a feature amount obtaining unit C3, and an interpolating process selecting unit C4. The image data obtaining unit C1 obtains image data. The picture element interpolating unit C2 carries out an interpolating process for increasing the number of constituent picture elements of the obtained image data. The picture element interpolating unit C2 is capable of carrying out a plurality of interpolating processes. The feature amount obtaining unit C3 obtains a feature amount concerning the image data with respect to the selected interpolating process. The interpolating process selecting unit C4 selects one of the interpolating processes capable of achieving an optimum result of interpolation according to the feature amount obtained by the feature amount obtaining unit C3. The interpolating process selecting unit C4 further instructs the picture element interpolating unit C2 to execute the selected interpolating process.

Figure 2:
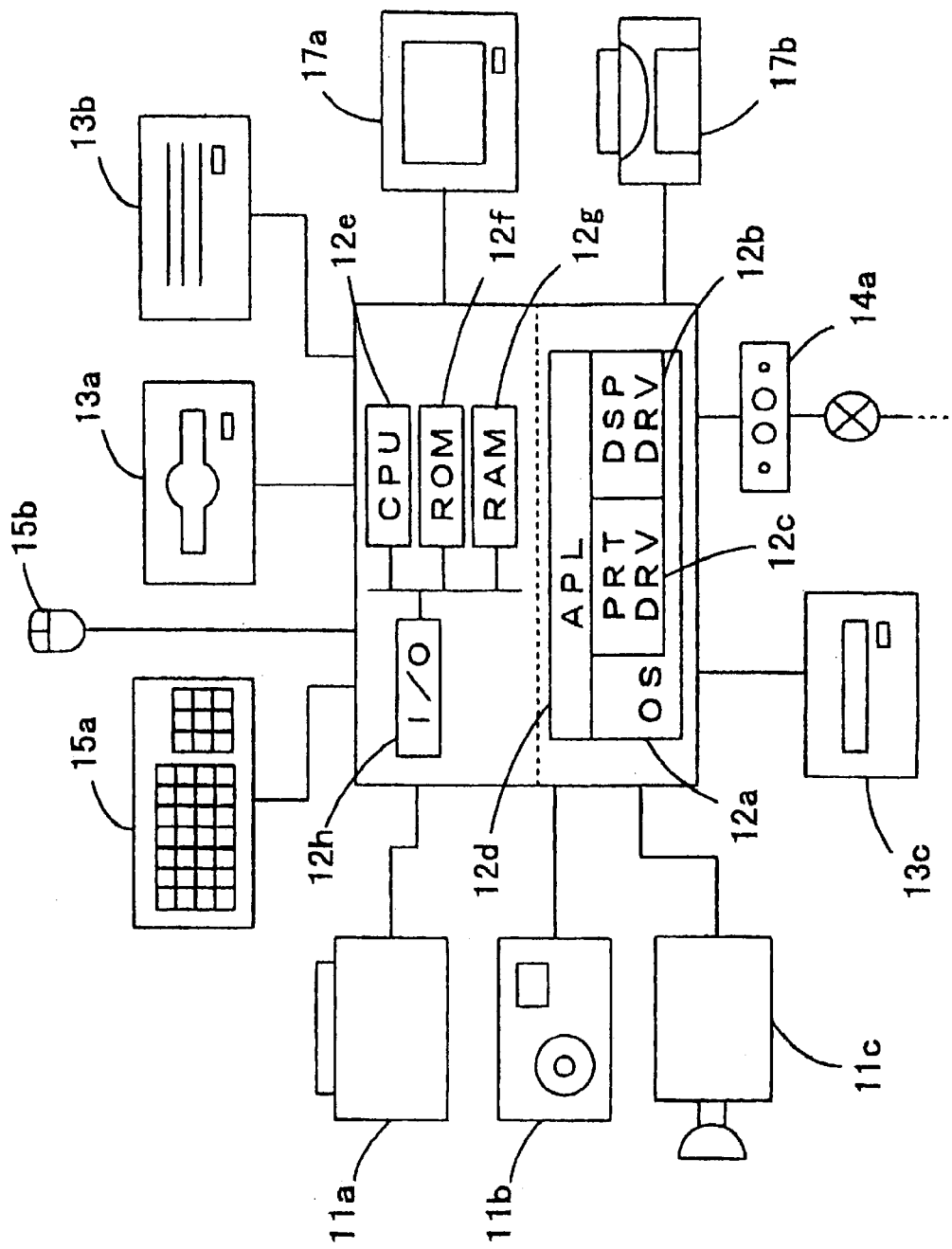
FIG. 2 is a block diagram of a specific hardware of the image data interpolation apparatus.

The embodiment employs a computer system 10 as an example of hardware accomplishing the above-mentioned image data interpolation apparatus. FIG. 2 shows the computer system in a block form. The computer system 10 comprises a scanner 11a, a digital still camera 11b and a video camera 11c each serving as an image input device. The scanner 11a, digital still camera 11b and video camera 11c are connected to a computer 12. Each image input device generates image data comprising dot-matrix picture elements, supplying the image data to the computer 12. The image data generated by each image input device is represented in three primary colors of RGB in 256 gradations so that about 16 million and 700 thousand colors can be represented.

A floppy disk drive 13a, a hard disk 13b and a CD-ROM drive 13c each serving as an external auxiliary storage are connected to the computer 12. Main programs relating to the system is recorded on the hard disk 13b. Other required programs are read from a floppy disk or a CD-ROM as the occasion may demand. Further, a modem 14a is connected to the computer 12. The modem 14a is further connected to an external network (not shown) via a public telecommunication line through which software and data can be downloaded. Although an operator externally accesses via the modem 14a and the public telecommunication line in the embodiment, a LAN adapter may be provided for the operator to access the network, instead. Additionally, a keyboard 15a and a mouse 15b are provided for operation of the computer 12.

The computer system 10 further comprises a display 17a and a color printer 17b each serving as an image output device. The display 17a has a display area of 800×600 picture elements in the horizontal and vertical directions respectively, so that about 16 million and 700 thousand colors can be displayed for every picture element. However, this is only one example of resolution. The resolution of the display 17a may be variable, for example, it may be 640× 480 or 1024×768 picture elements. On the other hand, the color printer 17b, which is of the ink-jet type, is capable of printing an image with dots on printing paper serving as a recording medium using four color inks of CMYK (cyan, magenta, yellow and black). The color printer 17b has an image density of 360×360 dpi or 720×720 dpi and can thus perform a high-density printing. The color printer 17b has two gradations as to whether color ink is applied or not.

Predetermined programs are executed in the computer 12 so that the image data input by the image input device is displayed or otherwise output by the image output device. Of these programs, an operating system (OS) 12a as a basic program runs on the computer 12. A display driver (DSP DRV) 12b and a printer driver (PRT DRV) 12c are incorporated in the operating system 12a. The display driver 12b instructs the display 17a to perform a displaying operation, whereas the printer driver 12c instructs the color printer 17b to perform a printing operation. These drivers 12b and 12c depend on the types of the display 17a and color printer 17b respectively and can accordingly be added or changed according to the respective types. Further, additional functions other than standard processes may be accomplished depending on the respective types of the display 17a and color printer 17b. In other words, various additional processes can be accomplished within allowable ranges while a common processing system is maintained on the standard system of the operating system 12a. The computer 12 is provided with a CPU 12e, a RAM 12f, a ROM 12g and an I/O 12h to execute the aforesaid programs. The CPU 12e executes the basic program written on the ROM 12g while carrying out computation using the RAM 12f as a temporary work area or a setting storing area, or a program area, thereby controlling the external and internal equipment connected thereto.

The application 12d is executed on the operating system 12a serving as the basic program. The application 12d has various processing contents. For example, it monitors operations of the keyboard 15a and the mouse 15b each serving as an operating device. When each device is operated, the CPU 12e controls the external equipment so that the corresponding computation processing is carried out. The CPU 12e further displays the results of processing on the display 17a or outputs them to the color printer 17b.

In the above-described computer system 10, the scanner 11 serving as an image input device obtains image data.

After a predetermined image processing is carried out for the image data by the application 12d, the image data is capable of being output to the display 17a and the color printer 17b. In this case, when a picture element density of the color printer 17b equals one of the scanner 11a, the size of an image to be printed becomes equal to the size of the scanned original image. However, when the picture element densityof the color printer 17b differs from that of the scanner 11a, the size of the image to be printed also differs from that of the original image. The picture element density of the scanner 11a approximates that of the color printer 17b in many cases. However, when the color printer 17b has a picture element density improved for high image quality, it is often higher than the picture element density of an ordinary image input device. In particular, the improved picture element density of the color printer 17b is higher than that of the display 17a, whereupon a too small image is printed when the size of the image displayed on the display 17a is equal to that of the original image in the picture elements.

In view of the aforesaid problem, the operating system 12a determines a reference picture element density and executes a resolution conversion so that the difference between the reference density and the picture element density of an actual device is resolved. For example, when the display 17a has a resolution of 72 dpi and the operating system 12a has a reference density of 360 dpi, the display driver 12b executes the resolution conversion between them. Further, when the color printer has a resolution of 720 dpi under the same condition, the printer driver 12c executes the resolution conversion between them.

The resolution conversion is a process for increasing the number of constituent picture elements of the image data and accordingly corresponds to an interpolating process. Each of the display and printer drivers 12b and 12c has a function of executing the interpolating process. Each driver further accomplishes not only the above-described picture element interpolating unit C2 but also the feature amount obtaining unit C3 and the interpolating process selecting unit C4 as will be described later, so that the image quality is prevented from being deteriorated by the resolution conversion. Both of the display and printer drivers 12b and 12c are stored on the hard disk 13b and read into the computer 12 upon start of the computer system 10 to run. When put to work, these drivers recorded on a medium such as a CD-ROM or a floppy disk are installed on the hard disk. Accordingly, such a CD-ROM or floppy disk constitutes a medium on which an image data interpolation program is recorded.

Figure 3:
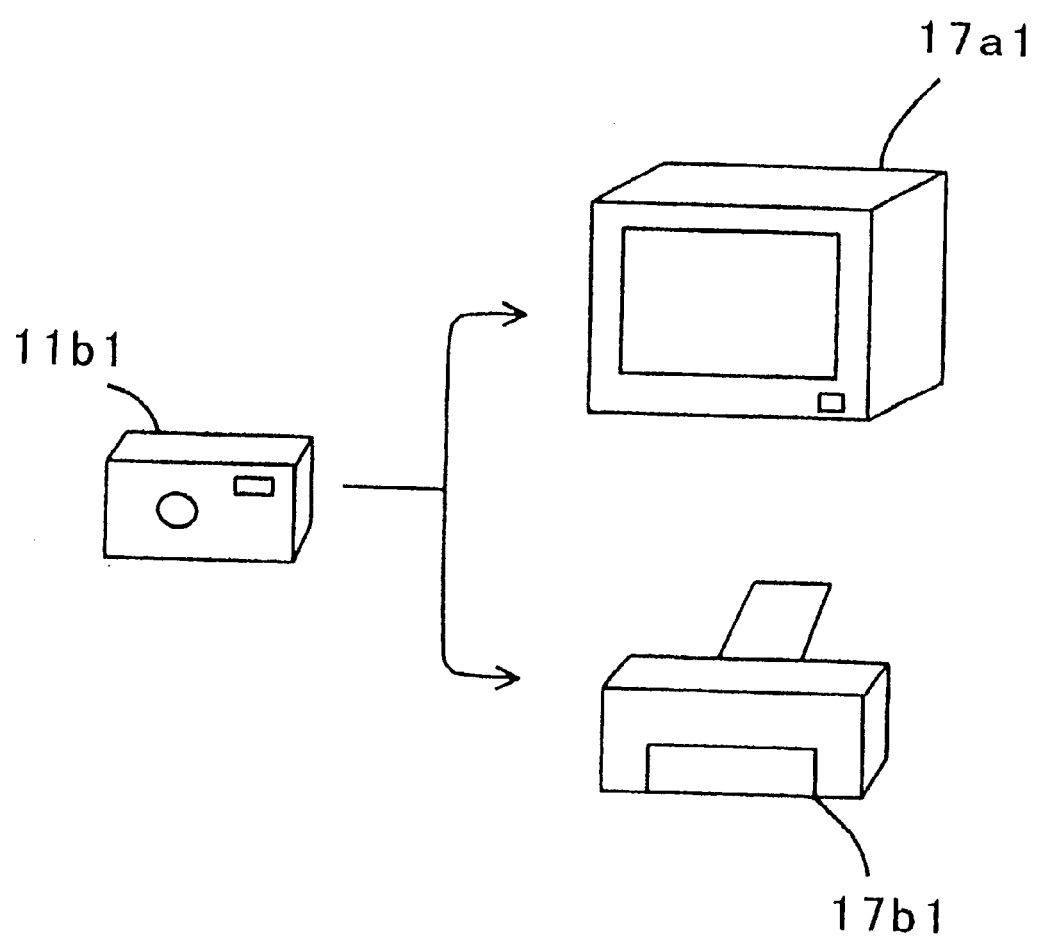
FIG. 3 is a schematic block diagram of another application example of the image data interpolation apparatus.
Figure 4:
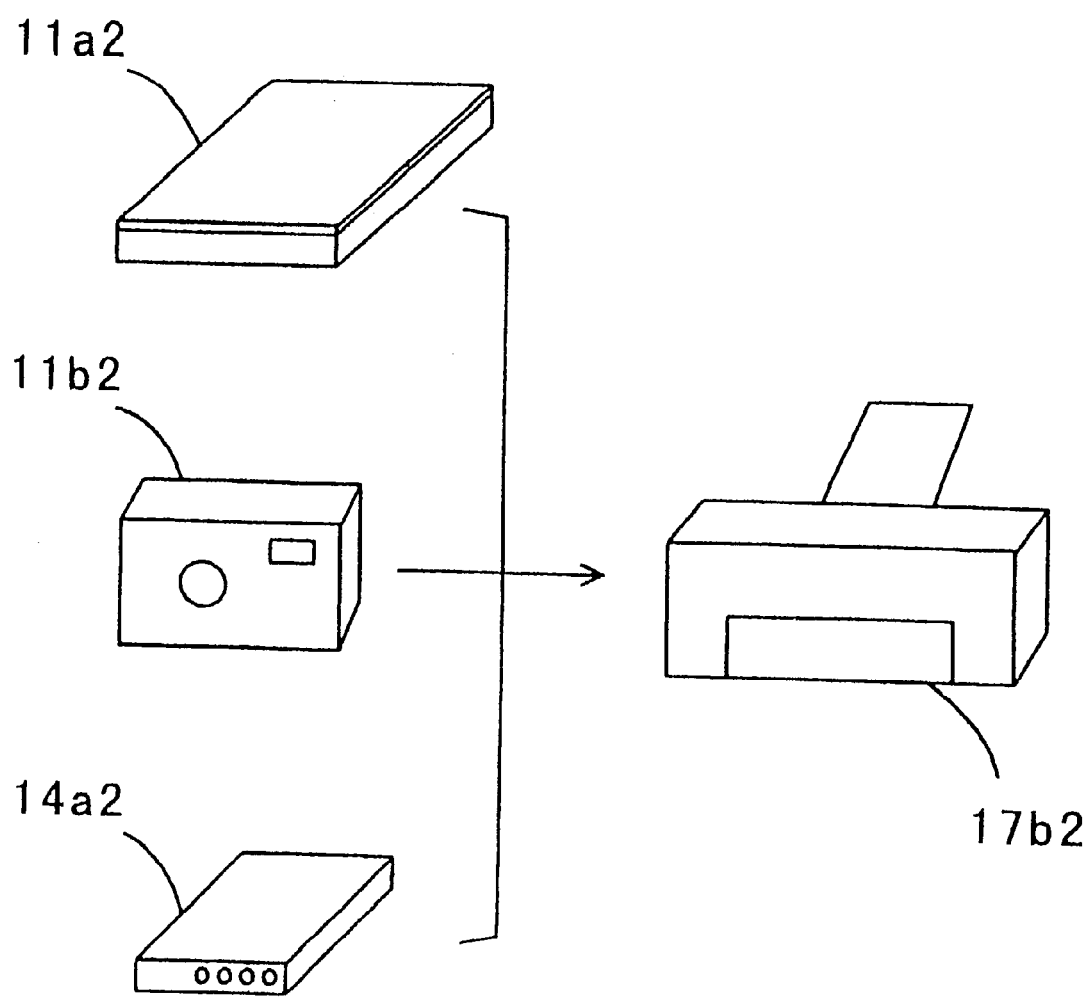
FIG. 4 is a schematic block diagram of further another application example of the image data interpolation apparatus.

Although the image data interpolation apparatus is realized as the computer system 10 in the embodiment, the computer system is not necessarily required. A system in which the same interpolating process is required for image data may be provided, instead. For example, the image data interpolating device may be incorporated into a digital still camera 11b1 so that interpolated image data is displayed on a display 17a1 or printed by a color printer 17b1, as shown in FIG. 3. Further, in a color printer 17b2 inputting and printing image data without via a computer system, the resolution conversion may automatically be executed for image data input via a scanner 11a2, a digital still camera 11b2 or a modem 14a2 and a printing process may thereafter be carried out, as shown in FIG. 4. Additionally, the image data interpolation apparatus of the invention may be applied to equipment in which image data is treated, for example, a color facsimile machine 18a as shown in FIG. 5 or a color copying machine 18b as shown in FIG. 6.

Figure 7:
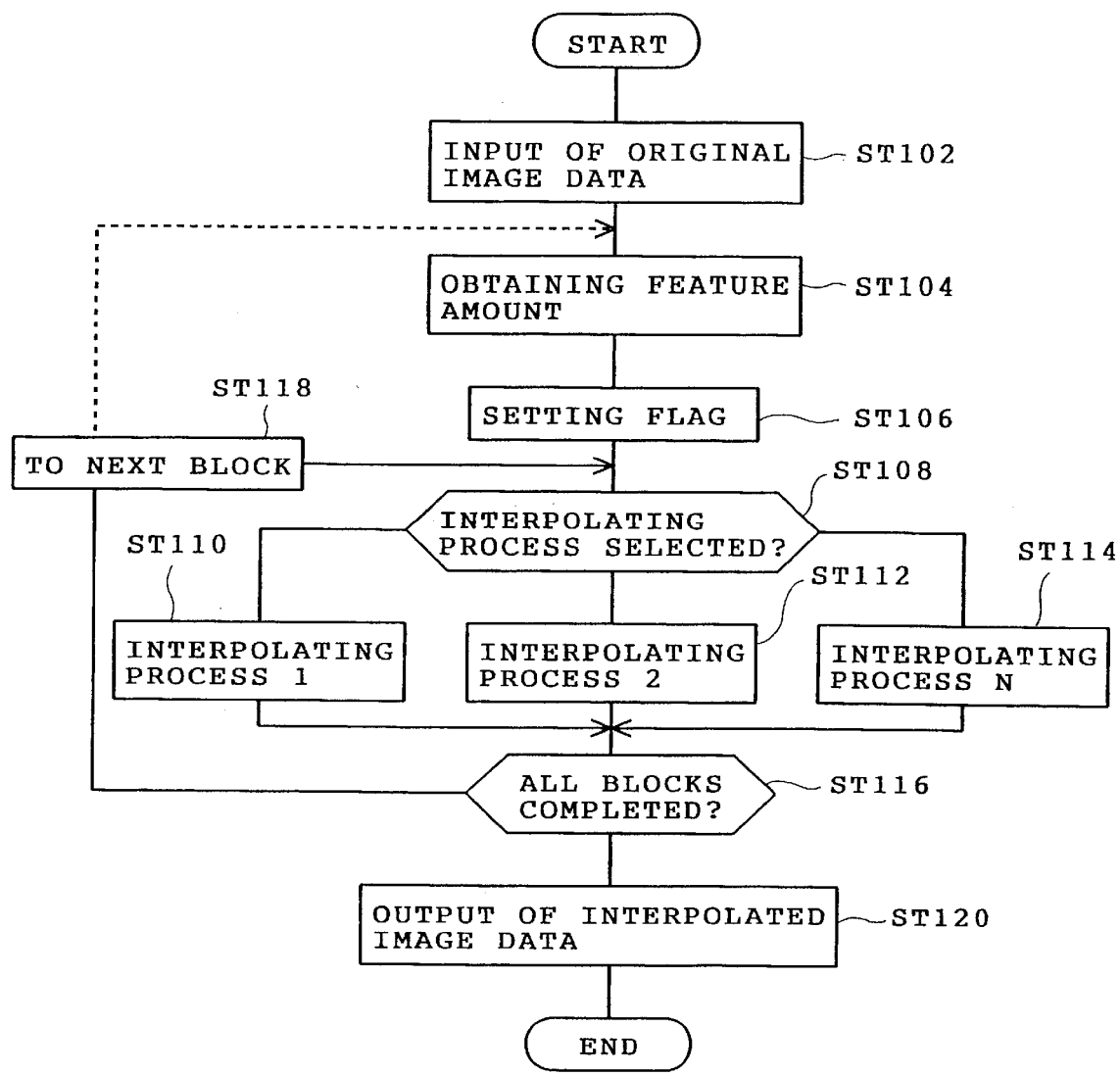
FIG. 7 is a schematic flowchart showing the operation of the image data interpolation apparatus.
Figure 8:
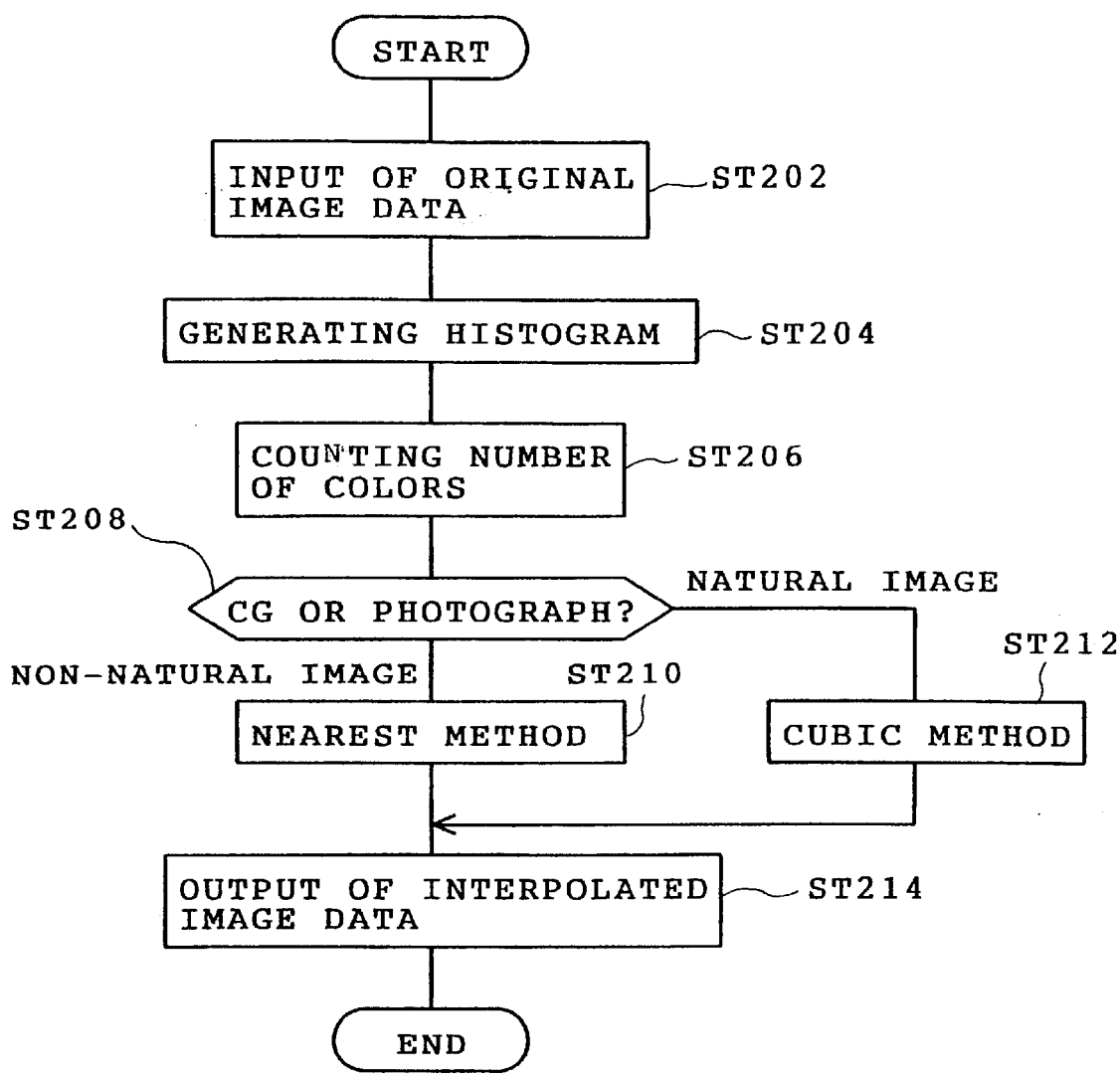
FIG. 8 is a flowchart more concretely showing the operation of the image data interpolation apparatus.

FIGS. 7 and 8 show processes for resolution conversion executed by the aforesaid printer driver 12c. FIG. 7 is a generalized flowchart, whereas FIG. 8 is a concrete flowchart showing the processing in the embodiment original image data is obtain data step ST102. Input image is read from the scanner 11a on the application 12d. Predetermined image processing is carried out for the read image and thereafter, the image is processed for printing. Print data with a predetermined resolution is then delivered via the operating system 12a to the printer driver 12c. However, the image may be read by the scanner 11a, instead. This process corresponds to an image data obtaining step from the viewpoint of software. It can be understood that various steps executed by the computer including the image data obtaining step may not include the operating system 12a and hardware directly. On the other hand, these steps correspond to the image data obtaining unit C1 when considered to be integrally combined with hardware such as the CPU.

A feature amount in the read image data is obtained at a step ST104. This process for obtaining the feature amount will be described later. An optimum interpolating process for the image data on the basis of the obtained feature amount is selected at a step ST106, and a flag indicative of the selected interpolating process is set. With reference to the flag, one of interpolating processes 1 to N at steps ST110, ST112, and ST114 respectively is executed. Accordingly, each of the interpolating processes 1 to N at the respective steps ST110, ST112 and ST114 corresponds to an image interpolating step. Further, the steps ST106 and ST108 correspond to an interpolating process selecting step wherein one of the interpolating processes is selected on the basis of the feature amount. The steps ST106 and ST108 correspond to an interpolating process selecting step. These steps constitute the image interpolating unit C2 and the interpolating process selecting unit C4 when considered to be integrally combined with hardware such as the CPU.

At the steps ST116 and ST118, blocks are displaced until the interpolating process is completed for all the blocks. The interpolating process need not be carried out uniformly over the whole image. The interpolating process may be changed for every block of region. Accordingly, when an optimum interpolating process is to be executed for every block, the process is re-executed from the step ST104 for obtaining the feature amount of a next block upon completion of the interpolating process for each block. On the other hand, the step ST108 and subsequent steps are repeated when the whole image data is processed uniformly. Upon completion of the interpolating process for all the blocks, the interpolated image data is output at a step ST120. Print data is not obtained only by the resolution conversion in the printer driver 12c. A color conversion and a half-tone processing are further required. Accordingly, output of the image data means delivery of the image data to a next stage.

A more concrete process will now be described with reference to FIG. 8. In the embodiment, it is determined which of computer graphics (non-natural image) or a photograph (natural image) the original image is. One of a plurality of interpolating processes is selected on the basis of a result of determination. The original image data is input at a step ST202 in the same manner as at the step ST102.

Some techniques may be employed for determining what type the original image is. In the embodiment, a totaling process is carried out using the image data. More specifically, the number of colors used in the image data is found. The image data is determined to be a natural image when the number of colors is large, whereas the image data is determined to be a non-natural image when the number of colors is small. In the case of photograph, even when an object of a single color is in a photograph, influence of light and shading result in bright portions and dark portions, thereby increasing the number of colors. Due to this characteristic, the image data can be determined to be a natural or non-natural image when the number of colors thereof is found. However, it is inefficient to determine how many colors of about 16 million and 700 thousand ones are actually used. Further, only a part of these colors are used even in a natural image in many cases and it is difficult to distinguish between a natural image and a non-natural image.

In view of the above-described problem, luminance of each picture element is found in the embodiment. Histograms of the number of picture elements are summed in a range the luminance takes, so that a tendency in the number of used colors is determined. A plurality of colors may well have the same luminance in about 16 million and 700 thousand colors. However, when only comparison with non-natural image is considered, comparison is possible in order to determine whether the number of colors is small or large even if the number is based on the color or luminance. Further, when it is considered that a non-natural image uses about 64 colors at the most, the determination is sufficiently possible even if the luminance range is 256 gradations.

On the other hand, since the luminance summation is used only to determine a rough tendency of image data, the summation may not necessarily be performed for all the picture elements. That is, a thinning process is performed in order that picture elements serving as an object of summation may be selected.

Figure 24:
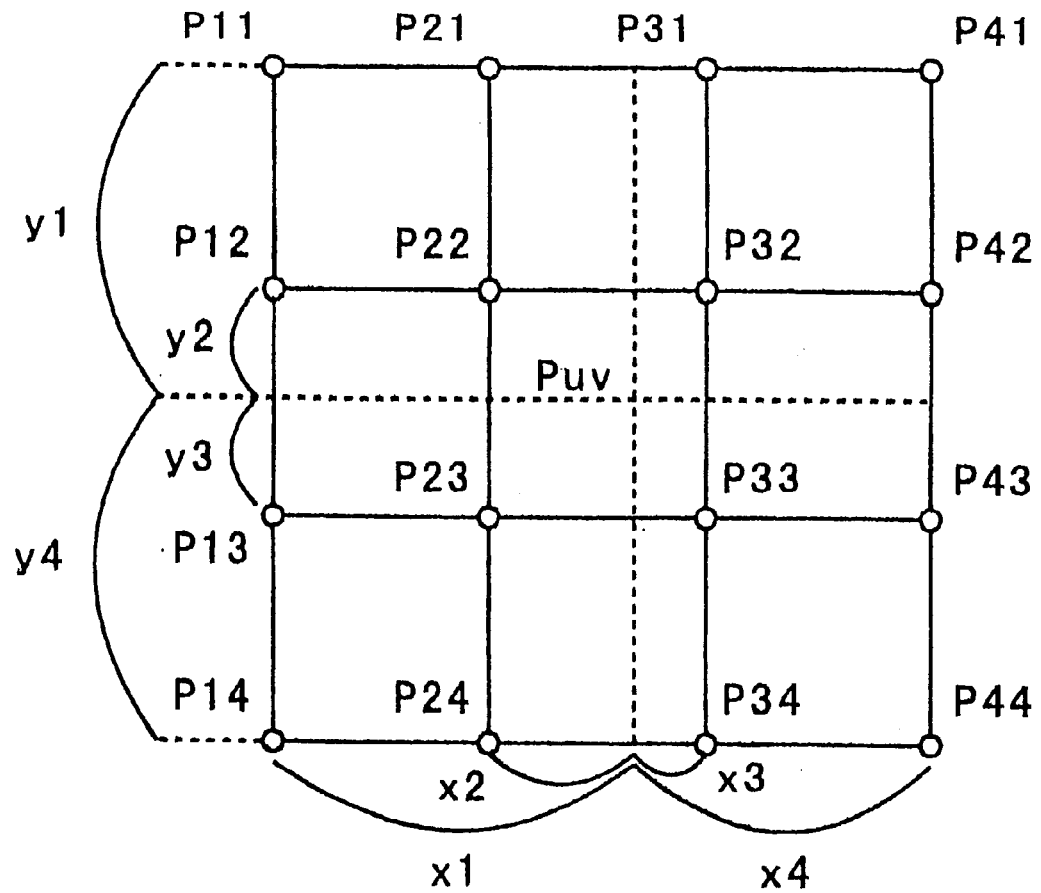
FIG. 24 illustrates a concept of the cubic method.

A bitmap image is composed as two-dimensional dot-matrix data comprising a predetermined number of dots in the vertical direction and a predetermined number of dots in the horizontal direction as shown in FIG. 24. The luminance needs to be found for all the picture elements when a precise luminance distribution is found. However, the luminance distribution may not necessarily be precise here. Accordingly, picture elements wherefrom the luminance is sampled to within the limits of a certain error can be thinned out. According to statistical error, an error for a sample number N can generally be represented by $1/(N^{}(1/2))$ where the symbol  represents power. Accordingly, in order to perform processing with an error of around 1%, N=10000.

Figure 9:
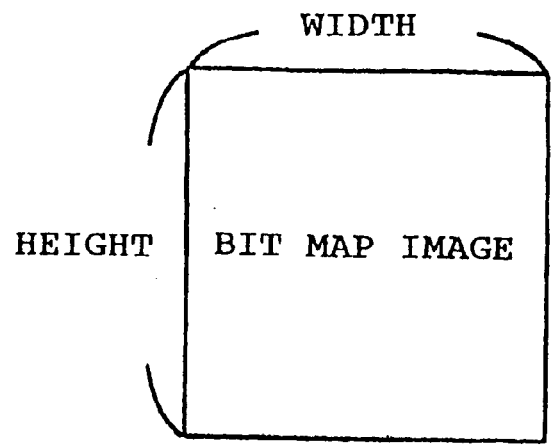
FIG. 9 is a view showing the size of an original image.
Figure 10:
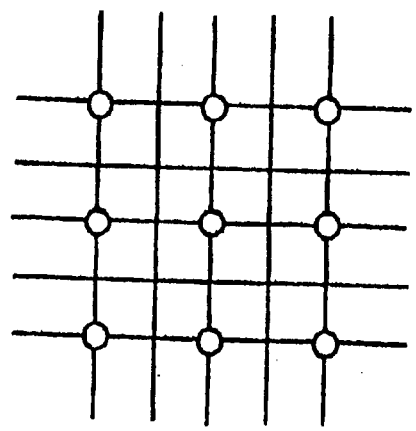
FIG. 10 illustrates a sampling period.
Figure 11:
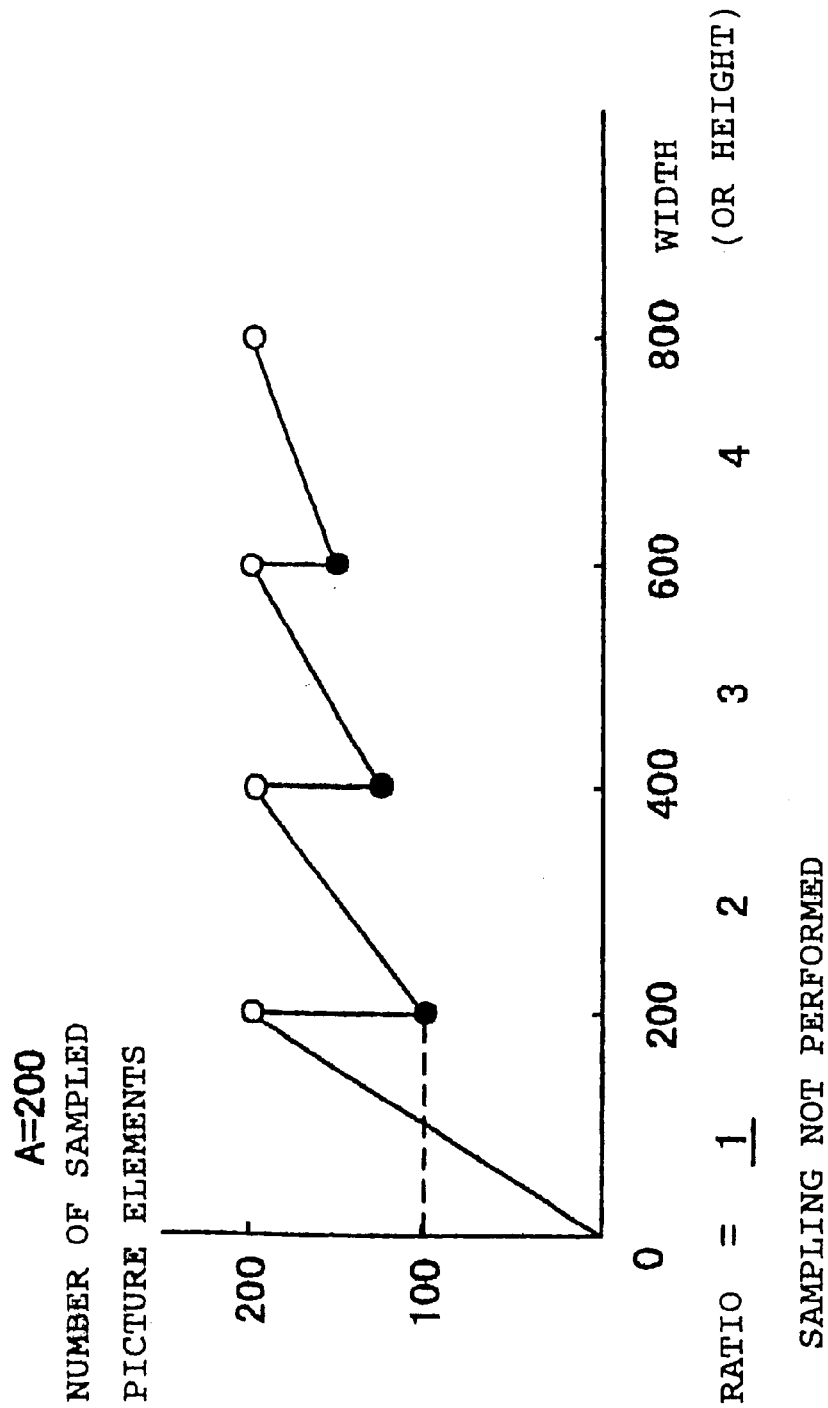
FIG. 11 is a graph showing the number of sampled picture elements.

Herein, the bitmap screen shown in FIG. 9 is number of (width)×(height) picture elements, and a sampling period ratio is given by:

Ratio=min (width, height)/A+1 where min (width, height) is the smaller of width or height and A is a constant. The sampling period ratio mentioned here expresses how frequently to perform sampling in numbers of picture elements, and the mark ○ in FIG. 1 shows the case where the sampling period ratio is 2. In other words, one picture element is sampled every two picture elements in the vertical and horizontal directions, so sampling is performed every other picture element. The number of picture elements sampled in one line when A=200 is as shown in FIG. 11. As is clear from the figure, except for the case where the sampling period ratio is 1 when sampling is not performed, at least 100 picture elements are sampled when there is a width of 200 picture elements or more. Accordingly, when there are 200 or more picture elements in the vertical and horizontal directions (100 picture elements)×(100 picture elements)=10000 picture elements are sampled and the error is 1% or less.

Figure 12A:
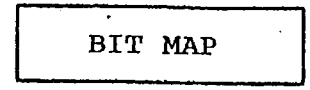
FIGS. 12A to 12C illustrate a relation between the original image and the number of sampled picture elements.
Figure 12B:
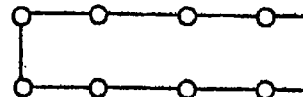
Figure 12C:
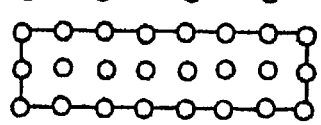

The reason for taking min (width, height) as a basis is as follows. For example, as shown by the bitmap in FIG. 12A, if width>>height and the sampling period ratio is determined by width which is the longer direction, only two lines of picture elements, i.e. the top edge and bottom edge, can be sampled in the vertical direction as shown in FIG. 12B. However, if the sampling period ratio is determined based on the smaller of the two as min (width, height), thinning which includes the middle part can be performed even in the lesser, vertical direction as shown in FIG. 12C. In other words, sampling with a predetermined number of samplings can be guaranteed.

In this example, the picture elements in the vertical and horizontal directions are thinned out in a precise sampling period ratio. This is suitable for a case where the processing is performed while sequentially input picture elements are being thinned out. However, when all the picture elements have been input, coordinates may be designated at random in the vertical and horizontal directions so that the picture elements are selected. In this case, when a minimum number of picture elements, for example, 1000 picture elements, is determined, random extraction is repeatedly performed until 10000 picture elements are reached and the extraction is stopped when 10000 picture elements are reached.

When image data of thus selected picture elements have luminance as direct component values, the luminance distribution can be found by using luminance values. However, even in the case of image data in which the luminance values are not direct component values, the image data have indirect component values. Accordingly, luminance values can be obtained when a color specification space in which the luminance values are not direct component values is converted to one in which the luminance values are direct component values.

Color conversion between different color specification spaces is not readily defined by a conversion equation. Relationship of correspondence between color spaces with coordinates of respective component values is first found. A successive conversion needs to be performed with reference to a color conversion table storing the correspondence relationship. Then, strictly speaking, the color conversion table needs to contain about 16 million and 700 thousand elements. As the result of consideration of efficient use of storing resource, the correspondence relationship of sporadic lattice points is usually prepared instead of the correspondence relationship of all the coordinate values, and an interpolation operation is used with the correspondence relationship. However, since the interpolation operation requires multiplication and addition at some times, an amount of computation becomes enormous. More specifically, when a full-size color conversion table is used, an amount of computation becomes less but a table size becomes unrealistic. When the table size is realistic, an amount of computation becomes unrealistic.

In view of the foregoing, the following conversion equation which is used in television, for example, is used to find the luminance from the original colors of RGB. That is, the luminance yp at point P is given from component values (Rp, Gp, Bp) of RGB by the equation:

$$yp=0.30Rp+0.59Gp+0.11Bp.$$

In this case, the luminance value can be obtained by multiplication at three times and addition twice.

The above conversion equation is used in the embodiment as the result that the RGB color specification space is an object. As the back of this, since each component value indicates color brightness, it corresponds linearly to the luminance when each component value is taken individually. Accordingly, roughly speaking, the above equation can be simplified without consideration to a summing rate into the following equation:

$$yp=(Rp+Gp+Bp)/3.$$

Figure 13:
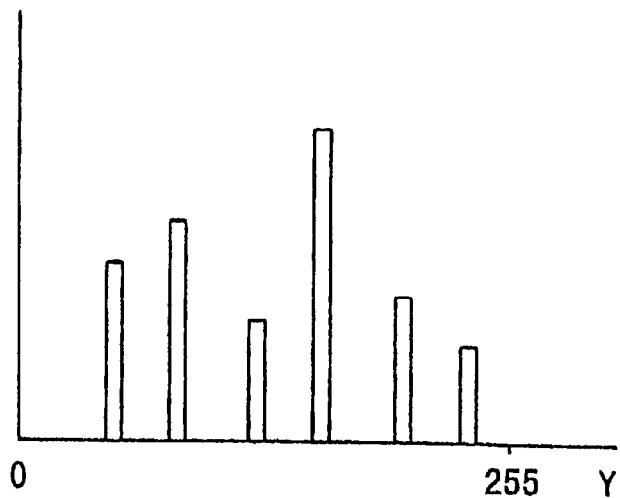
FIG. 13 is a histogram showing luminance of a non-natural image.
Figure 14:
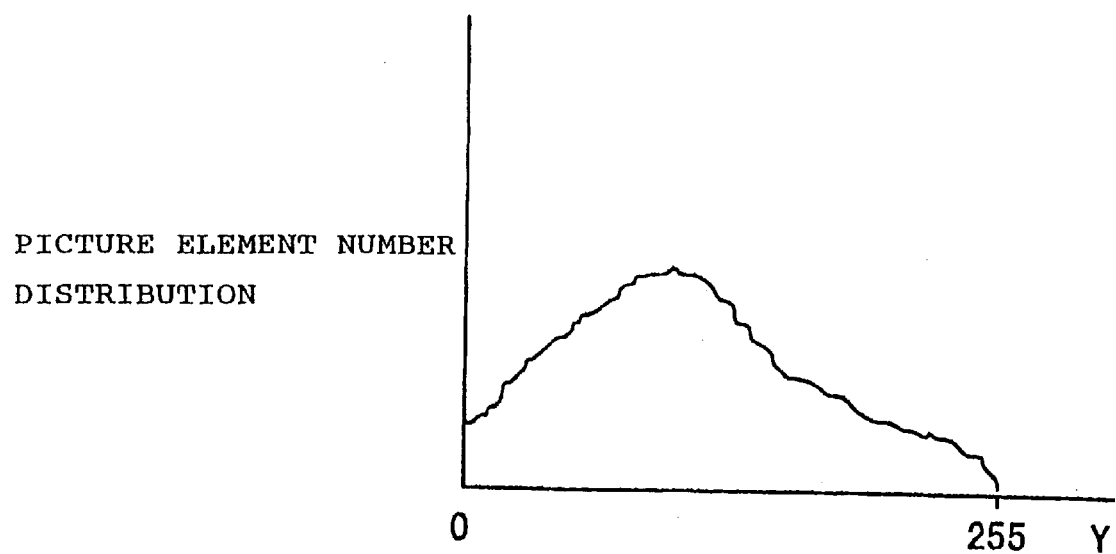
FIG. 14 is a histogram showing luminance of a natural image.

The luminance of thinned picture elements as described above is drawn into a histogram at a step ST204. After summation, the number of colors is counted at a step ST206. The luminance distribution is scattered as the number of colors is small. It is expected that the luminance distribution is represented as a line spectrum in the case of non-natural image such as a business graph as shown in FIG. 13, whereas the luminance distribution is represented as a gentle curve. Thus, the number of luminance values wherein a distribution number is not zero, in the luminance of 256 gradations are counted at step ST206. The image is determined not to be a natural image when the count is below "64" colors. The image is determined to be a natural image when the count is at or above "64". On the other hand, whether the distribution is a linear spectrum can be determined on the basis of an adjacency ratio of the luminance values with the distribution numbers are not "0." More specifically, it is determined whether the luminance values whose distribution numbers are not "0" and which are adjacent to each other have respective distribution numbers. Nothing is done when at least one of two adjacent luminance values is adjacent. Count is performed when neither luminance value is adjacent. As are sult, determination is made on the basis of the rate of the number of the luminance values which are not "0" and the count. For example, when the number of luminance values which are not "0" is "80" and the number of luminance values which are not adjacent is "80," the distribution is a linear spectrum. Of course, the number of used colors corresponds to a feature amount.

Figure 15:
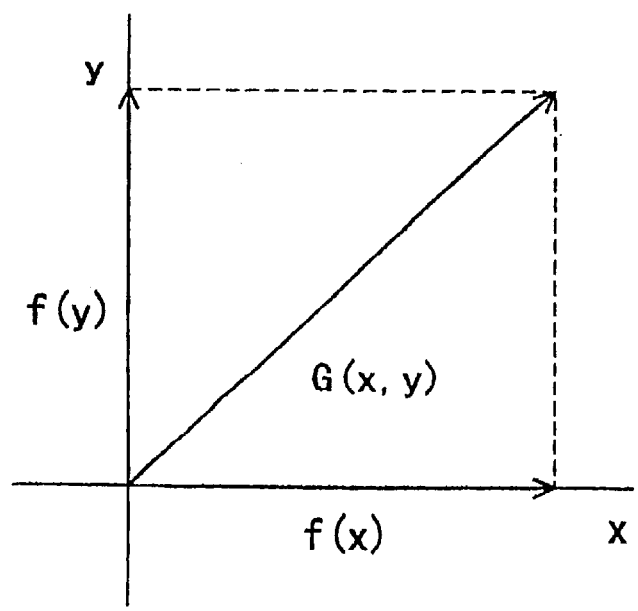
FIG. 15 is a graph showing a variation degree of image.

A manner of obtaining the feature amount should not be limited to the above and other manners can be realized. First, a manner of thinning out the picture elements to be summed should not be limited to an equally spaced thinning. For example, an original object part is found in an image, and feature amounts regarding picture elements of the object part may be summed. Picture elements for which the image is sharp are determined to be those of the object based on the experimental fact that the image is sharper for the object than for other parts. When image data comprises dot matrix picture elements, a difference amount between data for adjacent picture elements becomes large at the edge of the image. This difference amount is a luminance gradient and is referred to as "edginess." The edginess of each picture element is determined. When the XY orthogonal coordinate system as shown in FIG. 15 is considered, vectors of the image variation degree may be computed if the×direction component and the Y direction component are found respectively. In a digital image comprising dot matrix picture elements, there are adjacent picture elements in the vertical axis direction and in the horizontal axis direction, and a difference amount value fx in the×direction and a difference amount value fy in the Y direction may be written as:

$$fx=f(x+1, y)-f(x, y)$$

$$fy=f(x, y+1)-f(x, y).$$

Accordingly, the magnitude of the vector $|g(x, y)|$ having these differences as components may be written as:

$$|g(x, y)|=(fx2+fy2)**(1/2).$$

Figures 16, 17:
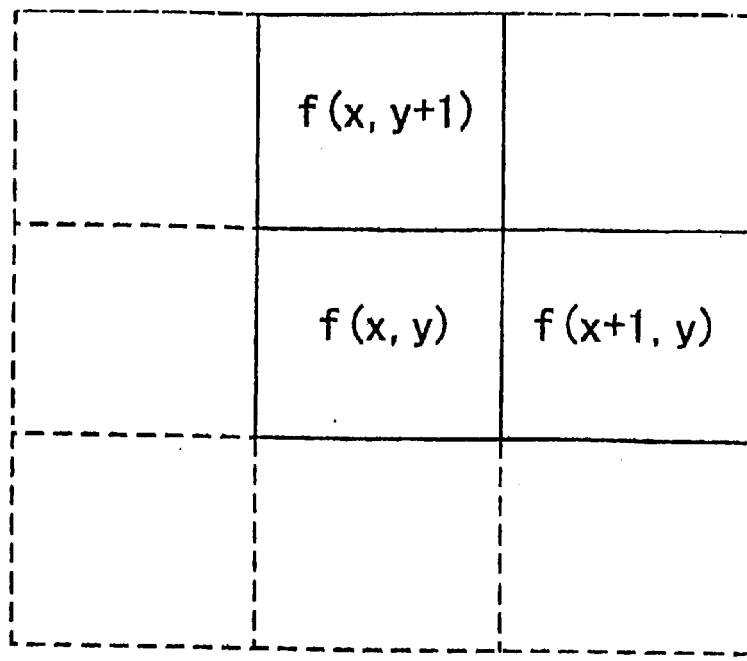
FIG. 16 illustrates a case where the variation degree of image is obtained as difference between one picture element and adjacent picture elements in the axes of ordinates and abscissas.
FIG. 17 illustrates a case where the variation degrees are obtained as differences between one picture element and all adjacent picture elements.

Edginess is of course represented by $|g(x, y)|$. The picture elements are actually arranged in length and breadth as a grid as shown in FIG. 17, there being eight picture elements in the center. Accordingly, expressing a difference a difference amount of image data between adjacent picture elements as a vector, the sum of this vector may be taken as the image variation degree.

Figure 18:
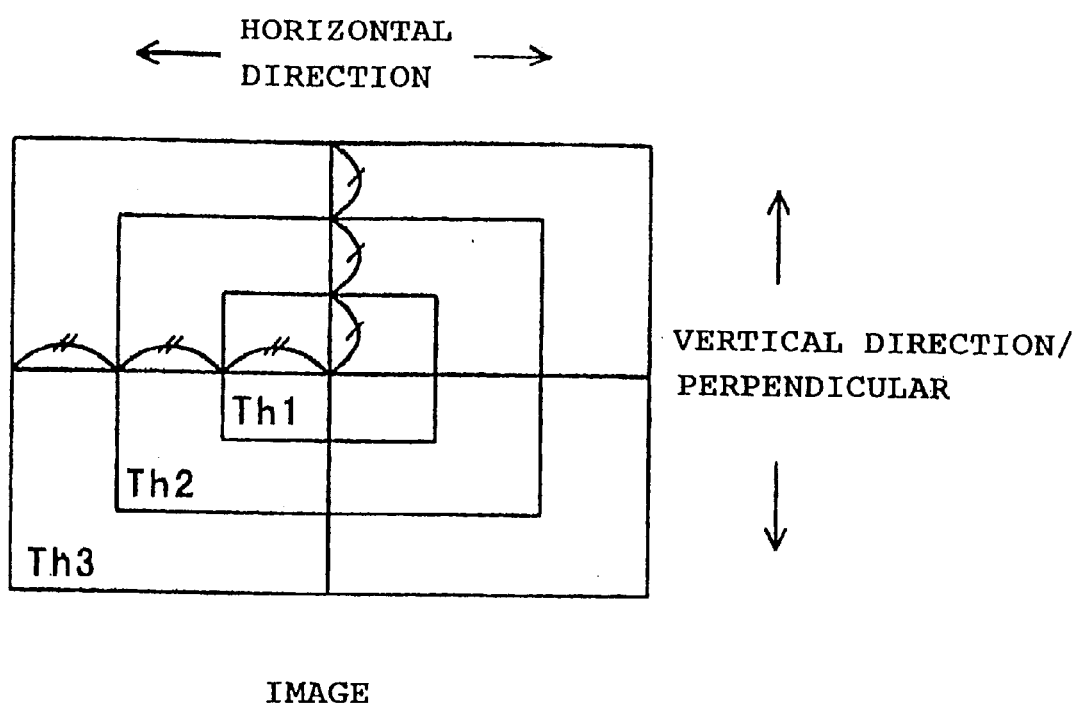
FIG. 18 illustrates a region in which a threshold value is changed.

As the edginess may be found for each picture element in this way, picture elements having a large edginess when compared with a threshold value may be determined to be object picture elements. However, from actual experience, the object is often situated in the center of the figure. This fact provides proof that the use of an arrangement where a large number of picture elements are sampled from the center area for image processing, gives satisfactory results. For this reason, threshold values Th1, Th2 and Th3 used for comparison in each part of the center of the image are arranged to be different as shown in FIG. 18. In this example, of course, the relation Th1>Th2>Th3

Holds. The threshold value is lower the near the center, and this area is determined to be the object even if the edginess is relatively low. Of course, image data of the picture elements determined to be the object are summed and a feature amount corresponding to the interpolating process is obtained. On the other hand, the feature amount may not necessarily be obtained by summation of image data. The feature amount may only correlate as to whether the interpolation result becomes good depending upon the interpolating process.

Figure 19:
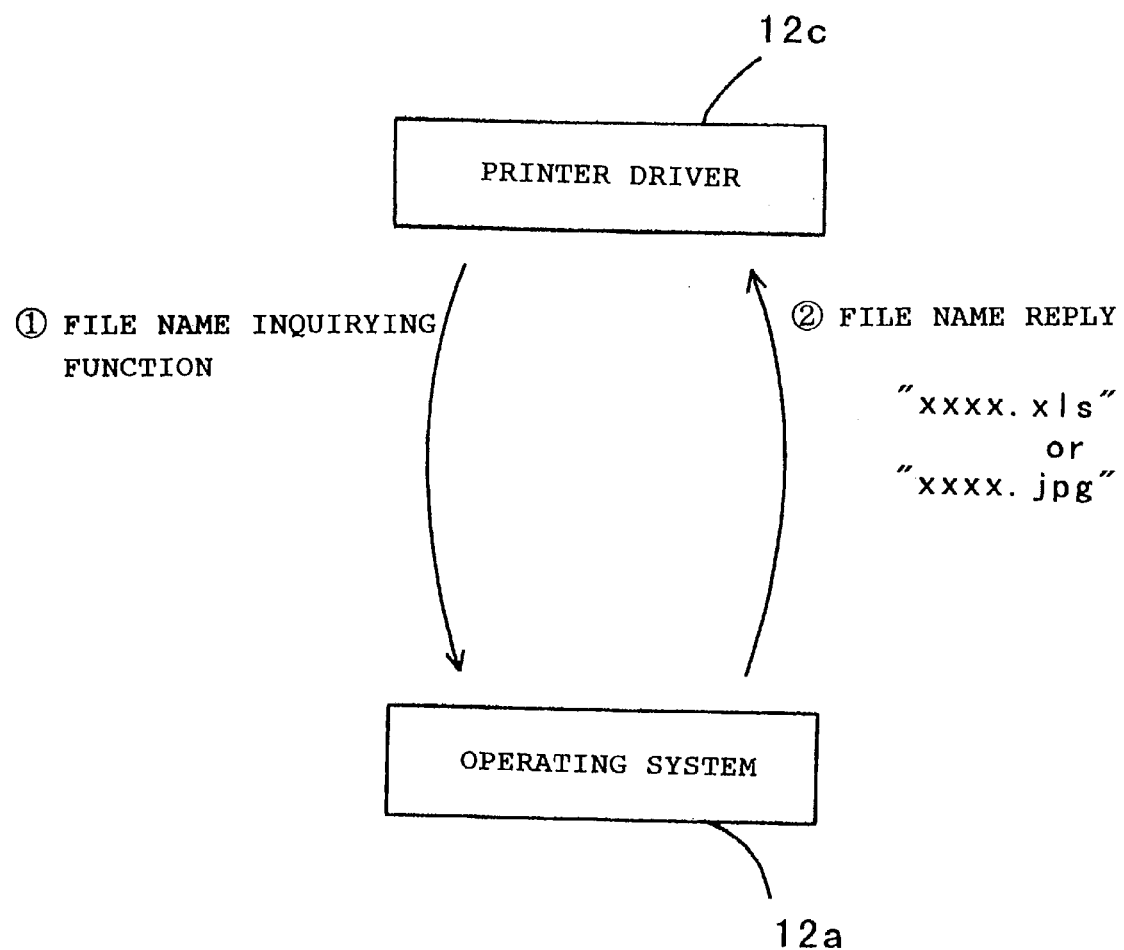
FIG. 19 illustrates a case where a printer driver inquires of an operating system.

Whether an image of image data is a natural image can be determined from a format of image file which becomes print data. FIG. 19 shows a case where the printer driver 12c utilizes a system function prepared in the operating system 12a. When the printer driver 12c utilizes a function to inquire of a file name, the operating system 12a replies a corresponding file name. In this case, when the file name is "XXXX. XLS," the image is found to be a business graph from an extension and determined to be a non-natural image. Further, when the file name is "XXXX. JPG," the image is found to be a compressed file of photographic image from an extension and determined to be a natural image.

Of course, from information contained in a head portion of the data file but not from the extension, whether the image file has a file structure of the draw system or bitmap system can be determined. Consequently, a criterion as to whether the image is a natural or non-natural image can be obtained. Thus, any criterion which can reason the contents of image constitutes a feature amount.

When the original image data input at the step ST202 has been determined to be a natural image or a non-natural image, an interpolating process suitable for either image is carried out.

Figure 20:
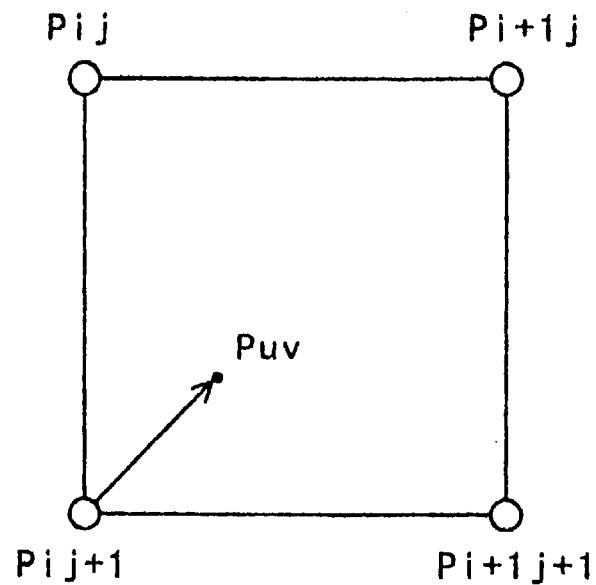
FIG. 20 illustrates a concept of the nearest method.

Methods of the interpolating process employed in the embodiment will now be described. An interpolating process by a nearest method suitable for a non-natural image such as computer graphics is executable at a step ST210. In the nearest method, as shown in FIG. 20, distances between an interpolation point Puv and four peripheral lattice points Pij, Pi+1j, Pij+1 and Pi+1j+1 respectively are obtained. Data of the nearest lattice point is displaced to the interpolation point Puv. This is expressed by the following equation:

$$Puv=Pij$$

where i=[u+0.5] and j=[v+0.5], and each bracket indicates that an integral part is taken in the Gauss' notation.

Figure 21:
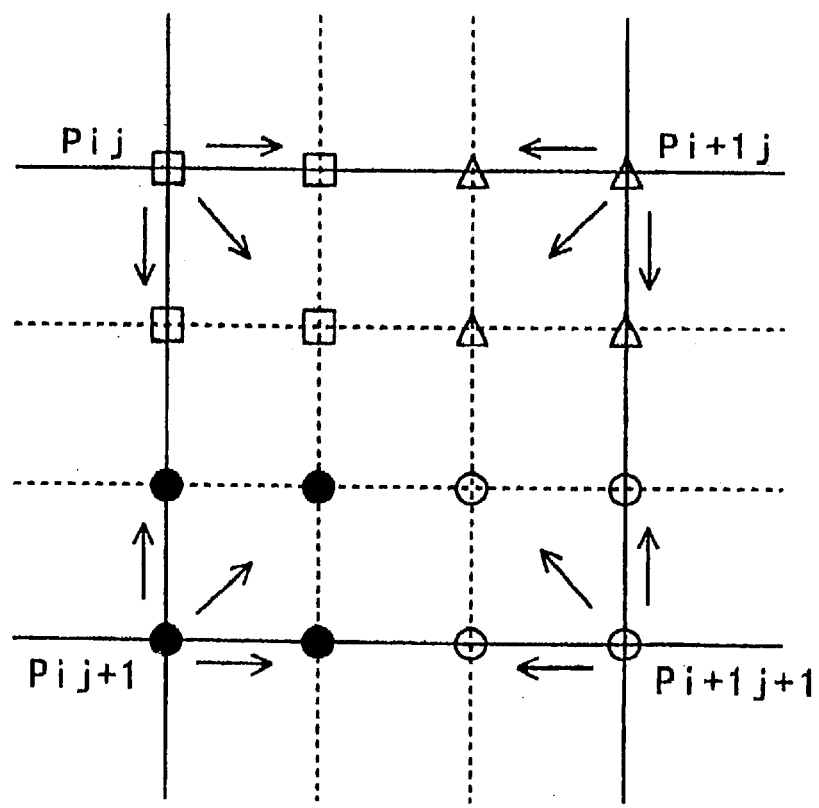
FIG. 21 illustrates a case where data of lattice points are displaced in the nearest method.
Figure 22:
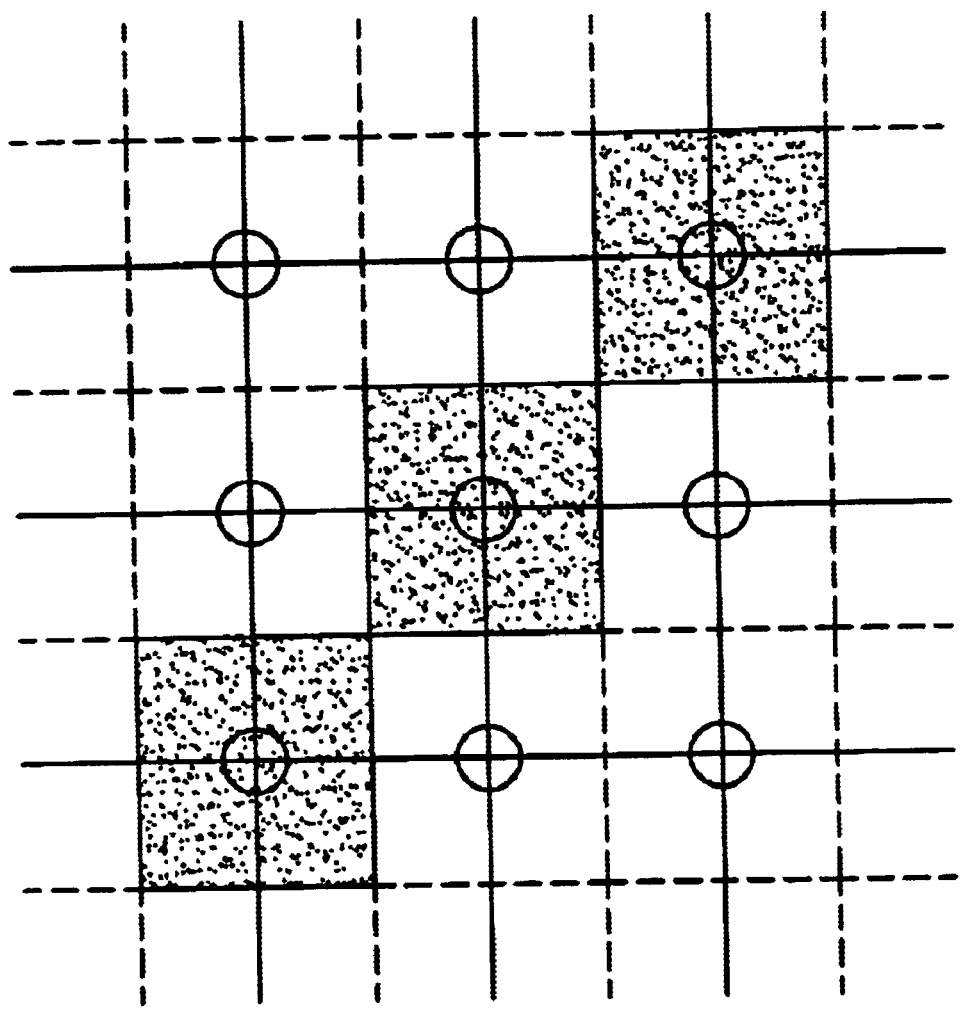
FIG. 22 is a schematic illustration of picture elements before interpolation by the nearest method.
Figure 23:
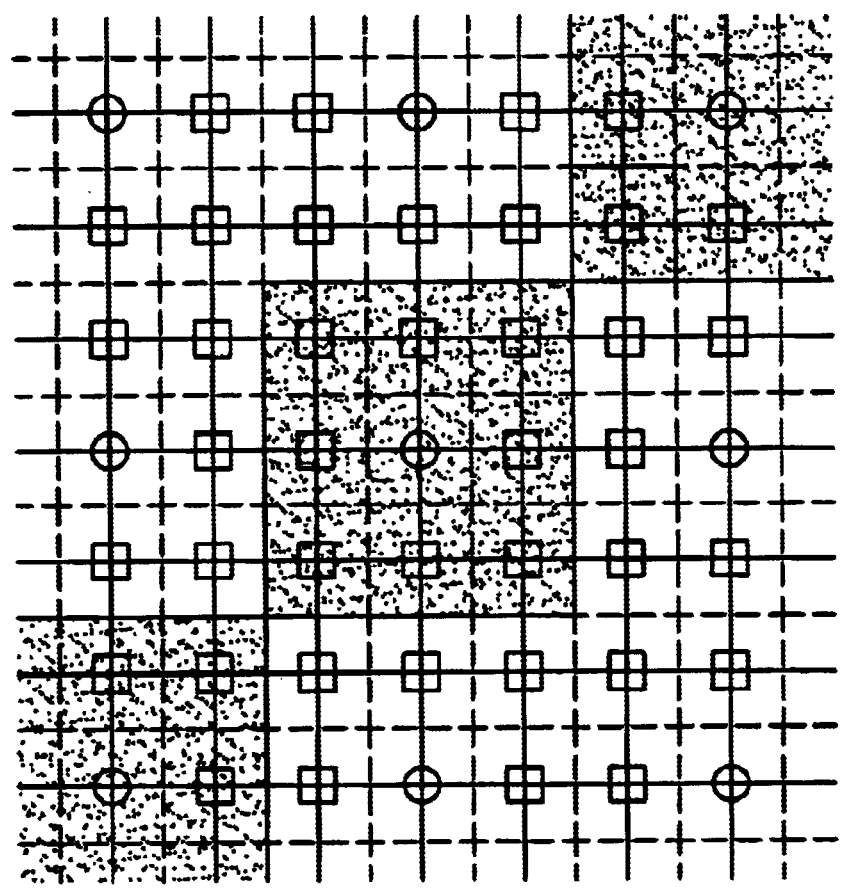
FIG. 23 is a schematic illustration of picture elements after interpolation by the nearest method.

FIG. 21 shows a case where the number of picture elements is trebled both in the length and the width by the nearest method. Assume that there are picture elements (□△○●) at four corners before interpolation. The data of the nearest one of these picture elements is displaced as a picture element to be interpolated. In other words, the picture elements at the four corners are copied with respect to those adjacent to them respectively in this example. FIG. 22 shows the original image and FIG. 23 shows an image obtained by interpolating the picture elements in the above-described method. The relation between obliquely arranged black picture elements and white picture elements serving as the background in the original image is maintained in the interpolated image of FIG. 23 in which the black picture elements are trebled in the number thereof and arranged obliquely.

In the nearest method, edges of the original image are maintained in the interpolated image without change. Accordingly, when the interpolated image is scaled up, jags are conspicuous although the edges are maintained. In other methods, on the other hand, the picture element to be interpolated is processed so as to be changed smoothly by using data of picture elements around it. As a result, although jags are less conspicuous, part of the information of the original data is cut off such that the image is rendered edgeless. Accordingly, these other methods are unsuitable for the computer graphics.

On the other hand, the interpolating process by a cubic method suitable for a natural image such as photographs is executed at a step ST212. In the cubic method, as shown in FIG. 24, data of sixteen lattice points in total are used which include the point Puv to be interpolated, four lattice points around the point Puv, and further outside lattice points surrounding the four lattice points.

When the 16 lattice points surrounding the interpolation point Puv have respective values, the interpolation point Puv depends on the lattice points. For example, when the picture element is interpolated by a linear expression, two lattice points interposing the interpolation point Puv are weighted in inverse proportion to distances between the lattice points and the interpolation point and added. Note the X direction. In FIG. 24, reference symbol x1 designates a distance between the interpolation point Puv and the left-hand outer lattice points. Reference symbol x2 designates a distance between the interpolation point Puv and the left-hand inner lattice points. Reference symbol x3 designates a distance between the interpolation point Puv and the right-hand inner lattice points. Reference symbol x4 designates a distance between the interpolation point Puv and the right-hand outer lattice points. A function f(x) designates a degree of influence of each lattice point corresponding to each distance. Now, note the Y direction. Reference symbol y1 designates a distance between the interpolation point Puv and the upper outer lattice points. Reference symbol y2 designates a distance between the interpolation point Puv and the upper inner lattice points. Reference symbol y3 designates a distance between the interpolation point Puv and the lower inner lattice points. Reference symbol y4 designates a distance between the interpolation point Puv and the lower outer lattice points. A function f(y) designates a degree of influence of each lattice point according to each distance.

Each of the sixteen lattice points thus contributes to the interpolation point Puv with the degree of influence according to the above-described distance therebetween. Accordingly, an equation for accumulating the degrees of influence in the x and Y directions with respect to the data of all lattice points is expressed as follows:

$$P = [f(y1) \ f(y2) \ f(y3) \ f(y4)] \begin{bmatrix} P11 & P21 & P31 & P41 \\ P12 & P22 & P32 & P42 \\ P13 & P23 & P33 & P43 \\ P14 & P24 & P34 & P44 \end{bmatrix} \begin{bmatrix} f(x1) \\ f(x2) \\ f(x3) \\ f(x4) \end{bmatrix}$$

The degree of influence according to the distance is expressed by a cubic convolution function as:

$$f(t) = \{\sin(\pi t)\}/\pi t.$$

Each of the distances x1 to x4 and y1 to y4 is obtained using an absolute coordinate value (u, v) of the interpolation point Puv as:

$$x1 = 1 + (u - |u|) \quad y1 = 1 + (v - |v|)$$

$$x2 = (u - |u|) \quad y2 = (v - |v|)$$

$$x3 = 1 - (u - |u|) \quad y3 = 1 - (v - |v|)$$

$$x4 = 2 - (u - |u|) \quad y4 = 2 - (v - |v -)$$

On the above assumption, the aforesaid equation is expanded as follows:

$$P = [f(y1) \ f(y2) \ f(y3) \ f(y4)] \begin{bmatrix} P11 \cdot f(x1) + P21 \cdot f(x2) + P31 \cdot f(x3) + P41 \cdot f(x4) \\ P12 \cdot f(x1) + P22 \cdot f(x2) + P32 \cdot f(x3) + P42 \cdot f(x4) \\ P13 \cdot f(x1) + P23 \cdot f(x2) + P33 \cdot f(x3) + P43 \cdot f(x4) \\ P14 \cdot f(x1) + P24 \cdot f(x2) + P34 \cdot f(x3) + P44 \cdot f(x4) \end{bmatrix}$$

$$= f(y1)\{P11 \cdot f(x1) + P21 \cdot f(x2) + P31 \cdot f(x3) + P41 \cdot f(x4)\} +$$

$$f(y2)\{P12 \cdot f(x1) + P22 \cdot f(x2) + P32 \cdot f(x3) + P42 \cdot f(x4)\} +$$

$$f(y3)\{P13 \cdot f(x1) + P23 \cdot f(x2) + P33 \cdot f(x3) + P43 \cdot f(x4)\} +$$

$$f(y4)\{P14 \cdot f(x1) + P24 \cdot f(x2) + P34 \cdot f(x3) + P44 \cdot f(x4)\}$$

$$= P11 \cdot f(x1) \cdot f(y1) + P21 \cdot f(x2) \cdot f(y1) + P31 \cdot f(x3) \cdot f(y1) + P41 \cdot f(x4) \cdot f(y1) +$$

$$P12 \cdot f(x1) \cdot f(y2) + P22 \cdot f(x2) \cdot f(y2) + P32 \cdot f(x3) \cdot f(y2) + P42 \cdot f(x4) \cdot f(y2) +$$

$$P13 \cdot f(x1) \cdot f(y3) + P23 \cdot f(x2) \cdot f(y3) + P33 \cdot f(x3) \cdot f(y3) + P43 \cdot f(x4) \cdot f(y3) +$$

$$P14 \cdot f(x1) \cdot f(y4) + P24 \cdot f(x2) \cdot f(y4) + P34 \cdot f(x3) \cdot f(y4) + P44 \cdot f(x4) \cdot f(y4).$$

The degree of influence f(t) is approximated by the following cubic equation:

$$f(t) = \{\sin(\pi t)\}/\pi t$$

$$\approx \begin{cases} 1 - 2|t|^{}2 + |t|^{}3: & 0 \leq |t| < 1 \\ 4 - 8|t| + 5|t|^{}2 - |t|^{}3: & 1 \leq |t| < 2 \\ 0: & 2 \leq |t| \end{cases}$$

In this cubic method, the degree of influence varies gradually as it approaches from one lattice point to the other lattice point. The cubic method has a characteristic that this variation of the influence degree becomes cubic.

Figure 25:
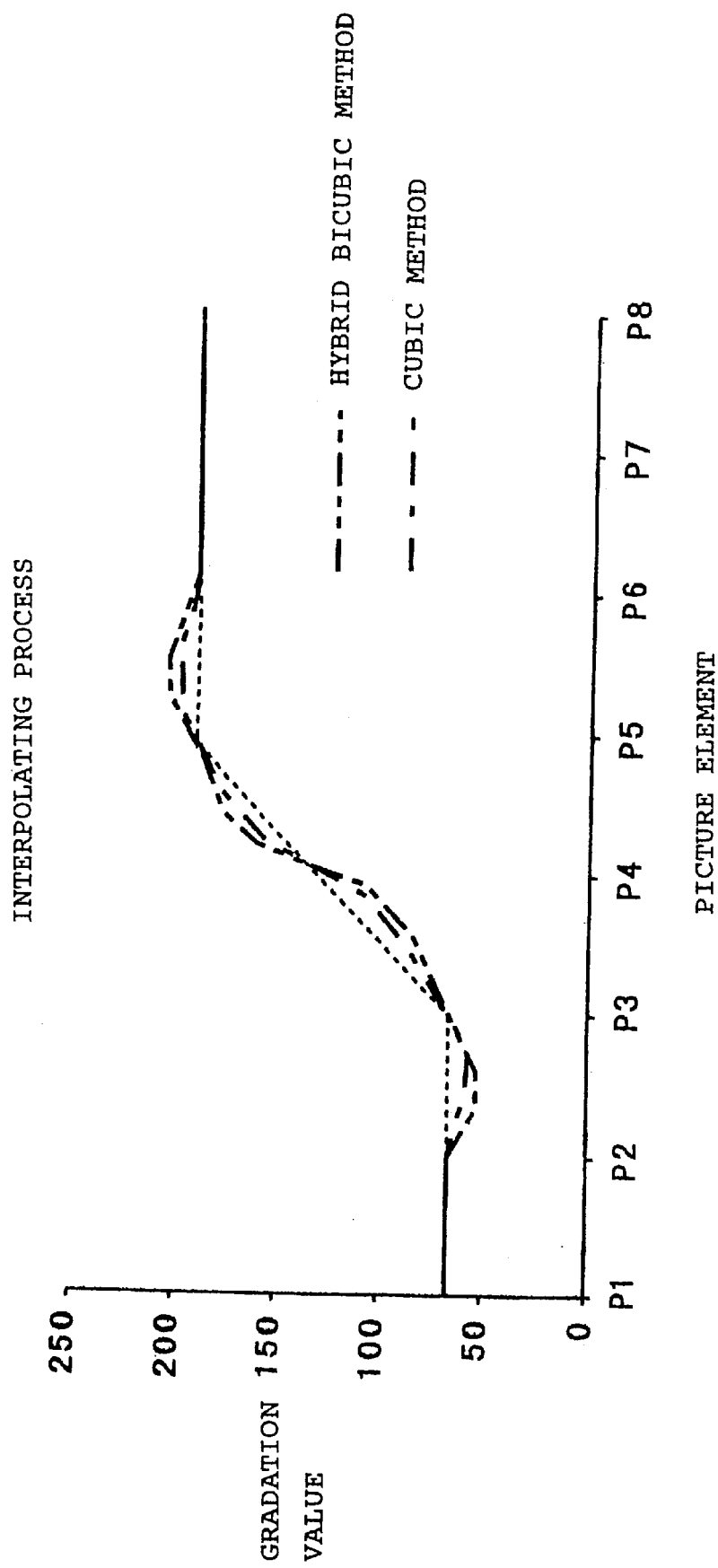
FIG. 25 is a graph showing the relationship between a gradation value and picture elements in the application of the cubic method.

FIGS. 25 and 26 show an example in which the picture element is interpolated by the cubic method. For the purpose of easy understanding, data about the vertical direction is not employed and edges appear in the horizontal direction in the example. Further, three picture elements are to be interpolated in the example. First, numeric values in FIG. 26 will be described. The left-hand headings, "ORIGINAL" denotes gradation values of the picture elements before interpolation. Four picture elements P0, P1, P2 and P3 each having a gradation value of "64" are arranged. Five picture elements P5, P6, P7, P8 and P9 each having a gradation value of "192" are arranged. One picture element P4 having a gradation value of "128" is interposed between the picture elements P3 and P5. The picture element with the gradation value of "128" corresponds to the edge.

When three picture elements Pn1, Pn2 and Pn3 are interpolated between the picture elements, the distance between the interpolated picture elements is 0.25. The aforesaid distances x1 to x4 are shown in the middle part of the table. Functions f(x1) to f(x4) are computed with the respective distances x1 to x4. For example, when the distances x1, x2, x3 and x4 are "1.25," "0.25,", "0.75", and "1.75," the function f(t) is about "−0.14," "0.89," "0.30" and "−0.05," respectively. Further, when the distances x1 to x4 are "1.50," "0.50," "0.50" and "1.50," the function f(t) are about "−0.125," "0.625," "0.625" and "−0.126," respectively. When the distances x1 to x4 are "1.75," "0.75," "0.25" and "1.25," the function f(x) are about "−0.05," "0.30," "0.89" and −0.14," respectively. Gradation values of the interpolation points are computed on the basis of the above-described results. Results of computation are shown in the right-hand column of FIG. 26 under the headings, "CUBIC" and also in the graph of FIG. 25, which graph will be described later.

The computation is simplified when it is assumed that the data about the vertical direction does not vary. With reference only to data (P1, P2, P3 and P4) of the four horizontally arranged lattice points, the degree of influence according to the distance between the interpolation point and each lattice point is computed as follows:

$$P = P1 \cdot f(x1) + P2 \cdot f(x2) + P3 \cdot f(x3) + P4 \cdot f(x4).$$

Accordingly, when the influence degree is computed with respect to the interpolation point P21, $$P21 = 64 * f(1.25) + 64 * f(0.25) + 64 * f(0.75) + 128 * f(1.75)$$

$$= 64*(-0.14063) + 64*(0.890625) + 64*(0.296875) + 128*(-0.04688) = 61$$

Since the influence degree f(t) is expressed as the cubic function in the cubic method, the quality of result of interpolation can be varied by adjusting the shape of a curve thereof. As an example of adjustment, $$0 < t < 0.5 \, f(t) = -(8/7)t^{}3 - (4/7)t^{}2 + 1$$

$$0.5 < t < 1 \, f(t) = (1-t)(10/7)$$

$$1 < t < 1.5 \, f(t) = (8/7)(t-1)^{}3 + (4/7)(t-1)^{}2 - (t-1)$$

$$1.5 < t < 2 \, f(t) = (3/7)(t-2)$$

This will be referred to as "hybrid bicubic method."

FIG. 27 shows results of interpolation by the hybrid bicubic method. In this example, the same model as employed in the cubic method is used. FIG. 25 also shows the results of interpolation by the hybrid bicubic method. In this example, the cubic curve is rendered slightly steep such that the whole image becomes sharp.

Figure 28:
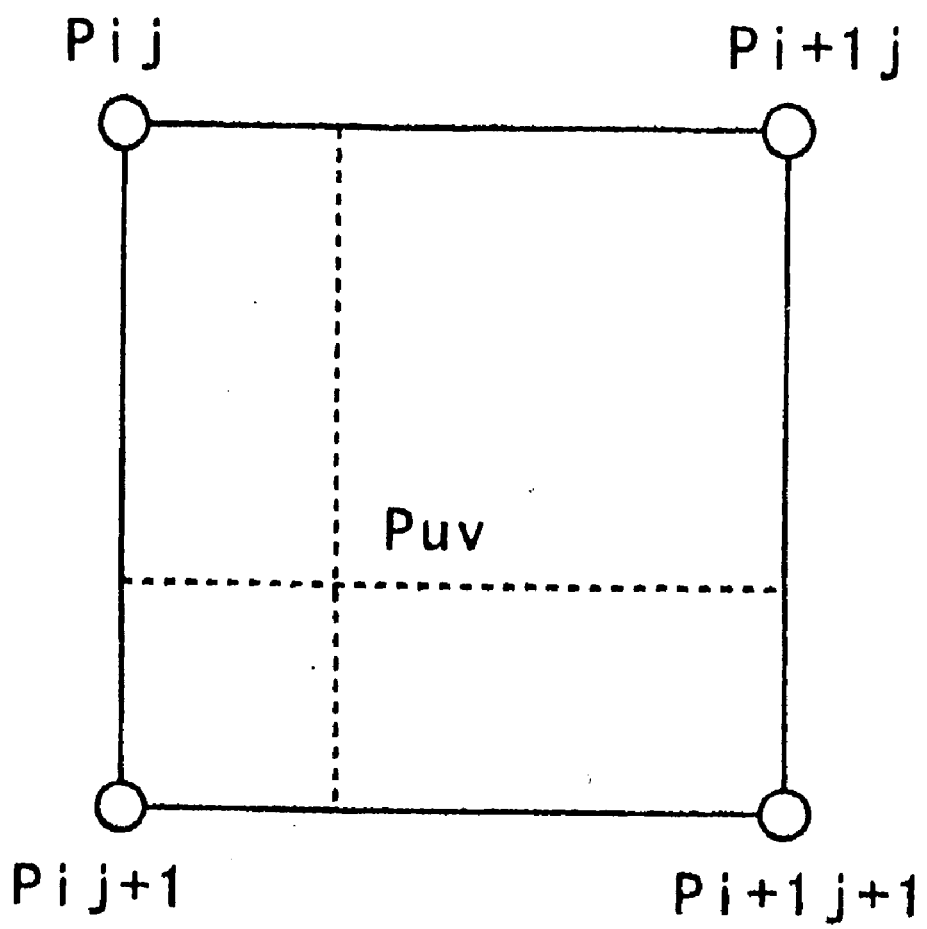
FIG. 28 illustrates a concept of a bilinear method.

Another interpolation method will be described in order that the characteristics of the above-described nearest, cubic and hybrid bicubic methods may be understood. Here, a bilinear interpolation method will be described. Referring to FIG. 28, the bilinear method is similar to the cubic method in that the influence degree varies gradually as it approaches from one lattice point to the other lattice point. However, the bilinear method differs from the cubic method in that the variation is linear and depends upon only data of the lattice points at the opposite sides. More specifically, a region defined by the four lattice points Pij, Pi+1j, Pij+1 and Pi+1j+1 surrounding the interpolation point Puv is divided by the interpolation point into four subdivisions. Diagonally located data is weighted on the basis of area ratios among the subdivisions. This is expressed as the following equation:

$$P = \{(i+1)-u\}\{(j+1)-v\}Pij$$

$$+\{(i+1)-u\}\{v-j\}\}Pij+1$$

$$+\{u-i\}\{(j+1)-v\}Pi+1j$$

$$+\{u-i\}\{v-j\}Pi+1j+1$$

where i=[u] and j=[v].

Figure 29:
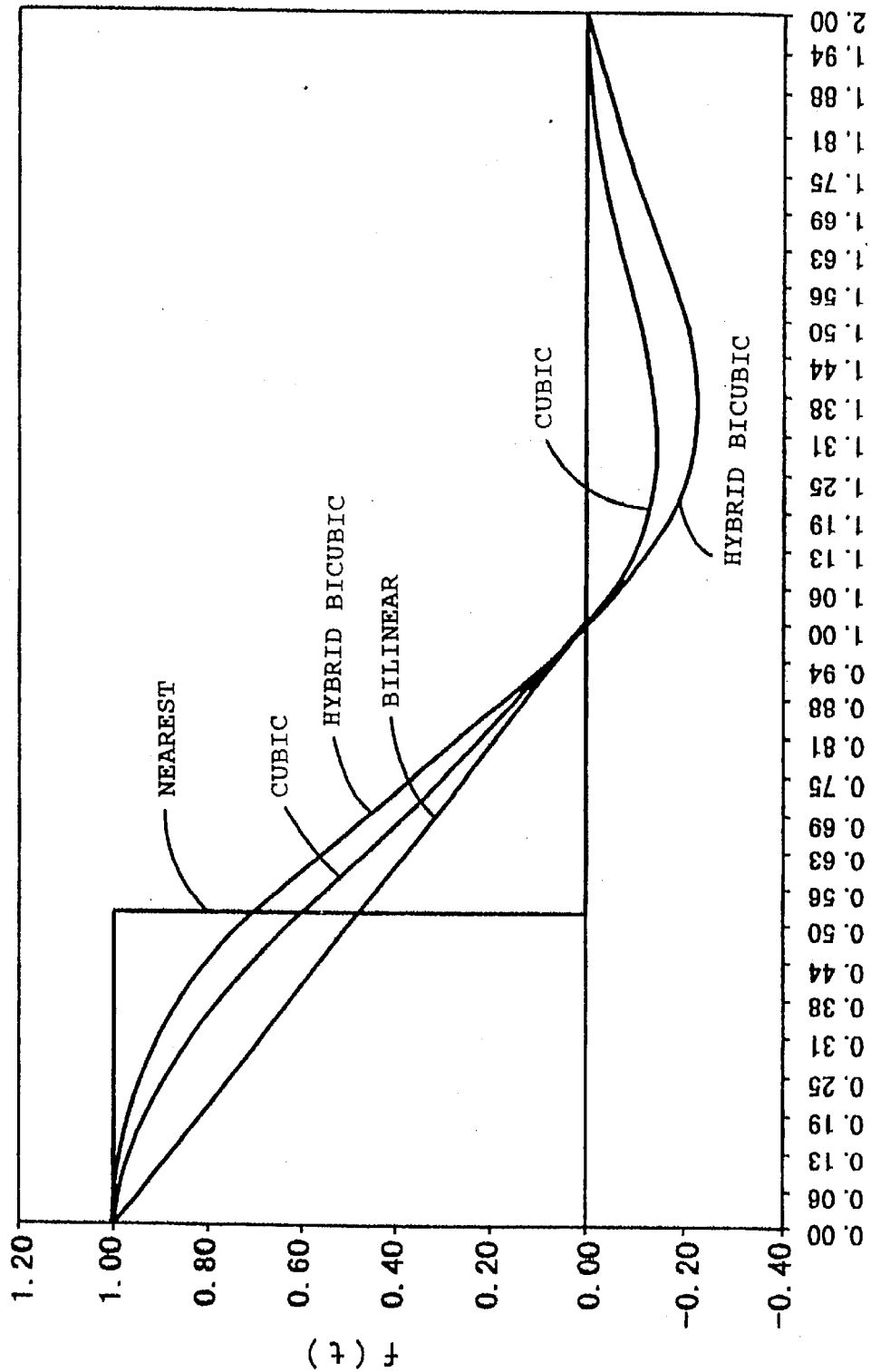
FIG. 29 is a graph showing changes in interpolation functions.

In each of the two cubic methods and the bilinear method, the influence degree varies gradually as it approaches from one lattice point to the other lattice point. However, the variation is cubic in the two cubic methods, whereas the variation is linear in the linear method. This difference is large. FIG. 29 shows the two-dimensional results of interpolations by the nearest, cubic, hybrid bicubic and bilinear methods. The axis of abscissas denotes a location and the axis of ordinates denotes an interpolation function corresponding to the above-described influence degree according to the distance between the interpolation point and each lattice point. The lattice points exists at locations where t=0, t=1 and t=2, respectively. The interpolation points are at locations where t=0 and 1.

In the bilinear method, the interpolation function varies linearly between adjacent points (t=0 and 1). As a result, since marginal portions are smoothed, a resultant image is blurred on the screen. More specifically, when the marginal portions differ from corner portions and are smoothed, an original contour of the image is lost in the case of computer photographics, and the image becomes out of focus in the case of photograph.

On the other hand, in the cubic methods, the interpolation function gradually approximates the lattice point between the adjacent points (t=0 and 1), generating an upward convexity. Further, the interpolation function becomes downwardly concave between adjacent points (t=1 and 2). In other words, one edge portion is varied so as to have such a difference as not to produce a step. As a result, the sharpness is increased and no step is produced in the photograph. Further, the hybrid bicubic method increases sharpness of the image. An amount of computation is large in the cubic method and becomes large as an interpolating scale factor and accordingly the number of picture elements to be interpolated are increased more.

When much importance is laid on the quality of image, the cubic function such as the cubic method may be selected. However, the balance between a processing speed and the image quality is important in the computer. In other words, a tolerance in the decrease of the processing speed becomes large according to the degree of improvement of the image quality. However, a high-speed processing is sometimes preferred even if an amount of improvement in the image quality is slight or the image quality is slightly degraded.

The aforesaid methods can easily be understood with reference to FIGS. 25, 26 and 27 showing concrete values together with the above-described comparison of interpolation functions. Note the picture element P3 with the gradation value of 64, the picture element P4 with the gradation value of 128 and the picture element P5 with the gradation value of 192 in FIG. 15. A technique for simply linearly connecting between the lattice points is the bilinear method. On the other hand, an S-shaped curve is formed in the case of the cubic method, and the S-shaped curve is rendered steeper in the hybrid bicubic method. The S-shaped curve is directed in such a direction that the variation in the gradation value of the picture element is rendered steeper, whereupon the edge is emphasized. Further, an overshoot and an undershoot are produced in the regions (P2 and P3, P5 and P6) adjacent the edge picture element. A difference of elevation between the sides interposing the edge picture element is increased as the result of the undershoot at a lower side and the overshoot at an upper side. Accordingly, it can be understood that the edge is emphasized by these two factors. Further, it can easily be understood that whether an image appears sharp depends on a central inclination in the S-shaped curve. Additionally, the difference of elevation resulting from the undershoot and the overshoot also affects the sharpness of the image.

The above-described interpolating processes have respective characteristics. When it is determined at a step ST208 in FIG. 8 that the image is a non-natural image on the basis of the number of colors found at the step ST206, the interpolating process by the nearest method is executed at a step ST210. When it is determined that the image is a natural image, the interpolating process by the cubic method is executed at a step ST212.

The interpolating process can be executed with any scale factor. However, in order that the processing speed of the printer driver 12c may be improved, an interpolating process with an integer scale factor is rendered acceptable. FIG. 29 shows an example of interpolating process in which the number of picture elements is doubled both in the horizontal and vertical directions. When a variable region is previously secured for image data after the interpolation, image data of an original image is converted by the interpolating process of multiplication by any integer into image data composed of picture elements having coordinate values corresponding to those of the original image multiplied by the integer. In the shown example, old coordinate values (0, 0) correspond to new coordinate values (0, 0) and old coordinate values (1, 0) correspond to new coordinate value (2, 0). Old coordinate values (0,1) correspond to new coordinate values (0, 2) and old coordinate values (1, 1) correspond to new coordinate values (2, 2). Accordingly, image data is generated according to the aforesaid interpolating process with respect only to the remaining coordinate values. In this case, the direction of width of the image data may be a primary scanning direction and the direction of length of the image data may be a second scanning direction, so that the image data is scanned in this order. Further, the interpolating process may be executed for coordinate values in each block defined by four lattice points.

The interpolated image data is delivered to a next stage at a step ST214 when the whole interpolating process is performed for new coordinate values. However, an amount of interpolated image data sometimes becomes excessively large or a memory area assigned to the printer driver 12c is not sometimes large. In these cases, the interpolated image data may be divided so that each subdivision data may be output.

Figures 30A, 30B:
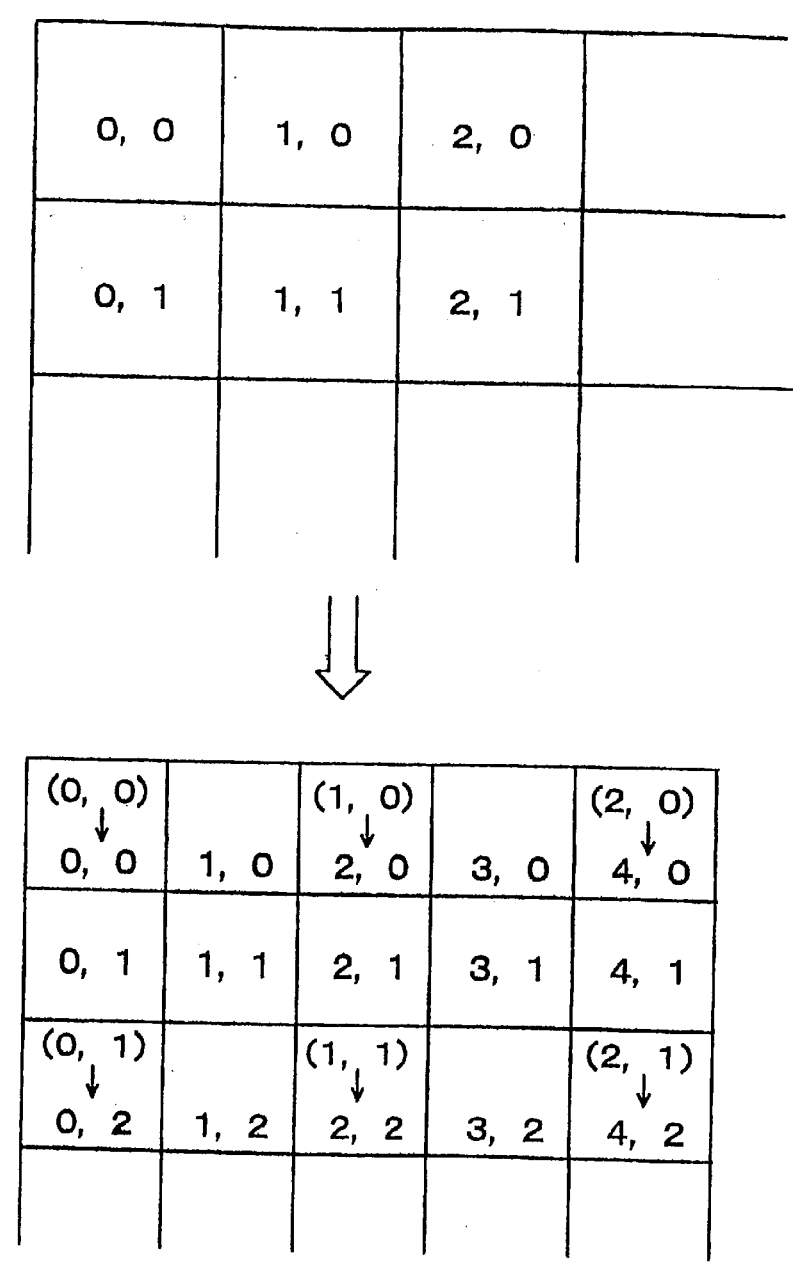

The interpolating process is changed every region in the block at the steps ST116 and ST118 as described above. This will be described in correspondence to a concrete software processing of the printer driver 12c. Referring to FIGS. 30A and 30B, the image data of the lattice points expanded by an integer scale factor are displaced to new coordinate values. The feature amount is obtained every block surrounded by four lattice points, and an interpolating process is selected. Since the number of used colors is summed in the above-described example, the feature amount cannot be used. However, another feature amount may be obtained so that the interpolating process is changed.

For example, differences of the four lattice points are usually found in the case of a natural image. However, when characters are superposed on the natural image, the four lattice points agree with those before the interpolation if the characters have a single color, thereby resulting in no difference. Of course, the picture elements interpolated into a region resulting in the differences may take the same data as the four lattice points. In such a case, the nearest method requiring a smallest amount of computation may be carried out for the interpolation.

Further, the nearest method should not be limited to the case where there is no difference. Deterioration of image quality cannot be determined in many cases even when the nearest method is used for the region which does not change so much, for example, the sky. Accordingly, the interpolation may be carried out by the nearest method when the differences of the four lattice points are small. Although the block is a minimum unit as the region in the above example, the interpolating process may be changed every larger block.

Either the nearest method or the cubic method need not be selected as a selectable interpolating process. For example, when an image is interpolated with a scale factor of "4," the interpolating process may first be carried out by the cubic method so that the image is doubled, and the interpolating process may successively be carried out by the nearest method so that the image is further doubled. In this case, the interpolating process requiring a larger amount of computation is first executed before the number of picture elements is increased by the interpolation, and thereafter, the interpolating process requiring a small amount of computation is executed. In other words, an interpolating scale factor affects the result of interpolation. Accordingly, the printer driver 12c may select the interpolating process when a scale factor has determined as the result of comparison between a reference resolution of the operating system 12a and a resolution of the color printer 17b.

According to the above-described embodiment, the computer system 10 includes the scanner 11a serving as the image input device and the color printer 17b serving as the image output device. In the computer system 10, the printer driver 12c inputs the original image data at the step ST202.

The number of colors used in the image is counted at the steps ST204 and ST206 so that the feature amount is obtained to determine which the image of the image data is, the natural image or the non-natural image. At the step ST208, it is determined that the image is the natural image or the non-natural image on the basis of the feature amount. When the image is the non-natural image, the interpolating process by the nearest method is executed at the step ST210. When the image is the natural image, the interpolating process by the cubic method is executed at the step ST212. Consequently, the interpolating process is executed according to the feature of the image and an optimum result of interpolation can easily be achieved.

In order to carry out the above-described program, the computer 12 comprises the CPU 12e, the RAM 12f, the ROM 12g and the I/O 12h. The RAM 12f serves as an image memory for storing the image data representing the image comprising the dot matrix picture elements. The RAM 12f further stores a processing program. On the processing program, the feature amount relating to the interpolating process is obtained from the image data stored on the image memory, and one of a plurality of interpolating processes capable of obtaining an optimum result of interpolation is selected according to the feature amount. The operating program further instructs the CPU 12a to execute the selected interpolating process and to write the process onto the image memory. The I/O 12h serves as an interface for input and output of the image data.

The CPU 12e executes the basic program written on the ROM 12g to input via the I/O 12h unprocessed image data and output via the I/O 12h the processed image data while carrying out computation using the RAM 12f as a temporary work area or a setting storing area.

In the present invention, when the interpolating process is executed to increase the number of picture elements composing the image data representing the image as the dot matrix picture elements, the picture element interpolating unit is capable of selecting and executing one of a plurality of interpolating processes. The image data obtaining unit obtains the image data to be interpolated. The feature amount obtaining unit obtains a feature amount concerning the image data with respect to the selected interpolating process. The interpolating process selecting unit selects one of the interpolating processes capable of obtaining an optimum result of interpolation according to the feature amount obtained by the feature amount obtaining unit, causing the picture element interpolating unit to execute the selected interpolating process. Thus, the image data interpolation apparatus obtains the feature amount of the image and selects an optimum interpolating process by itself. Accordingly, the invention can provide an image data interpolation apparatus which can readily achieve an optimum result of interpolation since an interpolating process according to the feature of the image is executed.

The image data represents an image as dot-matrix picture elements in the foregoing embodiment. However, any data representing each picture element may be used. The image may be a color image or a monochrome image. Further, the gradation value may be binary or multiple.

The image data obtaining unit is provided for obtaining the image data. The image data obtaining unit may only hold the image data to be interpolated when the picture element interpolating unit carries out the interpolating process for increasing the number of picture elements composing the image. Accordingly, a manner for obtaining the image data is not limited to the one described above but various obtaining manners may be employed. For example, the image data may be obtained via an interface from external equipment. Further, a photographing unit may be provided for photographing the image. Additionally, a computer graphics application may be executed so that the image data is input from a mouse or a keyboard.

The picture element interpolating unit is provided to be selectable one of a plurality of interpolating processes by various manners. Thus, the picture element interpolating unit may only be provided with options achieving different results of interpolation. Accordingly, all the options need not be individual interpolating manners. As one example, the picture element interpolating unit may execute as one option an interpolating process in which a plurality of interpolating processes are successively executed. In this case, two individual interpolating processes provide three options including these individual processes and a process in which the individual processes are successively executed. Consequently, since a plurality of interpolating processes are successively carried out, variations of the interpolating process can be increased.

A constant interpolating process need not be carried out for all the picture elements. As one example, the feature amount obtaining unit may obtain a feature amount for every region of the image and the interpolating process selecting unit may select the interpolating process based on the feature amount obtained every region and cause the picture element interpolating unit to execute the selected interpolating process. In this constitution, the feature amount obtaining unit obtains the feature amount every region of the image. Due to advantages and disadvantages of each interpolating process, a uniform application of each interpolating process is preferable in one case or not preferable in another case. When the application may not be uniform, making the most of the characteristics of the respective interpolating processes is preferred. Accordingly, the interpolating process selecting unit selects the interpolating process based on the feature amount obtained every region and causes it to be executed.

For example, it is difficult to find deterioration in the image quality even when a simple interpolating process is employed for a region where the image does not change. However, the deterioration in the image quality will easily be found when the simple interpolating process is employed for a region where the image changes are fierce. Since picture elements are interpolated between existing picture elements, the interpolating process can be changed with respect to the interpolated picture elements. Consequently, a uniform interpolating process need not be applied to the whole image and accordingly, an optimum result of interpolation can be achieved.

The interpolating process is selected since the result of interpolation differs depending on the interpolating process. There are various feature amounts which are keys for selection of the interpolating process. As one example, the aforesaid picture element interpolating unit is capable of executing the interpolating processes most suitable for the natural and non-natural images respectively. The feature amount obtaining unit obtains the feature amount used to determine which the image represented by the image data is, the natural image or the non-natural image. The interpolating process selecting unit instructs the picture element interpolating unit to execute an interpolating process most suitable for the natural image when it is determined on the basis of the feature amount that the image is the natural image. The interpolating process selecting unit instructs the picture element interpolating unit to execute an interpolating process most suitable for the non-natural image when it is determined on the basis of the feature amount that the image is the non-natural image.

In the above-described arrangement, when the picture interpolating unit is capable of executing interpolating processes most suitable for the natural and non-natural images respectively, the feature amount obtaining unit obtains a feature amount which can determine which the image represented by the image data is, the natural image or the non-natural image. The interpolating process selecting unit instructs the picture element interpolating unit to execute an interpolating process most suitable for the natural image when it is determined on the basis of the feature amount that the image is the natural image. The interpolating process selecting unit instructs the picture element interpolating unit to execute an interpolating process most suitable for the non-natural image when it is determined on the basis of the feature amount that the image is the non-natural image. Consequently, the interpolating processes most suitable for both of the natural and non-natural images respectively can be selected.

The natural image means a photograph, whereas the non-natural image means computer graphics such as business graph. The natural image has a characteristic that a multiple of colors are used and the non-natural image has a characteristic that the number of colors used is smaller. Of course, other characteristics may be used. The picture element interpolating unit is capable of executing the interpolating processes most suitable for the respective natural and non-natural images characteristically differing as described above.

More specifically, the picture element interpolating unit may execute the interpolating process by the nearest interpolation method for the non-natural image and the interpolating process by the cubic convolution interpolation method for the natural image. Consequently, a merit of high-speed processing is achieved in the case of the non-natural image. A merit of retention of sharpness is achieved in the case of the natural image.

The natural and non-natural images differ in an expression amount per picture element a high-speed processing is possible in the nearest method since the processing is simple. However, the nearest method can result in unnaturalness in the natural image. On the other hand, the processing is complicated in the cubic method although the sharpness of the image can be retained. Accordingly, a load of computation required for the interpolating process is large and much processing time is required.

In view of the above-described advantages and disadvantages, the interpolating process is executed by the nearest method for the non-natural image. As a result, a high-speed processing can be expected. Since the interpolating process is executed by the cubic method for the natural image, the image sharpness is retained.

The feature amount obtaining unit obtains a feature amount with respect to the image data. The feature amount itself relates to the interpolating process. For example, the feature amount is obtained by determining which the image is, the natural image or the non-natural image, as described above. However, there are various manners of obtaining the feature amount. As one example, the feature amount obtaining unit may sum data of respective picture elements in the obtained image data on the basis of a predetermined criterion and obtain a feature amount for determining the type of image represented by the image data. In this arrangement, the feature amount obtaining unit sums the data of the respective picture elements on the basis of the predetermined criterion or more specifically, obtains the feature amount used to determine the type of the contents of the image from the image data itself. Of course, various statistical methods can be employed for the summation. A histogram is an example. Consequently, since the image data is summed so that the type of the image is determined, an optimum interpolating process can be selected even when there is no other information.

Data to be summed is the number of colors used, for example. When it is considered that an operator drawing or painting a picture etc. designates colors in the computer graphics, a large number of colors cannot be used. Particularly the business graph shows this tendency. On the other hand, even the natural image of a single color may be considered to have a multiple of colors due to the influence of light. In this case, the number of colors used is extremely increased. Accordingly, when the number of colors used is summed regarding the image data, it can be determined which the image is, the natural or non-natural image.

The number of colors used need not be strictly summed. For example, a histogram of the luminance of each picture element may be summed so that the number of colors used is determined on the basis of frequency of use of each luminance. In the natural image, to find a relation between the luminance histogram and the number of colors used is difficult. However, this can easily be understood when the business graph is supposed. The business graph has a small number of colors used. Only several colors are used in many colored graphs. In such a case, a histogram of luminance takes the form of a spectrum. Since different colors can take the same luminance, the frequency of luminance used does not necessarily correspond to the number of colors used. However, whether the number of colors used is small or large can easily be understood. For example, in the case of a natural image, shading reliably increases the frequency of luminance used. A histogram in this case is supposed to take the form of a continuous curve rather than the spectrum.

The luminance itself may not be precise for the same reason as described above. For example, a precise luminance of RGB image data cannot usually be obtained only by computation. However, the luminance is obtained from RGB by a simple weighting addition in the television. Such an easy method is usable.

The determination as to whether the histogram takes the form of the spectrum or the curve is drawn from the result of summation. This determination may be used to determine which the image is, the natural image or the non-natural image and may be determined to be a feature amount. Further, the feature amount may be obtained from a view point as to whether an image is bright other than as to whether the image is a natural image. Thus, when there are interpolating processes suitable for a bright image and a dark image respectively, either interpolating process can be selected. Further, variation degrees of respective picture element data may be summed. When a picture is drawn by the computer graphics, the variation degree equals to the times the operator has drawn. In a natural image of a scene, an amount of information is enormous and appears as a magnitude of variation degrees of picture elements. Consequently, the type of image can be determined from the variation degree between the picture elements.

On the other hand, since the feature amount obtaining unit is directed to determination of the image, only the image data necessary for the determination may be summed. In this meaning, the feature amount obtaining unit may extract and sum the data of a part of picture elements composing the image. In this arrangement, the gradation values of a part of the picture elements composing the image data are extracted and summed.

Various methods of extraction may be employed here. As a simple method, the picture elements may be selected at random to be summed. A specific object may befound and summed. Further, a tendency of summation result may be estimated while the summation is being performed. In the case of determination as to which the image is, the natural image or the non-natural image, when it is found that a color includes its gentle peripheries, the image may be determined to be the natural image at that time. Further, the determination is made at the time it is known that an extremely large number of colors seem to be used. Consequently, the processing speed can be increased since not all the image data are summed.

Further, when a computer is supposed, the image data is processed as a file, and the type of the image can be determined on the basis of a file format. Accordingly, the feature amount obtaining unit may be constituted so as to obtain a feature amount based on the format of the image data. For example, the natural image is often compressed by a JPEG mode. Accordingly, when the format of the image data is the JPEG mode, the image may be determined to be the natural image. Further, the business graph is often attached with a file extension representative of an application for output of the graph. Consequently, the type of the image can be determined on the basis of such an extension. Thus, since the type of the image is determined on the basis of the format of the image data, a processing amount can be reduced as compared with the case where the image data is analyzed.

On the other hand, the feature amount relating to the interpolating process may not necessarily be a kind of the image type. Accordingly, the feature amount obtaining unit may obtain an executed interpolating scale factor as the feature amount. The interpolating scale factor also relates to the result of interpolation. For example, the image does not become rough while the interpolating scale factor is small. However, the image sometimes becomes rough as the interpolating scale factor becomes higher. In the latter case, the interpolating process needs to be complicated. Therefore, the feature amount obtaining unit obtains the interpolating scale factor. In this case, a threshold value of the interpolating scale factor is changed according to the interpolating processes to be selected. The threshold value can be varied stepwise when one interpolating process is changed to another interpolating process. Consequently, an optimum interpolating process can be selected on the basis of a factor other than the type of the image data.

Figure 31:
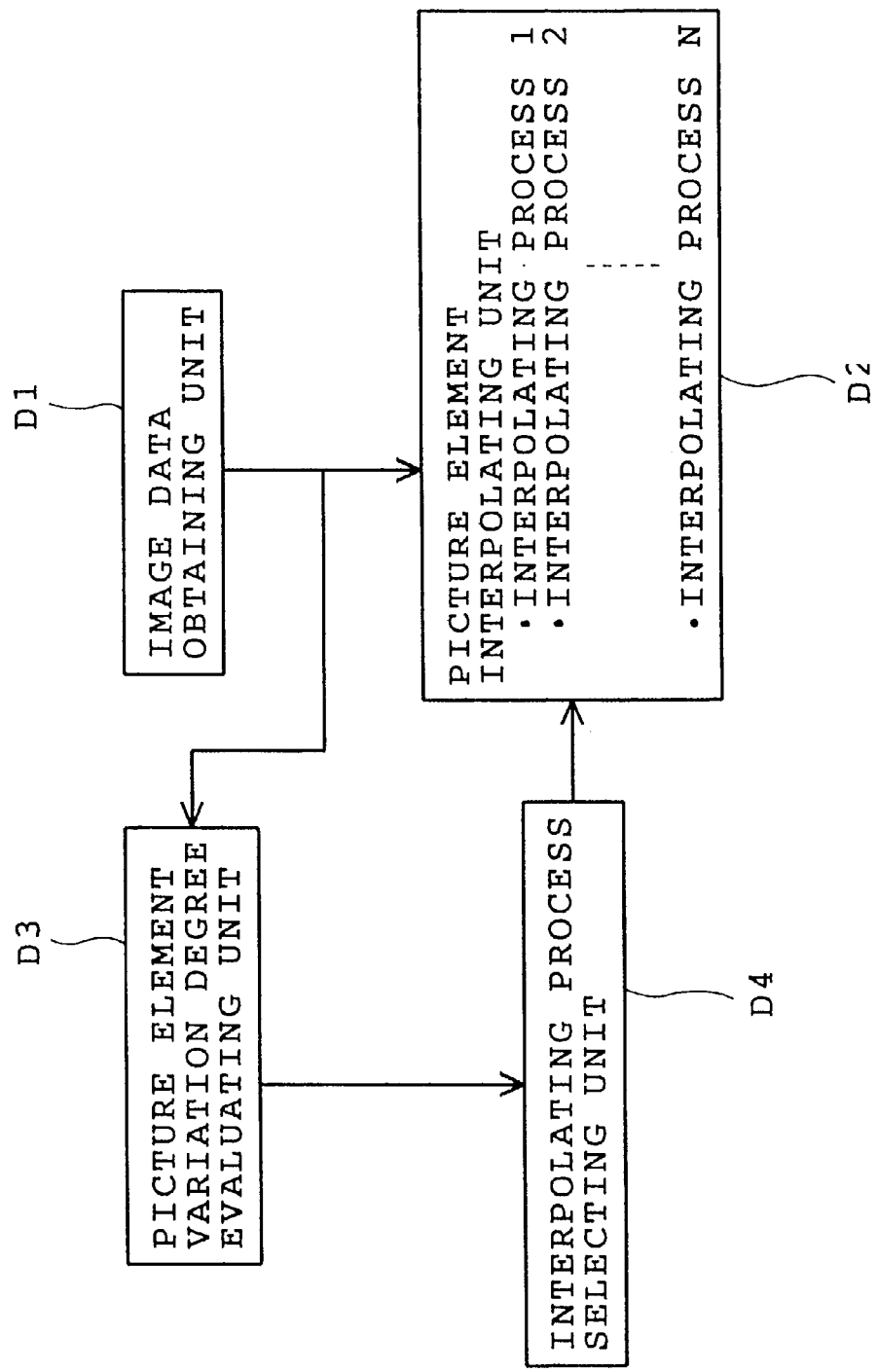
FIG. 31 is a schematic block diagram showing the image data interpolation apparatus of one embodiment in accordance with the invention.

Another embodiment in which the above-described variation degree of the image data is a feature amount will be described. FIG. 31 is a block diagram showing the image data interpolating apparatus of the embodiment. The image data interpolating apparatus of the embodiment is provided for scaling up the image in the unit of picture elements. The apparatus comprises an image data obtaining unit D1, a picture element interpolating unit D2, a picture element variation degree evaluating unit D3, and an interpolating process selecting unit D4. The image data obtaining unit D1 obtains image data. The picture element interpolating unit D2 carries out an interpolating process for increasing the number of constituent picture elements of the obtained image data. The picture element interpolating unit D2 is capable of carrying out a plurality of interpolating processes according to variation degrees of picture elements. The picture element variation degree evaluating unit D3 evaluates a variation degree every picture element based on the obtained image data. The interpolating process selecting unit D4 selects one of the interpolating processes capable of achieving an optimum result of interpolation according to the evaluated variation degrees of the picture elements. The interpolating process selecting unit D4 further instructs the picture element interpolating unit D2 to execute the selected interpolating process.

Figure 32:
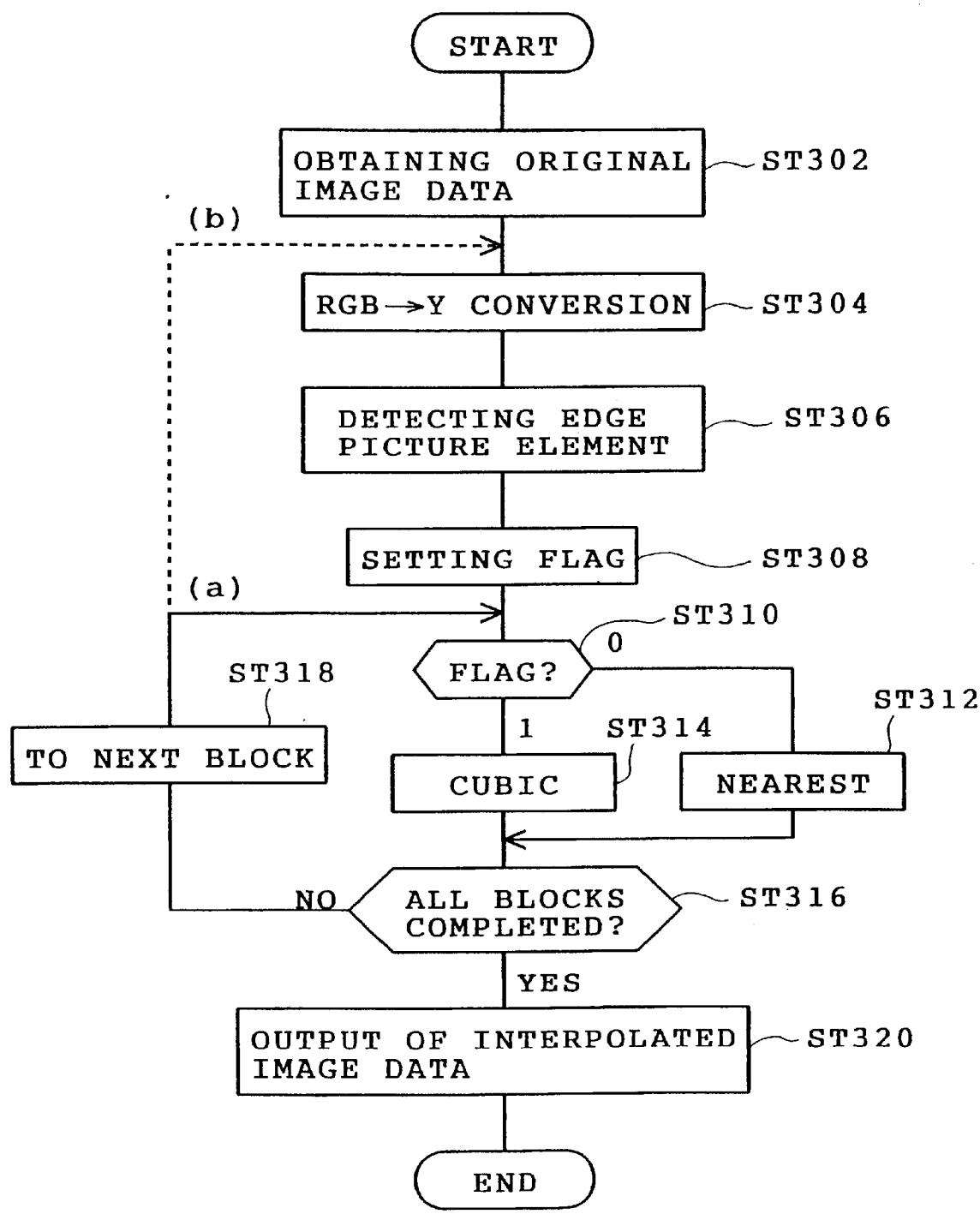
FIG. 32 is a flowchart of interpolating process performed by the image data interpolation apparatus.

In the embodiment, the display driver 12b and the printer driver 12c accomplish the picture element variation degree evaluating unit D3 and the interpolating process selecting unit D4 as well as the picture element interpolating unit D2, so that a well-balanced result of interpolation can be achieved in the resolution conversion, as will be described later. FIG. 32 is a flowchart showing the resolution conversion carried out by the printer driver 12c, original data is obtained at a step ST302. Variation degrees of picture elements are evaluated at steps ST304 to ST308.

The luminance is found by the simplified computation as described above. FIGS. 33A–33C and 34A–34C illustrate edge detecting filters respectively. Since the image data comprises dot matrix picture elements, a variation degree of the image should be evaluated between eight picture elements neighboring a noted center picture element. In this meaning, it is preferable that the peripheral picture elements are equally evaluated and summed with the noted picture element given a weighting factor of "8," as shown in FIG. 34A. However, from experience, the eight peripheral picture elements need not be used but the evaluation can be performed by using only the noted picture element and the four peripheral picture elements as shown in FIG. 33A. There is a large difference in an amount of computation between the use of the eight picture elements and the use of the four picture elements. A processing time can be decreased when the number of objects to be evaluated is reduced.

FIGS. 33B and 34B show actual examples of image data (luminance) respectively. FIGS. 33C and 34C show computation examples in which the filters shown in FIGS. 33A and 34A are applied to the arrangements of the image data shown in FIGS. 33B and 34B respectively. In each image data, an area of image data "100" is at the left-hand obliquely upper side, whereas areas of image data "70" and "60" are at the right-hand obliquely lower side. In the example of FIGS. 33A–33C, the weighting of "−1" is added to each of the upper, lower, left-hand and right-hand picture elements (image data of "100," "100," "70" and "70") relative to the center one. Weighting of "4" is added to the center picture element (image data of "100"). Weighting addition is performed with respect to these five picture elements. A result of the weighting addition is "60," which exceeds a threshold value (th) of "32."

On the other hand, in the example of FIGS. 34A–34C, the weighting of "−1" is added to each of eight picture elements neighboring the center picture element. Weighting of "8" is added to the center picture element. A result of the weighting addition is "100," which value exceeds a threshold value (th) of "64."

Figure 35:
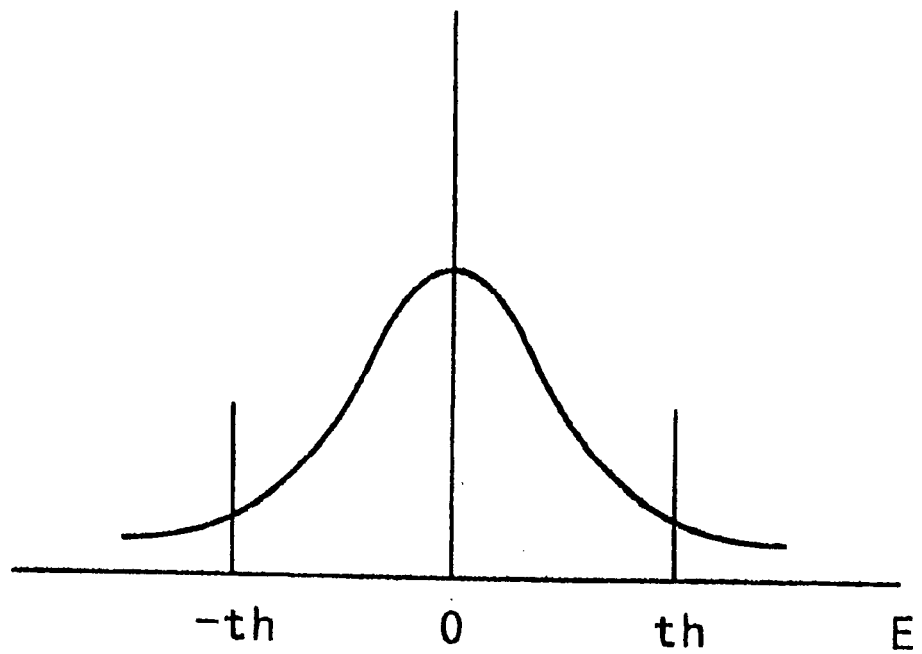
FIG. 35 is a graph showing a relation between an edge amount distribution and a threshold value.

Each of the results of use of edge detecting filters shown in FIGS. 33A and 34A are referred to as "edginess amount E" of each picture element. It is expected that the distribution of the edginess amount E becomes normal as shown in FIG. 35. Whether an edge part has a large variation degree of image can be determined by the comparison of the edginess amount E with the threshold value (th). Threshold values of the edginess amount, "32" and "64" are applied to the edge detecting filters shown FIGS. 33A and 34A respectively. Accordingly, whether the picture element is an edge picture element is evaluated by the following expression:

$$(E < -th) \text{ or } (th > E).$$

This evaluation is carried out for all the dot matrix picture elements at a step ST306.

Figure 36:
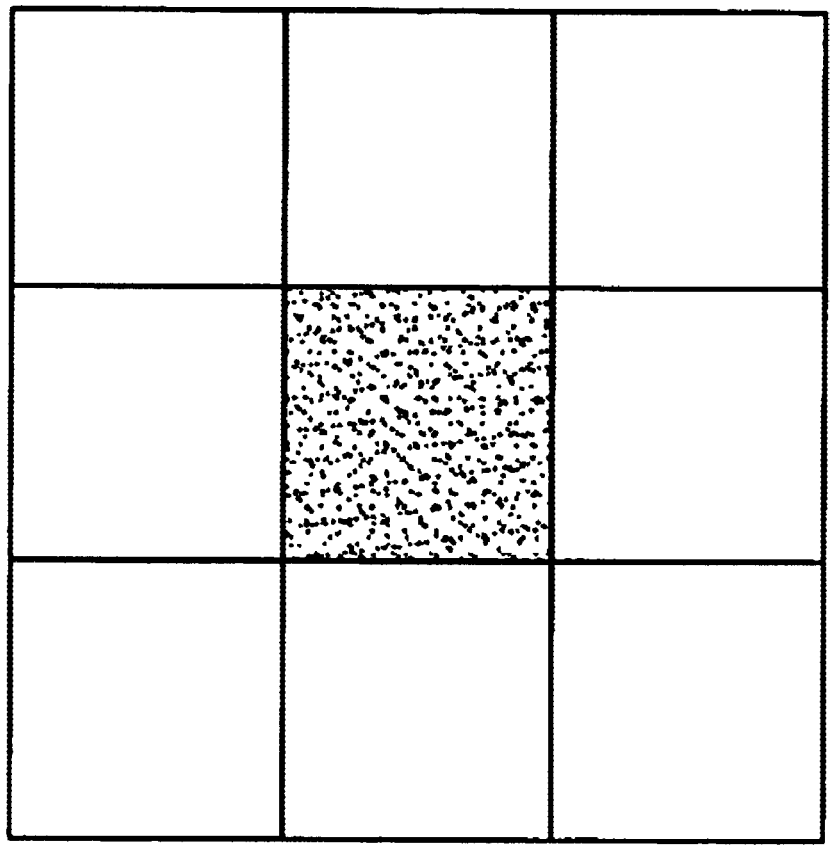
FIG. 36 illustrates a relation between a noted picture element and the picture elements which are objects in the determination of flag setting.

Even though it is determined whether the variation degree of the image is large in the picture element, it is necessary to determine whether the image variation degree is large in the area since the interpolating process is a process for generating picture elements every predetermined area. To determine the variation degree every area is troublesome. Then, it is previously determined whether the picture element is an edge picture element and a flag is set at a step ST308. In this case, it is determined that the variation degree of the image is large in each of all the picture elements neighboring the edge picture element, as shown in FIG. 36. More specifically, assume a case where the variation degree of each picture element is shown as in FIG. 37A. When the threshold value is "32," the picture elements exceeding the threshold value are shown by xy coordinates as (0,0), (3, 0), (4,0), (1, 1) and (2,1). However, flags are set to the picture elements adjacent to the edge picture element. As a result, when a noted block is displaced in the unit of picture element at a subsequent step, the interpolating process can be selected only by reference to the flags.

In the embodiment, the steps ST304 to ST308 constitute a picture element variation degree evaluating step. When considered to be integrally combined with hardware such as CPU, these steps constitute a picture element variation degree evaluating unit D3.

Figure 38:
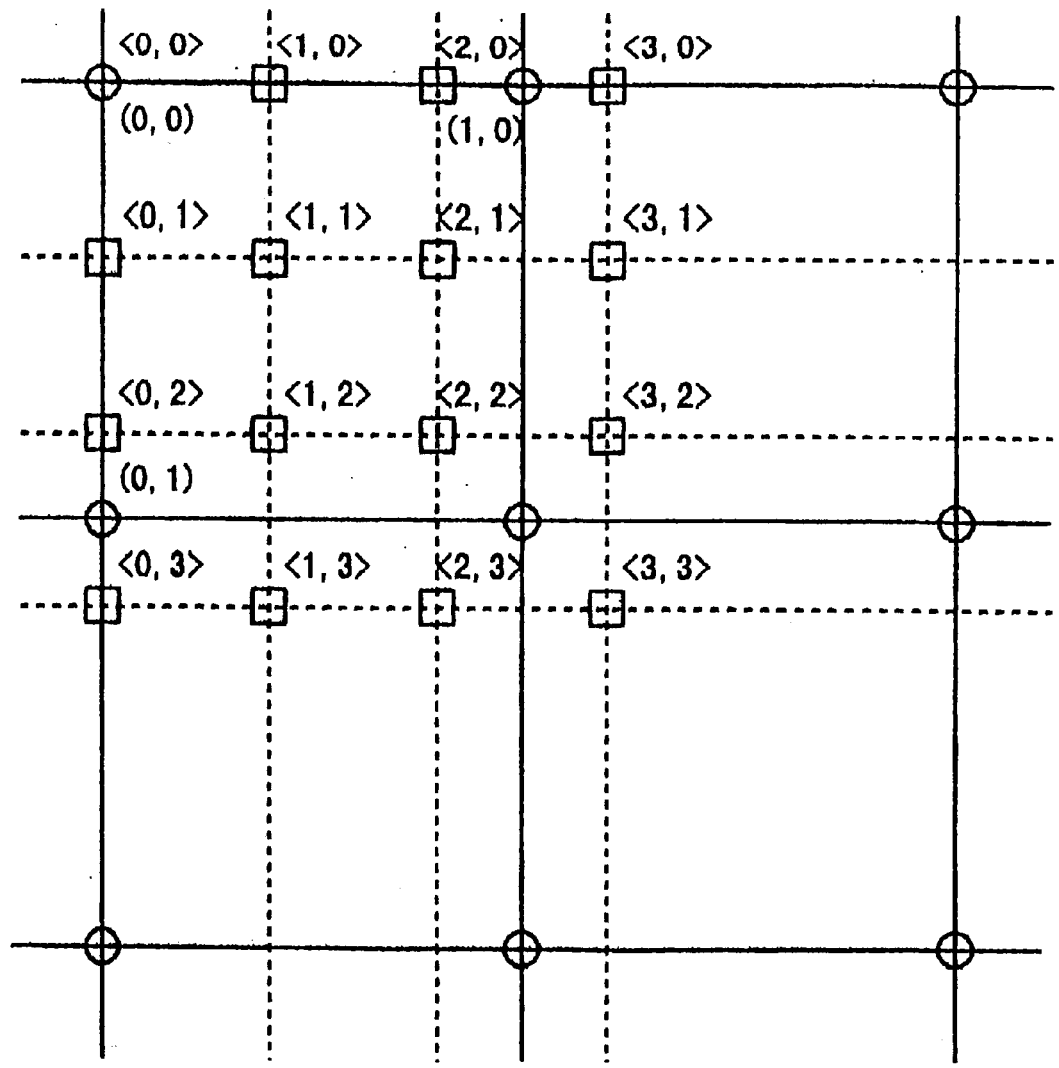
FIG. 38 illustrates a relation between a block of existing picture elements and interpolated picture elements.

Interpolation picture elements are generated in a loop processing on the basis of the flags set as described above at a step ST310 and subsequent steps. FIG. 38 schematically shows the arrangement of picture elements generated by the interpolation of existing picture elements. The existing picture elements are shown by the coordinates (X, Y), whereas the picture elements generated by the interpolation are shown by the coordinates <X, Y>. In the shown example, an interpolating process of about 2.5×2.5 times has been executed.

A region surrounded by existing four picture elements is referred to as "block" and an interpolating process is selected every block. At a step ST308, the flag is set every picture element with the variation degrees of the peripheral picture elements being taken into account. Accordingly, an interpolating process for the case of a large variation degree is selected when the flags are set regarding all the four picture elements (0, 0), (1, 0), (0, 1) and (1, 1) in each block. An interpolating process for the case of a small variation degree is selected when the flag is not set regarding any one of the picture elements. At a step ST310, an interpolating process to be applied to the block is determined on the basis of this condition. The interpolating process by the nearest method is executed at a step ST312 when the variation degrees are small. When the variation degrees are large, the interpolating process by the cubic method is executed at a step ST314. After the interpolating process has been completed regarding one block, the block to be processed is displaced at steps ST316 and St318. Upon completion of the interpolating processes regarding all the blocks, interpolated image data is output at a step ST320. The processing sequence returns to the step ST310 after completion of the step ST318 as shown by solid line in FIG. 32. However, the process for summing the edge picture elements may be repeated every block as shown by broken line in FIG. 32. Accordingly, the steps ST310, ST316 and ST318 correspond to an interpolating process selecting step. When considered to be integrally combined with hardware such as CPU, these steps constitute the interpolating process selecting unit D4. Print data is not obtained only by the resolution conversion in the printer driver 12c. A color conversion and a half-tone processing are further required. Accordingly, output of the image data means delivery of the image data to a next stage.

The interpolating process is selected every block in the embodiment. However, the criterion for changing the interpolating process may be changed according to a computation capacity or interpolating process. For example, FIG. 39 shows a case where the interpolating process is executed for every region with a noted picture element at its center. In this case, the interpolating process is carried out with the noted picture element being displaced, scanned.

Figure 40A:
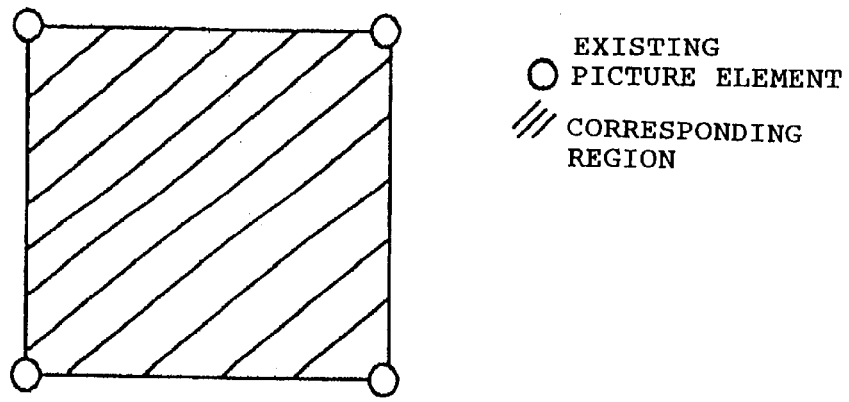
FIGS. 40A and 40B illustrate correspondence of condition of a flag and the region.
Figure 40B:
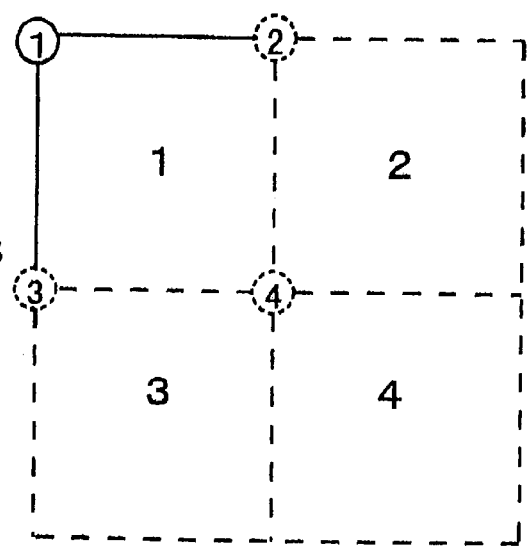

A manner of selecting the interpolating process with the noted picture element being displaced will now be described. In the above-described example, when it is determined every block whether the variation degree is large, it is determined that the variation degree of the image is large only when all the flags in the region are set at "1." However, all the flags need not be set at "1." For example, assume a case where a picture element is generated by the interpolating process in a region surrounded by four picture elements as shown in FIG. 40A. In this case, the flags are set for the picture elements adjacent to the edge picture element in FIG. 36. Accordingly, it can be determined that the variation degree is large only when the flags are set for all the four picture elements respectively. In this case, however, since the vertical side is common when the block is horizontally displaced by one picture element, the determination is duplicated regarding two vertical picture elements every time. When the block is vertically displaced, the horizontal side is common and the determination is duplicated regarding two horizontal picture elements. Such duplication is useless in the computation. On the other hand, when adjacency of the regions shown in FIG. 40B is taken into consideration, upper left-hand picture elements of the respective regions may be represented and correlated or there is no problem if it is determined that the variation degree is larger at least in the vicinity of a picture which can be treated alike as the edge picture element. This determination is sufficient from the fact that the number of a region surrounded by adjacent picture elements is actually exceedingly small. If one region thus corresponds to one picture element, the noted picture element is displaced when the block is displaced, so that the variation degree of the region can be determined only on the basis of an edge amount of the noted picture element. Consequently, an amount of computation required for the determination can be reduced.

Figure 41:
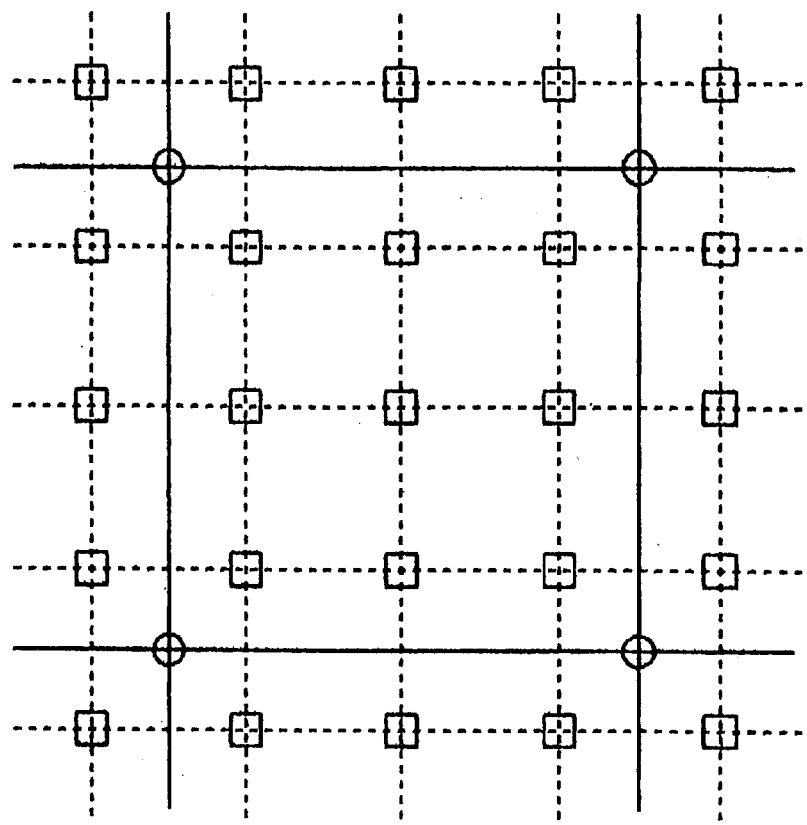
FIG. 41 illustrates a case where a block is formed by interpolated picture elements.

Further, the block may be formed at the side of an interpolated picture element. FIG. 41 shows an example of this case. Each lattice point marked with □ denotes an interpolated picture element and each lattice point marked with ○ denotes an existing picture element in FIG. 41. Consider a block of 5×5 interpolated picture elements. Whether the image variation degree is large in the region is determined on the basis of an edginess amount of an existing picture element in the block. In this case, one block is defined and the existing picture elements in the block are extracted. An integrated value of the edginess amounts of the existing picture elements is found. The picture elements are generated by the same interpolating process in the block.

The block may be set so that a larger region is provided. For example, a block of 10×10 picture elements can be set. Further, the edge amounts of existing picture elements surrounding an interpolated picture element may be determined without setting the blocks, so that the interpolating process is selected. In an example shown in FIG. 41, the inwardly arranged lattice points of 3×3 marked with □ are included in four existing lattice points marked with ○. When each of the lattice points marked with □ is generated, an interpolating process may be selected on the edginess amounts regarding the four existing lattice points marked with ○ and surrounding it. This processing may be realized when it is convenient for the computation purpose. In other words, after a block to be interpolated is previously be specified and the interpolating process to be executed is determined, the picture elements may be interpolated into the block, or the block may be determined every picture element to be interpolated so that the interpolating process is selected.

Further, the flag is previously set for the picture element adjacent to the edge picture element at the step ST308 and the flag is referred to every block. However, the block may be displaced as shown by broken line in FIG. 32, instead. In this case, the flag need not be set, and the edge amounts of the picture elements surrounding the block are determined so that the interpolating process is selected.

The steps ST312 and ST314 in which different interpolating processes are executed correspond to an picture element interpolating step. When considered to be integrally combined with hardware such as CPU, these steps constitute the picture element interpolating unit D2. These interpolating processes will be described in detail. This relation results from a case where in the interpolation function shown in FIG. 29, the inclination is steep in the section of t=0 to 1 and the curve is drawn toward the negative side so as to deny the increased weighting. Accordingly, in order that sharpness adjustment may be realized, an ideal inclination serving as a basis of sharpness in the interpolation function is first determined, and the curve is determined which produces the inclination in the section of t=0 to 1. Then, the curve is determined which is drawn toward the negative side so as to deny the weighting increased by the curve and produces overshoot and undershoot weighting in the section of t=1 to 2. Thereafter, parameters of an operation function are determined so that the specified curve is obtained. There are various manners of determining the parameters. Substantially, an inclination angle of the central portion of the S-shaped curve, undershoot and overshoot are adjusted.

There are differences in the characteristics between the interpolating processes, and the interpolating process by the nearest method is executed at the step ST312 for the block for which it is determined at the step ST310 that the image variation degree is small. Regarding the block for which it is determined that the image variation degree is large, the interpolating process by the cubic or hybrid bicubic method is executed. When the interpolation process by the cubic method, a computation time becomes enormous, but it is changed to the nearest method in a part in which the image variation degree is small. Consequently, the whole computing time is reduced. Particularly, when a predetermined region is painted in the same color as in the computer graphics, there is no problem if the nearest method is executed uniformly. This reduces the processing time. Further, even in the natural image, a part where a jag is conspicuous when it is expanded is not usually large in the area ratio. Accordingly, the processing amount can be reduced without deterioration of image quality due to sequential switching of the image variation degree.

Figure 42:
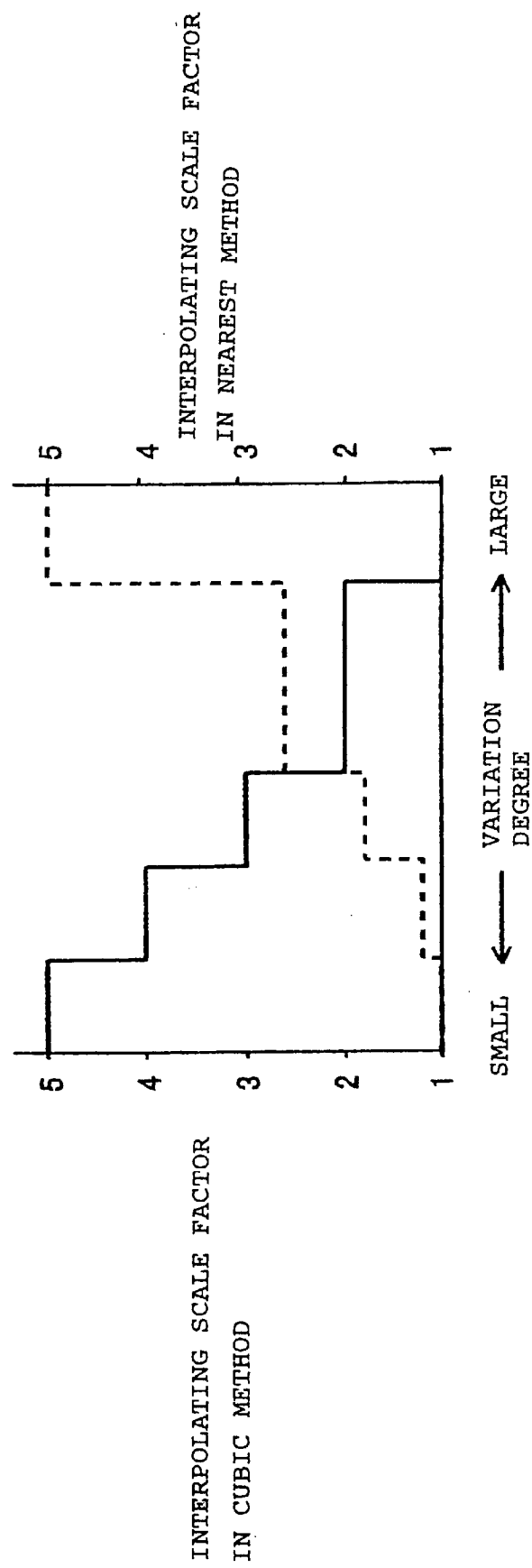
FIG. 42 is a graph showing a relation in which an interpolating scale factor is divided into a plurality of interpolating processes according to a changing degree of the image.

In the above-described embodiment, either one of the two interpolating processes is executed depending on the flag. However, a plurality of interpolating processes may be executed which stepwise correspond to the variation degrees of the picture elements, instead. Further, two interpolating processes may successively be executed and the scale factor may correspond to the image variation degree, as shown in FIG. 42. For example, when the interpolating scale factor is "5" and the image variation degree is small, the interpolating process by the nearest method is executed so that the image is quintupled. When the image variation degree is large, the interpolating process by the cubic method is executed so that the image is quintupled. These cases are similar to the above-described embodiment. When the image variation degree takes a middle value, the interpolating process by the cubic method is executed with respect to the scale factor of "2" and the interpolating process by the nearest method is executed with respect to the remaining scale factor of "2.5." Thus, a plurality of interpolating processes can substantially be selected according to the image variation degree although two interpolating processes are executed. As described above, the interpolating scale factor is an integer one for the interpolating process requiring a large amount of computation, for example, the cubic method.

In the computer system 10 provided with the image input device and the image output device, the printer driver 12c inputs the original image data at the step ST302 and thereafter, detects the image variation degree to set the flags at the steps ST304 to 308. The flags are referred to at the step ST310 so that the interpolating process by the nearest method is executed at the step ST312 for the blocks in which the image variation degree is small. The interpolating process by the cubic method is executed at the step ST314 for the blocks in which the image variation degree is large. Accordingly, the control is carried out so that the nearest method is executed as far as the image quality is not deteriorated. Consequently, an optimum interpolating process can automatically be selected and an amount of computation can be reduced.

As described above, the invention comprises an image data obtaining unit for obtaining image data representing image as dot matrix picture elements, a picture element variation degree evaluating unit for evaluating variation degrees of the picture elements based on the image data, a picture element interpolating unit capable of selectively executing one of a plurality of interpolating processes when the image data is interpolated so that the number of constituent picture elements thereof is increased, and an interpolating process selecting unit for selecting one of the interpolating processes capable of obtaining an optimum result of interpolation according to the variation degrees of the picture elements evaluated by the picture element variation degree evaluating unit, based on the variation degrees and causing the picture element interpolating unit to execute the selected interpolating process.

In the invention thus constituted, the picture element interpolating unit is capable of selectively executing one of a plurality of interpolating processes when the interpolating process is executed for increasing the number of constituent picture elements of image data representing image as dot matrix picture elements. When the image data obtaining unit obtains the image data, the picture element variation degree evaluating unit evaluates variation degrees of the picture elements based on the image data. Based on the variation degrees of the picture elements evaluated by the picture element variation degree evaluating unit, the interpolating process selecting unit selects one of the interpolating processes capable of obtaining an optimum result of interpolation according to the variation degrees and causes the picture element interpolating unit to execute the selected interpolating process.

Since the variation degree of the picture element has a close relation with a concrete method of the interpolating process, the variation degree of the picture element is evaluated and the interpolating process is positively changed, whereby an efficient interpolating process is realized.

As described above, the invention can provide an image data interpolating apparatus capable of easily obtaining an optimum result of interpolation by changing the interpolating process according to the variation degree of the image.

The picture element variation degree evaluating unit evaluates the variation degree of the image, and an evaluating method and a result of evaluation should not be limited and are changeable according to a mode of use of the evaluation result in the interpolating process selecting unit. For example, numeric values may be output when the concrete variation degree is required as the numeric values. When merely information as to whether the variation degree is large is necessary, such information may be output. Further, how to grasp variations in the picture element may be changed. As one example, the picture element variation degree evaluating unit may find a parameter of brightness of each picture element and calculate the variation degree by comparison of the found parameter of brightness with those of the peripheral picture elements.

In the above-described arrangement, the brightness of the picture element is used as a criterion for evaluation of the picture element. The picture element variation degree evaluating unit finds a parameter of brightness of each picture element and compares the parameter of each picture with those of the peripheral picture elements, calculating a result of comparison as the variation degree.

The variation degree of the picture element can be grasped by other manners. However, the parameter of brightness is relatively easy when the picture element represented by a multi-element parameter is uniformly grasped. Consequently, since the variation degree of the picture element is determined on the basis of the brightness parameter, the variation degree can be found relatively easily.

On the other hand, it can be said that a range in which the variation degree of the picture element affects the contents of the interpolating process differs. For example, there is a case where one picture element is required for execution of the interpolating process and there is another case where the interpolating process is executed on the basis of a plurality of picture elements. Particularly in the latter case, there is a problem that the interpolating process should be changed when the picture elements include one with a large variation degree or with a small variation degree. As one example, the picture element variation degree evaluating unit may use the variation degree of each picture element for evaluation of variation degrees of peripheral picture elements.

Two modes are supposed when a plurality of picture elements are required for the interpolating process and one of the picture elements has a large variation degree. More specifically, one or more remaining picture elements outside a range targeted in the interpolating process need not be evaluated. Inversely, the picture element which has already been evaluated need not be evaluated even though the variation degree thereof is small. In these two meanings, the variation degree found every picture element is used for the evaluation of variation degrees of the peripheral picture elements. Consequently, an amount of computation can be reduced and an optimum result of interpolation can be achieved.

The picture element interpolating unit may only be capable of executing a plurality of interpolating processes relating to the variation degrees of the picture elements. Various interpolating processes are possible. As one example, the picture element interpolating unit may execute an interpolating process in which image data of a nearest neighbor picture element before the interpolation is used for image data of a new constituent picture element. This interpolating process is suitable for a region where the variation degree is small.

In the above-described arrangement, the image data of the nearest neighbor picture element is used for the image data of the new constituent picture element. Even though data of the same picture element is increased, there is no problem in the region where the variation degree is small. This arrangement is suitable in that a processing amount is small. Consequently, the processing amount can be reduced in the region where the variation degree is small, without influence on the image quality.

As another example, the picture element interpolating unit may be capable of executing an interpolating process in which image data of an interpolated picture element is obtained by computation from the image data of peripheral picture elements so that the image data of the interpolated picture element is smoothly changed.

In the above-described arrangement, the computation is performed using the image data of the peripheral picture elements, so that the image data of the interpolated picture element is gently changed. When the image data is gently changed, a step is not conspicuous even if there is a row of picture elements each having a large variation degrees and the interpolation is performed between these picture elements. Consequently, deterioration of the image quality can be prevented.

Various computation manners may be employed for gently changing the image data of the interpolated picture element. However, a change mode affects the image quality. Accordingly, in one meaning, the image quality is adjustable by changing the computation manner. As one example in which the image quality is adjustable, the picture element interpolating unit renders the change mode of the image data generally S-shaped and adjusts an inclination of the image data with when finding the image data of the interpolated picture element between the picture elements with large variation degrees. Further, the picture element interpolating unit produces undershoot at a lower side on both ends and overshoot at a higher side to thereby form a difference. The difference is adjusted so that the variation degree of the image is rendered optimum.

In the above-described arrangement, the change mode of the image data is rendered generally S-shaped between the picture elements with large variation degrees when the image data of the interpolated picture element is gently changed. Accordingly, the change mode becomes steeper as compared with a linearly joining gradient although the image data gently changes. As a result, the inclination is adjusted so that the variation degree of the image can be rendered optimum. Further, when the undershoot is produced at the lower side on both ends and the overshoot is produced at the higher side, the altitude difference is increased and the altitude difference is adjusted so that an apparent variation degree of the image can be rendered optimum. As an example of such computation, the cubic convolution interpolation method can be used. However, a computing process realizing such an adjustment should not be limited to this. Various computation manners can be employed. According to the above-described arrangement, the image quality adjustment can easily be realized by the inclination of the S-shaped curve and the altitude difference by the undershoot and the overshoot.

The interpolating process selecting unit needs to select and change the interpolating process since the variation degree of the picture element is not constant over the whole image. The frequency of change should not be limited, and various manners can be employed. As one example, the interpolating process selecting unit may select the interpolating process in the unit of picture element based on the variation degree of the image evaluated by the picture element variation degree evaluating unit, causing the selected interpolating process to be executed.

In the above-described arrangement, based on the variation degree of the image evaluated by the picture element variation degree evaluating unit, the interpolating process selecting unit selects the interpolating process in the unit of picture element. In other words, since the variation degree is evaluated in the unit of picture element, the interpolating process is changed correspondingly. Accordingly, the interpolating process can be improved finely since the interpolating process is selected in the unit of picture element.

As another example, the interpolating process selecting unit may select the interpolating process every predetermined small region comprising a plurality of picture elements, based on the variation degree of the picture element evaluated by the picture element variation degree evaluating unit. Consequently, the selecting process can be simplified since the interpolating process is selected every small region.

Figure 43:
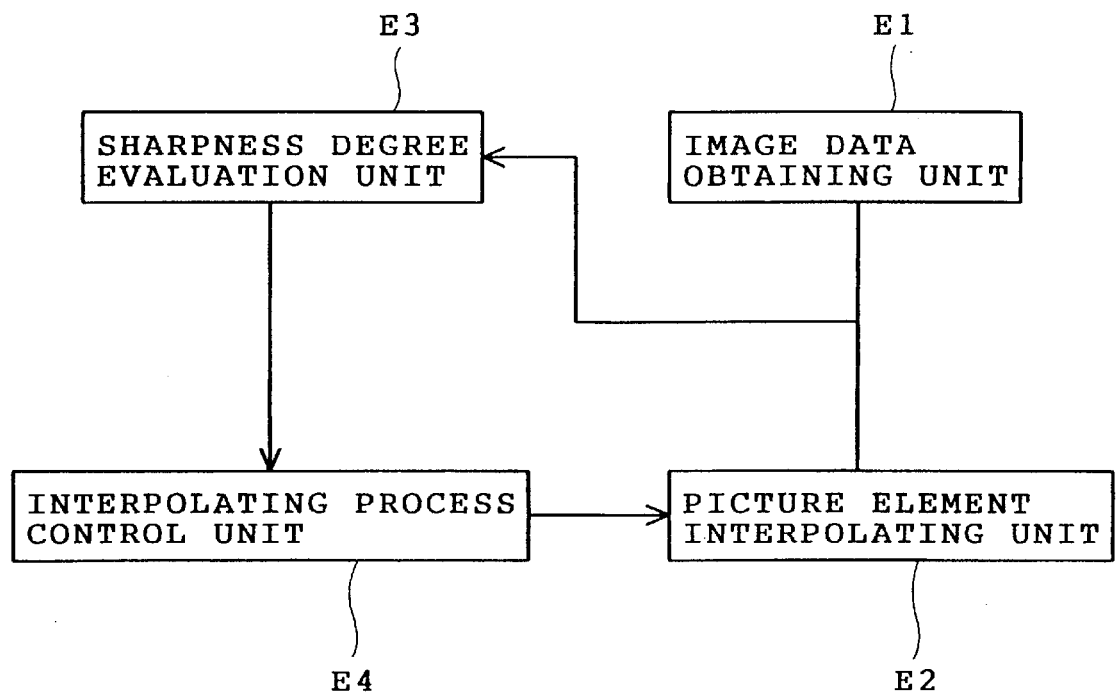
FIG. 43 is a block diagram of the image data interpolation apparatus of another embodiment in accordance with the invention.

Another embodiment in which sharpness is corrected with the interpolating process as a premise. FIG. 43 is a block diagram showing an image data interpolating apparatus of the embodiment. The image sometimes lacks sharpness when the original image is a natural image. For example, a photograph which is out of focus corresponds to such an image. Further, the image lacking sharpness further becomes out of focus when the image itself is scaled up to be output as well as the image is scaled up so that the resolutions of the printer and the printer driver are equalized.

The image data interpolating apparatus adjusts sharpness when the image data is scaled up in the unit of picture element. An image data obtaining unit E1 obtains image data. A picture element interpolating unit E2 carries out an interpolating process for increasing the number of constituent picture elements of the obtained image data. The picture element interpolating unit E2 is capable of changing sharpness of the image with the interpolating process. A sharpness degree evaluating unit E3 evaluates sharpness of the image based on the obtained image data. An interpolating process control unit E4 controls the picture element interpolating unit E2 so that an interpolating process increasing the image sharpness when the evaluated sharpness is low.

As described above, when a resolution controlled by the operating system 12a and a resolution of the color printer 17b are unequal, the printer driver 12c carries out a process for equalizing the resolutions. The resolution of the color printer 17b is normally finer than the resolution of the resolution controlled by the operating system 12a. Accordingly, in order that the resolutions may be equalized, the interpolating process is executed to increase the number of picture elements. Thus, the interpolating process is executed when an expansion process is carried out by the application 12d and when the resolutions are equalized by the printer driver 12c. The image sharpness can be affected by these interpolating processes.

The image sharpness is a synthetic evaluation of variation degrees between adjacent picture elements. An image lacking the sharpness means the image in which picture elements gently change in an original edge portion. In a sharp image, the variation degree between the adjacent picture elements is steep in an original edge portion. Since a new picture element is generated between existing picture elements by the interpolating process, the image sharpness changes depending on what value the new picture element takes. In this meaning, the application 12d and the printer driver 12c constitute not only the picture element interpolating unit E2 but also the sharpness degree evaluating unit E3 and the interpolating process control unit E4, as will be described later.

Figure 44:
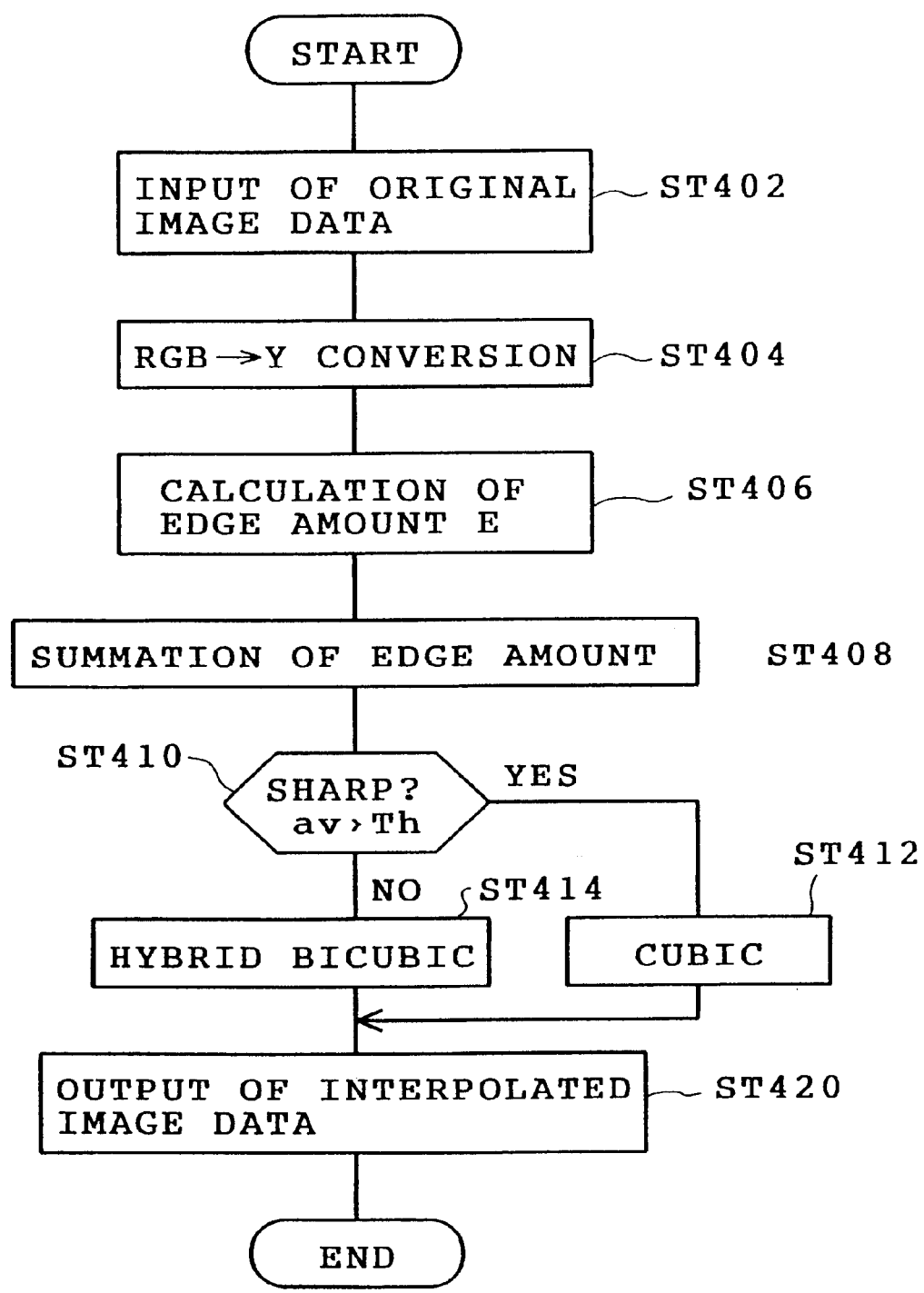
FIG. 44 is a flowchart showing the image data interpolating operation of the image data interpolating apparatus.

FIG. 44 is a flowchart showing resolution conversion executed by the printer driver 12c in an interpolating process original image data is obtained at a step ST402. The image sharpness is evaluated on the basis of a variation degree of each picture element of the read image data.

Figure 45:
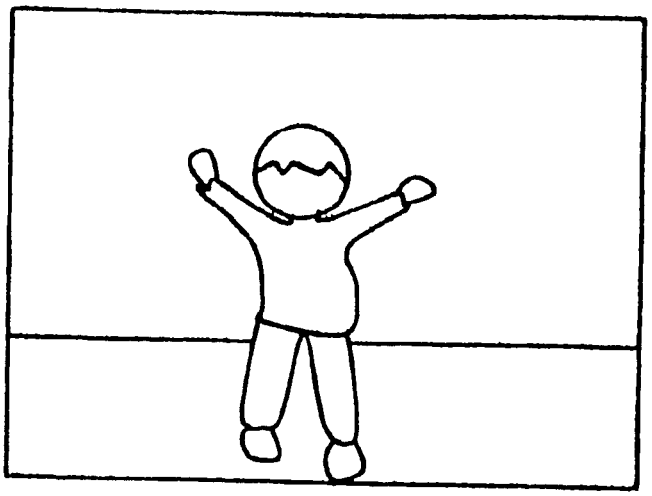
FIG. 45 illustrates an image with small background.
Figure 46:
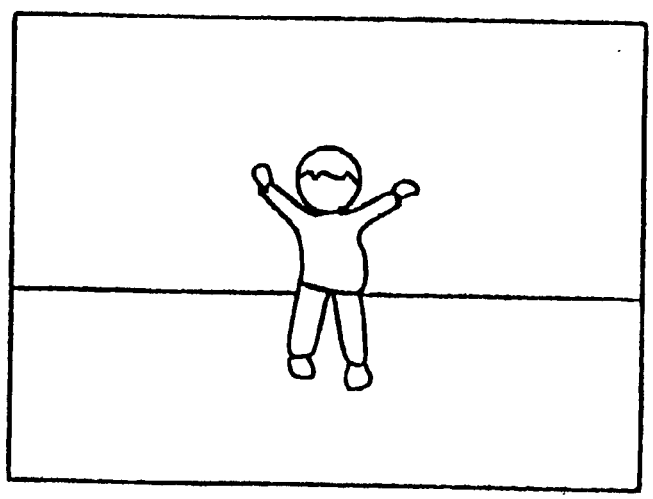
FIG. 46 illustrates an image with large background.

Each of the results of use of edge detecting filters shown in FIGS. 33A–33C and 34A–34C respectively is referred to as "edginess amount E" of each picture element. It is expected that the distribution of the edginess amount E becomes normal as shown in FIG. 35. The edginess amount E is found for all the dot matrix picture elements at a step ST406. Absolute values of the edginess amounts are summed at a step ST408. The summation may be a simple average value, but the average value tends to be affected by an area ratio of a background part. For example, a personal image serving as an object is large and the background is small in FIG. 45, whereas a personal image serving as an object is small and the background is large in FIG. 46. The average value tends to be lower in FIG. 46 in which the background part has a large area ratio as compared with FIG. 45. In this meaning, a predetermined threshold value may be set so that the average of the edginess amounts at or above the threshold value is found.

Figure 47:
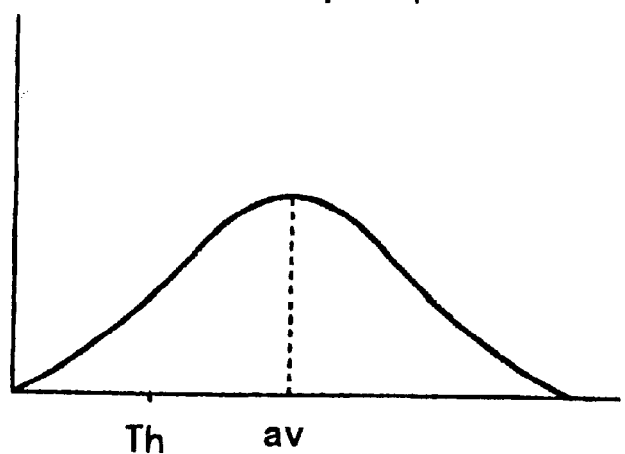
FIG. 47 is a graph showing result of tabulation of edge amounts of a natural image.
Figure 48:
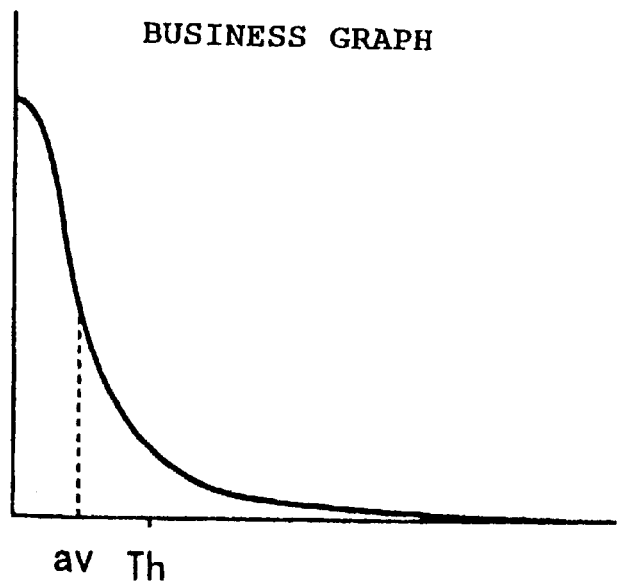
FIG. 48 is a graph showing result of tabulation of edge amounts of a business graph.

On the other hand, finding the image sharpness is a primary object at the stage of summation. It can be determined on the basis of the summation results whether the sharpness as of a natural image is required. Even in the background part of the natural image, the same picture elements are not arranged according to light and darkness of colors and an original configuration. Accordingly, the result of summation of edginess amount absolute values is as shown in FIG. 47. The edginess amount tends to become large. On the other hand, a predetermined region is often painted out in the same color in an image such as business graph. FIG. 48 shows the result of summation of edginess amount absolute values. The edginess amount is lower. Consequently, the process for increasing the sharpness is not required when the average value (av) of the summation result is lower than a threshold value Th. In this case, an interpolating process not affecting the sharpness is executed.

The variation degrees of the picture elements composing the image are summed at steps ST404 to St408. This means that whether the image is sharp has been evaluated. Accordingly, these steps ST404 to ST408 constitute the sharpness degree evaluating unit E3.

The interpolating process according to the image sharpness is selected on the basis of the result of evaluation at a step ST410. In the embodiment, the interpolating process by the cubic method for a sharp image, whereas the interpolating process by the hybrid bicubic method for an image lacking sharpness. Accordingly, the step ST410 constitutes the interpolating process control unit E4. Steps ST412 and ST414 in which different interpolating processes are executed constitute the picture element interpolating unit E2.

These interpolating processes will now be described. The interpolating processes have different characteristics as described above. When it is determined at the step ST410 that the image is sharp, the interpolating process by the cubic method is executed at the step ST412. When it is determined that the image is not sharp, the interpolating process by the hybrid bicubic method is executed at the step ST414. When the interpolating process is executed by the hybrid bicubic method, an interpolated curve becomes steep such that the sharpness is increased. The selection of the hybrid bicubic method is based on the evaluation of the image sharpness and the result of evaluation. Accordingly, the operator can render an unsharp image sharp without specific determination.

Figure 49:
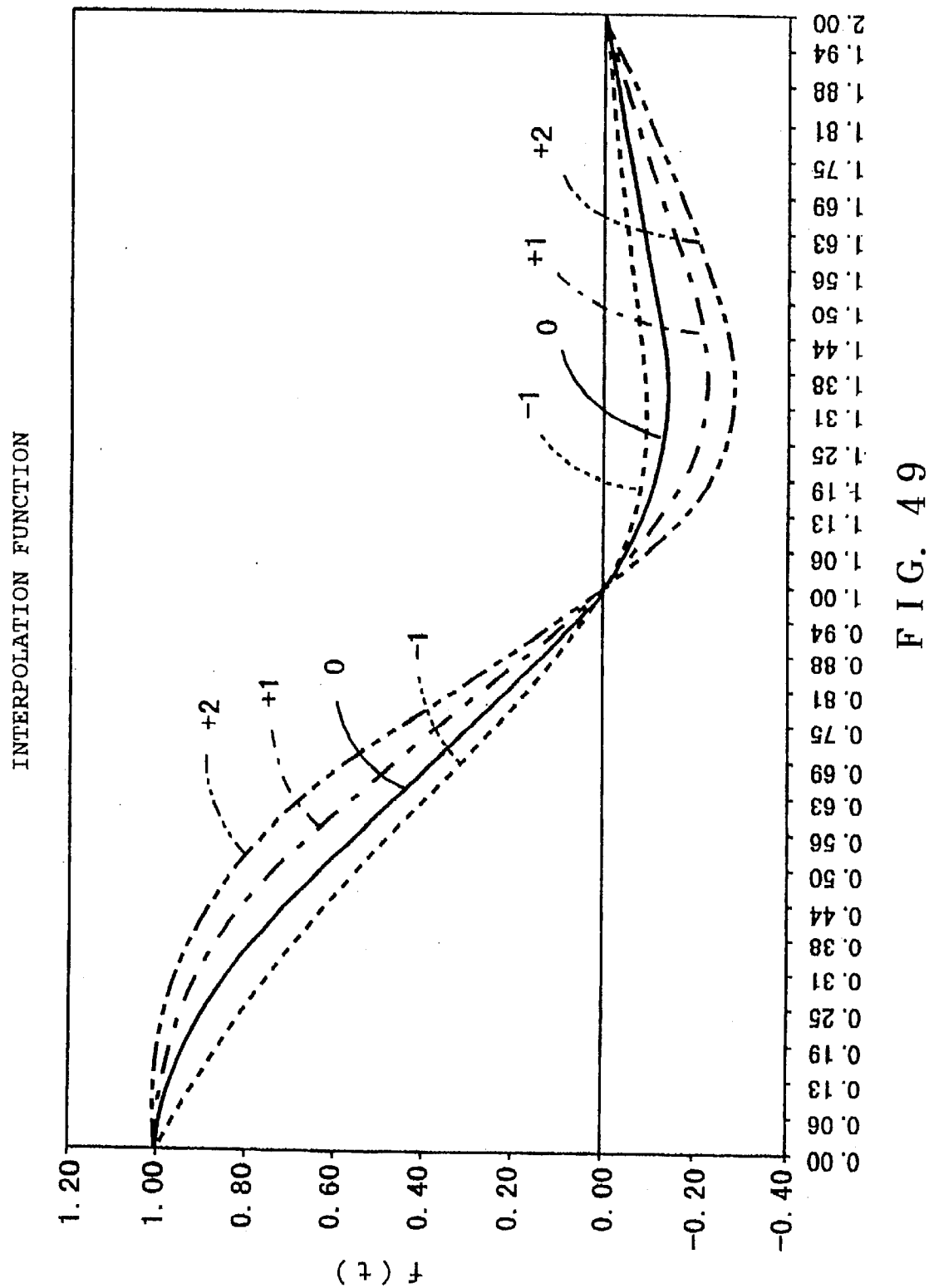
FIG. 49 is a graph showing changes in the interpolation functions.

Either one of the two interpolating processes is executed in the embodiment. However, a plurality of interpolating processes stepwise corresponding to the variation degrees of the picture element may be executed, instead. FIG. 49 shows an example in which four cubic methods are executed. In these four cubic methods, the sharpness evaluation is divided into four stages and parameters of the cubic interpolation method are changed. A curve of the cubic method applied to an image having a normal sharpness is shown by "0" in FIG. 49. A curve of the cubic method applied to an image slightly lacking sharpness is shown by "+1." A curve of the cubic method applied to an image lacking sharpness considerably is shown by "+2." The cubic method with a curve of "−1" is applied to an excessively sharp image. In these cases, the inclination angle of the center portion of the S-shaped curve, the undershoot and the overshoot are adjusted in the same manner as in the hybrid bicubic method such that these cubic methods are realized.

Figure 50:
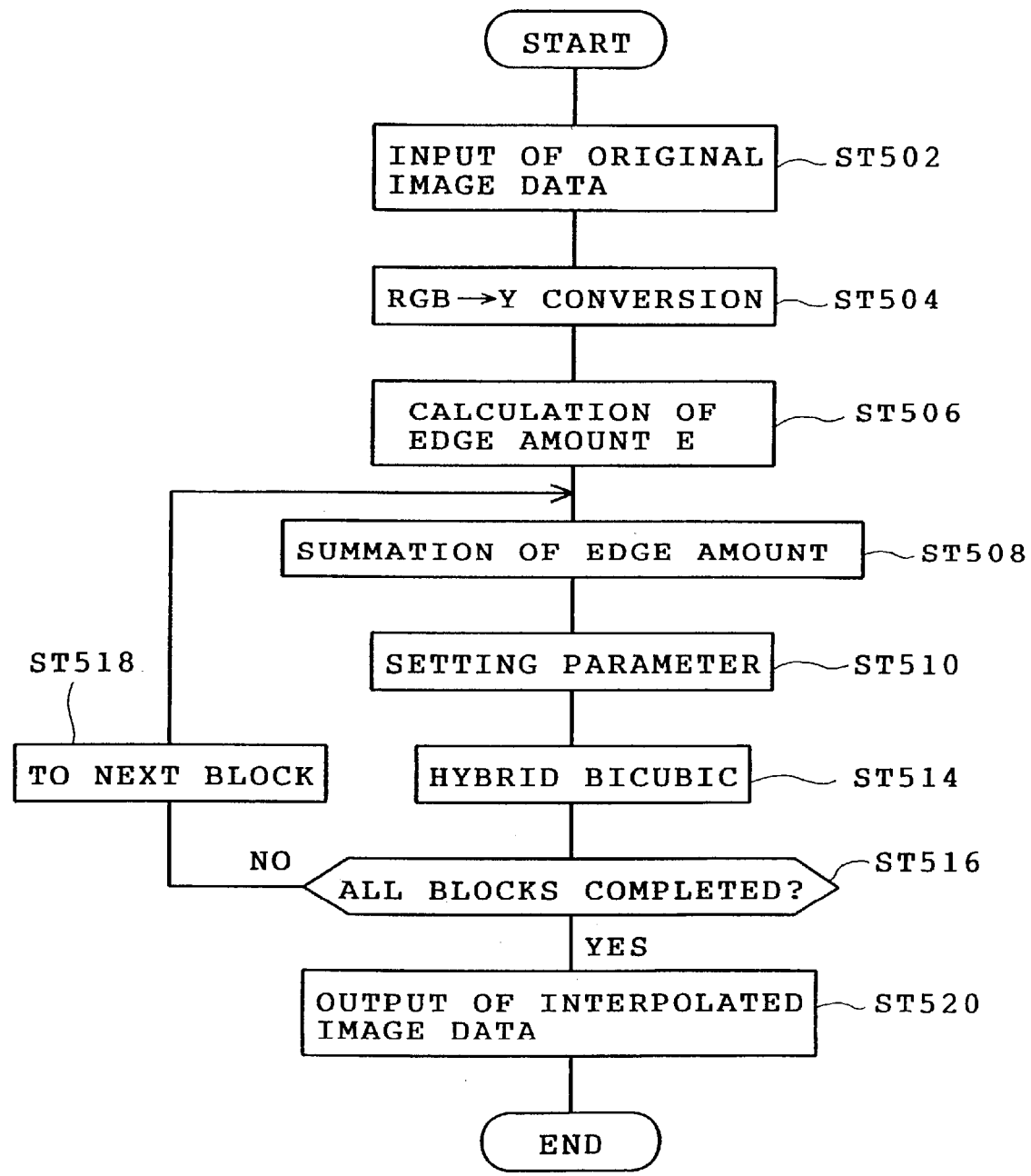
FIG. 50 is a flowchart showing a process of selecting an interpolation function.

FIG. 50 is a flowchart showing the above-described example. The aforesaid parameters are set on the basis of the image sharpness at a step ST510. The cubic method in which these parameters are used is executed at a step ST514. In this flowchart, in view of the fact that the image sharpness partially differs, the image is divided into blocks or small regions so that an optimum interpolating process is executed every block. In other words, the sharpness is evaluated every block for selection of the interpolating process. The edginess amount obtained every block is summed at a step ST508. The interpolating process is executed at steps ST516 and ST518 with the blocks being sequentially displaced.

Upon completion of the interpolating process for the whole image data, the interpolated image data is output at a step ST520. Print data is not obtained only by the resolution conversion in the printer driver 12c. A color conversion and a half-tone processing are further required. Accordingly, output of the image data means delivery of the image data to a next stage.

In the computer system 10 including the image input device and the image output device, the printer driver 12c inputs the original data at the step ST402 and thereafter, evaluates and sums the image sharpness at the steps ST404 to ST408. The printer driver 12c executes the interpolating process increasing the sharpness at the step ST414 when it is determined at the step ST410 that the image lacks the sharpness on the basis of the result of summation. The printer driver 12c executes the normal interpolating process at the step ST412 when the image is sharp. Consequently, a sharp image can be obtained only through the interpolating process without the operator's selecting an image processing for increasing the sharpness.

As described above, in the embodiment, the image data interpolating apparatus comprises the image data obtaining unit for obtains image data representing the image as dot matrix picture elements, the sharpness degree evaluating unit for the sharpness of the image based on the image data, the picture element interpolating unit capable of executing the interpolating process changing the image sharpness when the interpolating process is executed so that the number of constituent picture elements is increased, and the interpolating process control unit causing the picture element interpolating unit to execute the interpolating process so that the image sharpness is changed to become suitable when the image sharpness evaluated by the sharpness degree evaluating unit is unsuitable.

In the above-described arrangement, the picture element interpolating unit is capable of executing the interpolating process changing the image sharpness when executing the interpolating process increasing the number of constituent picture elements of the image data representing the image as dot matrix picture elements. When the image data obtaining unit obtains the image data, the sharpness degree evaluating unit evaluates the image sharpness based on the image data. Based on the sharpness evaluated by the sharpness degree evaluating unit, the interpolating process control unit causes the picture element interpolating unit to execute the interpolating process so that the image sharpness is changed to become suitable when the image sharpness is unsuitable. In other words, the sharpness is increased by the interpolating process when the image sharpness is low, and the sharpness is reduced when the image is too sharp. Consequently, since the sharpness is adjusted by the interpolating process according to the image sharpness, the image data interpolating apparatus can be provided in which the image quality can easily be improved without the operation being complicated.

As the method in which the image sharpness is changed while the interpolating process is being executed, the change mode of the image data is rendered generally S-shaped and the inclination thereof is adjusted. Further, the undershoot is produced at the lower side on both ends and the overshoot is produced at the higher side, so that the altitude difference is formed. The altitude difference is adjusted so that the image sharpness is changed by adjusting the image variation degree so that it becomes optimum.

As an example of the S-shaped curve, the picture element interpolating unit may adjust the parameters in the cubic interpolation method to thereby change the image sharpness.

In this arrangement, the parameters of the cubic interpolation method used as the interpolating process are adjusted so that the picture element interpolated between the adjacent picture elements in the original image draws an S-shaped curve by employing the cubic function. As a result, the interpolated picture element is gentle and steep. The curvature of the S-shaped curve is adjusted by the parameters so that the steepness changes and the image sharpness changes.

Thus, by using the cubic interpolation method as the computation processing, the S-shaped curve can be adjusted so that the image sharpness can easily be adjusted Changing the sharpness should not be limited to only one computation method. A plurality of interpolating process affecting the sharpness may be executed. As one example, the picture element interpolating unit may be capable of executing a plurality of interpolating processes having different image sharpness change degrees, and ratios of the interpolating scale factors may be changed so that the ratios of the interpolating scale factors are changed so that the image sharpness is adjusted.

In the above-described arrangement, the plurality of interpolating process have different image sharpness change degrees, and a plurality of interpolating processes are executed so that a necessary interpolating scale factor is obtained. Accordingly, the sharpness becomes adjustable by changing a share ratio of the interpolating scale factor. For example, in a case where there are an interpolating process having low sharpness change degree and another interpolating process having high sharpness change degree, a middle change degree between two share ratios can be selected when these share ratios are changed. As a result, since only the interpolating scale factors shared by a plurality of interpolating processes need to be changed, the parameters can easily be set.

The image sharpness is not always necessarily high and accordingly, there is a case where the image sharpness need not be increased. In this case, the operator may determine that the image sharpness need not be increased. However, such a determination can simultaneously be realized. As one example, the interpolating process control unit controls the picture element interpolating unit so that the image sharpness is changed, when the image sharpness exceeds a predetermined threshold value. In this arrangement, the interpolating process control unit compares the image sharpness with the threshold value. When determining that the image sharpness exceeds the threshold value, the interpolating process control unit controls the picture element interpolating unit so that the image sharpness is changed. However, when the image sharpness is below the threshold value, the interpolating process control unit does not control so that the image sharpness is changed. For example, when the image sharpness of a natural image and the image sharpness of the non-natural image are compared, the former usually has a high sharpness than the latter. Of course, the image sharpness should not be determined only by the classification of the natural and non-natural images. Accordingly, other determining elements may be added. For example, when classification of image is obtained and the threshold value is varied on the basis of the classification, more flexible measure may be possible.

According to the above-described arrangement, the sharpness is not varied in a predetermined range. The sharpness of an image which need not be changed can be prevented from being automatically changed.

The image sharpness is not necessarily constant over the whole image on the basis of the individual picture elements. Accordingly, the image sharpness may be evaluated in the unit of picture elements and may be changed in the unit of picture elements on the basis of the evaluated image sharpness. Further, the image sharpness may be evaluated every predetermined small region and may be changed every small region on the basis of the evaluated image sharpness.

Figure 51:
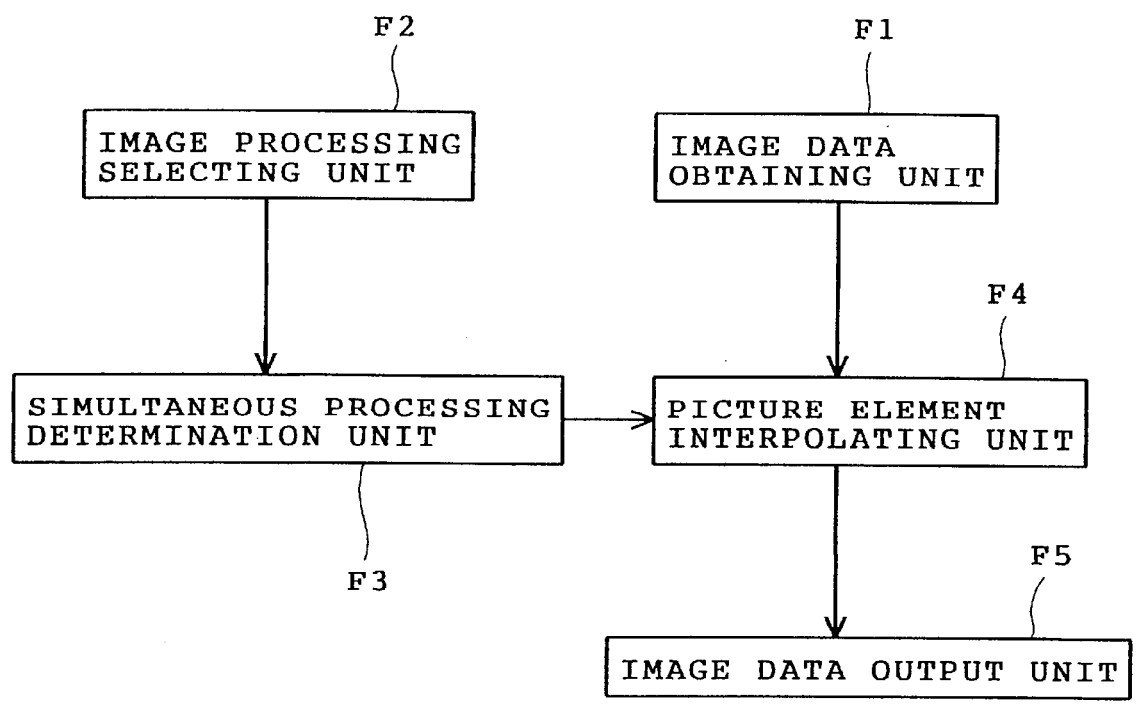
FIG. 51 is a schematic block diagram of an image data interpolation apparatus of another embodiment in accordance with the invention.

Another embodiment in which an image processing can be selected will be described. FIG. 51 is a block diagram showing the image data interpolating apparatus of the embodiment. The image data interpolating apparatus is provided for simultaneously executing an expansion process and the image sharpness changing process as the interpolating process when the image processing is carried in the unit of picture elements. An image data obtaining unit F1 obtains image data. An image processing selecting unit F2 selects an image processing to be executed. A simultaneous processing determining unit F3 determines whether the image processing to be executed includes the expansion process and the image sharpness changing process to be executed simultaneously. When these processes need to be executed simultaneously, a picture element interpolating unit F4 changes the image sharpness when the interpolating process is executed to increase the number of the constituent picture elements in the image data. An image data output unit F5 outputs expanded image data.

In the computer system 10, the scanner 11a serving as the image input device obtains the image data. A predetermined image data interpolating is carried out on the application 12d. The image processing includes various types of processes, for example, expansion and reduction, sharpness increase and decrease, contrast change and color correction. As described above, the resolution of the display 17a or color printer 17b serving as the image output device needs to be equal to that of the operating system 12a. The interpolating process which is carried out an the expansion process is executed particularly when the resolution of the operating system is equalized to that of the printer. This interpolating process may be executed by the printer driver 12c or the application 12d.

The application 12d is capable of selecting the expansion process or the sharpness changing process as the image processing. The application 12d can change the image sharpness upon the expansion process executed when the resolution of the operating system 12a is equalized to that of the printer. Accordingly, in the above cases, the expansion process and the sharpness adjustment process are executed. In this meaning, the image processing apparatus of the invention is realized as the application 12d in the above-described computer system 10. The application 12d thus constitute the picture element interpolating unit F4, the image processing selecting unit F2, and the simultaneous processing determination unit F3. The application 12d further constitutes the image data obtaining unit F1 and the image data output unit F5 in the point of input and output of file and output of image data.

Figure 52:
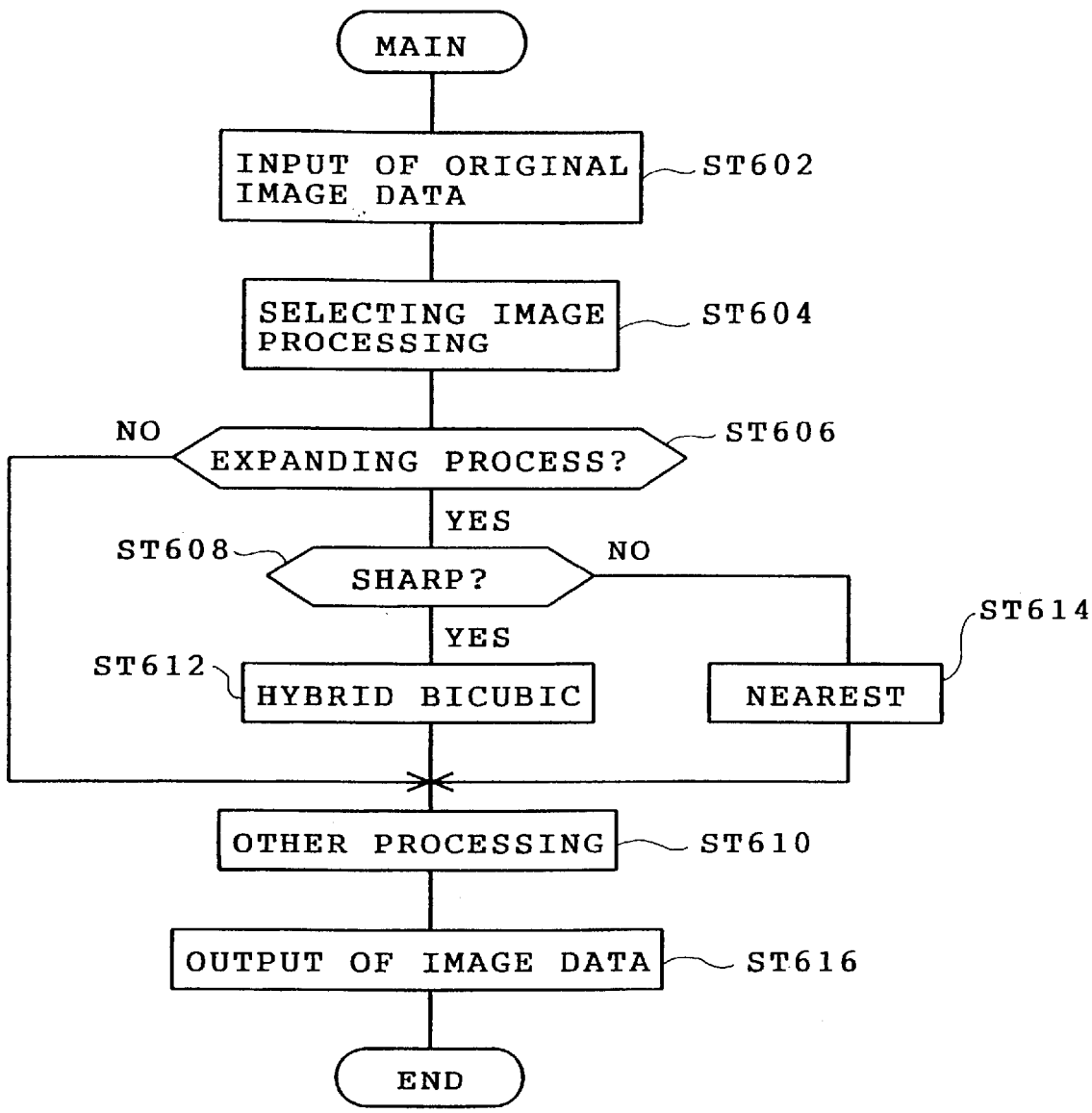
FIG. 52 is a flowchart showing the operation of the image data interpolation apparatus.
Figure 53:
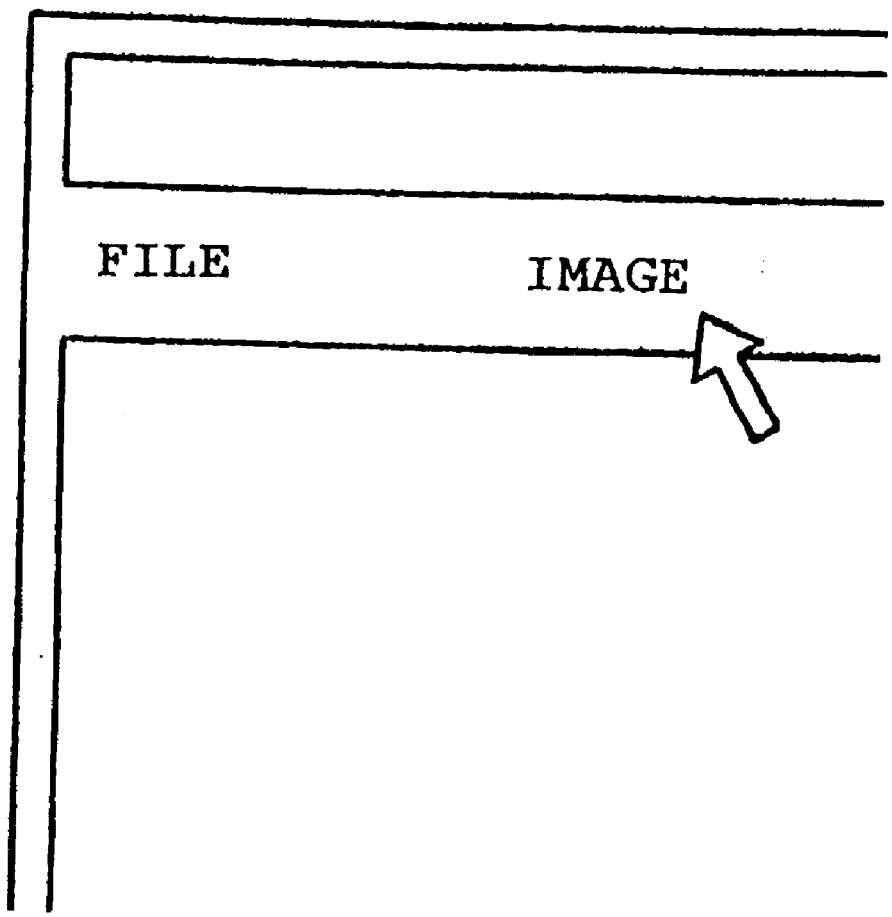
FIG. 53 illustrates a displayed menu for execution of image processing.

FIG. 52 is a flowchart schematically showing the operation of the application 12d. The application 12d is capable of executing various types of image processes by menu selection as shown in FIG. 53. Accordingly, the operation of the application 12d should not be limited to that shown in FIG. 52 and accordingly, is shown in its simplified form in FIG. 52 for the purpose of easy understanding.

The original image data is obtained at a step ST602. This step corresponds to a process for reading image from the scanner 11a by a file menu on the application 12d. Since the image data used for the image processing which will be described later is generated in the embodiment, a process for selecting new file generation and generating image data used for image processing corresponds to obtainment of original image data. A process for obtaining the original image data except the arrangement or construction of the operating system 12a and hardware corresponds to the obtainment of image data. Of course, when considered to be integrally combined with hardware such as CPU, theses processes corresponds to the image data obtaining unit F1.

Figure 54:
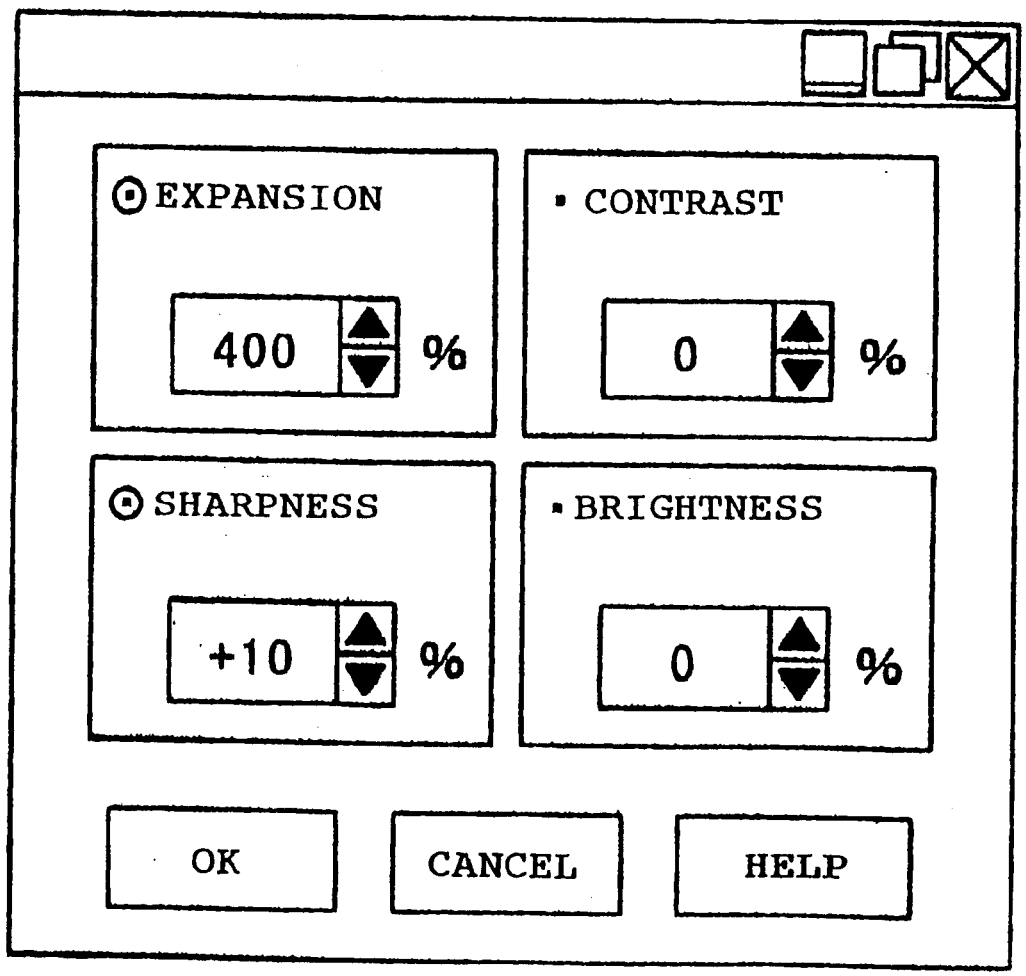
FIG. 54 illustrates a screen for selecting an image processing.

One of the image processes is selected at a step ST604. The selected image process is determined at steps ST606 and ST608. FIG. 53 shows menu bars displayed in the respective window frames on the screen. In selection of the image process, when character, "IMAGE" on the screen is clicked by a mouse 15b, various types of executable image processes are displayed as shown in FIG. 54. In an example shown in FIG. 54, an "EXPANSION" process, a "SHARPNESS" adjustment process, a "CONTRAST" adjustment process, a "BRIGHTNESS" adjustment process are executable. Button switches are provided for the respective image processes so that a plurality of image processes can simultaneously be selected. Each process is displayed in gray until it is selected by the corresponding button switch, so that a non-display state of each process can be recognized at a glance.

The button switch of a desired image process is operated and parameters are set. When an "OK" button is then clicked, one of the processes is treated as the selected one. The selected process is determined at steps ST606 and ST608. In this example, it is determined at a step S606 whether the expansion process has been selected. When the expansion process has not been selected, another image process is carried out at a step ST610. On the other hand, when the expansion process has been selected, it is determined at a step ST608 whether the sharpness adjustment process has also been selected. As a result, when both the expansion process and the sharpness adjustment process have been selected, the control sequence advances to a step ST612. When the expansion process has been selected but the sharpness adjustment process has not been selected, the control sequence advances to step ST614. Processes at steps ST612 and ST614 will be described later.

In the flowchart, two branch processes are carried out at the respective steps ST606 and ST608 for the purpose of easy understanding. Actually, however, a number of branches may be selected by a case process. In the embodiment, since the image process is selected at the step ST604, this step corresponds to an image process selecting step. Further, since it is determined at the respective steps ST606 and ST608 whether both the expansion process and the sharpness adjustment process have been selected, these steps correspond to an simultaneous processing determining step. Of course, when considered to be integrally combined with hardware such as CPU, these steps constitute the image process selecting unit F2 and the simultaneous processing determining unit F3.

Figure 55:
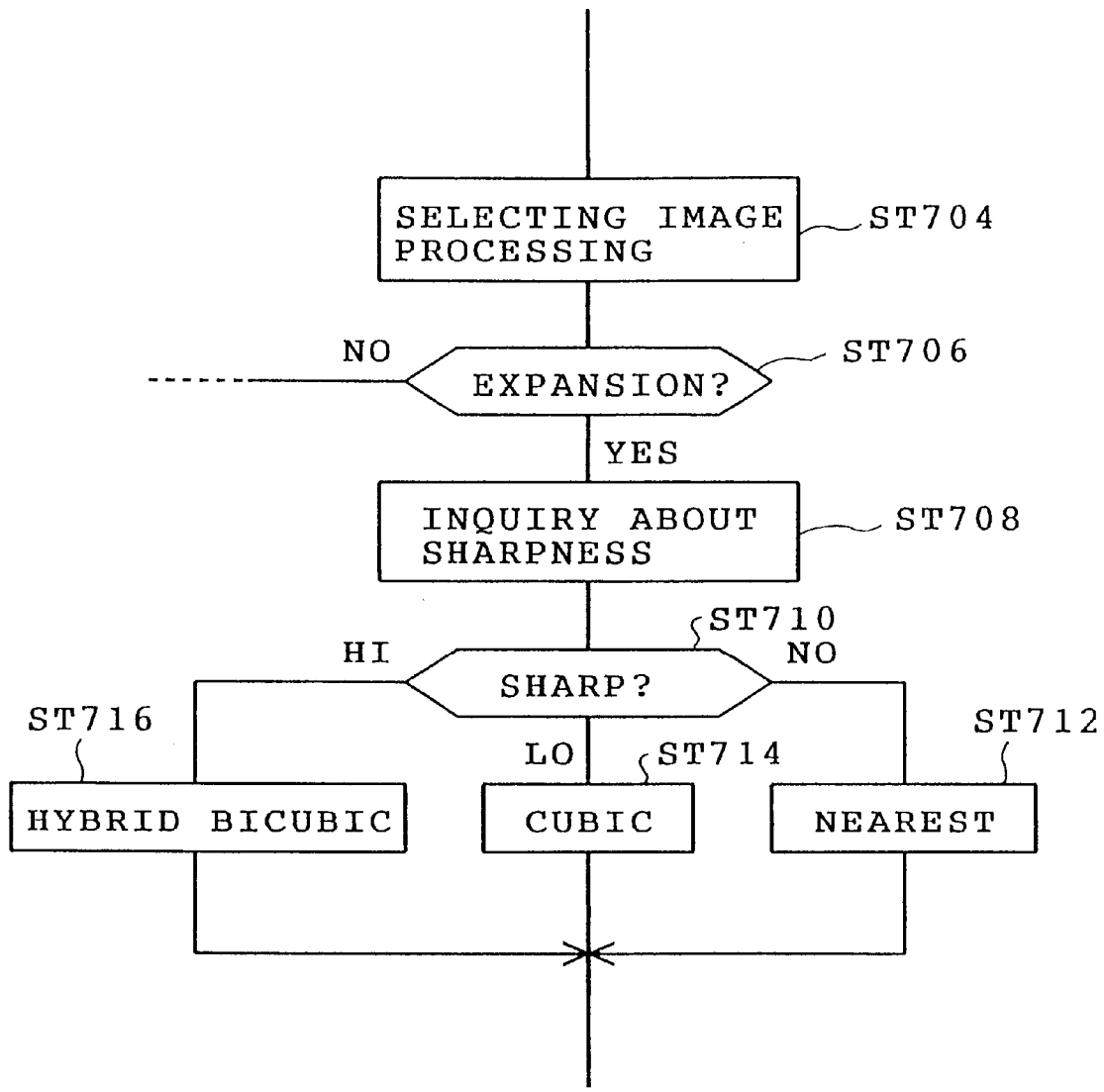
FIG. 55 is a flowchart showing a modification of the image data interpolation apparatus.

Modified forms of the image processing selecting unit F2 and the simultaneous processing determining unit F3 will be described. FIGS. 55 to 57 show one example. Assume that the application 12d is not provided with a definite sharpness adjustment process and the expansion process can be selected. In this example, an expansion process parameter input window as shown in FIG. 56 is displayed as an option of image process at a step ST704. A scale factor by percent can selectively be input. When a desired scale factor is set and the "OK" button is clicked, the control sequence advances to a next stage. An interpolating process according to the selected scale factor may be executed when the scale factor has been input. In this example, however, when it is determined at a step ST706 that the expansion process has been selected, a sharpness adjustment inquiry window as shown in FIG. 57 is displayed at s step ST708. This window includes three options, that is, "NO," "LOW" and "HIGH." Three buttons are allocated to the options respectively. "NO" is default and the operator can select "LOW" or "HIGH" if necessary. These options are provided for inquiry of the sharpness emphasis. "NO" means that the sharpness is not emphasized, "LOW" means that the sharpness is slightly emphasized, and "HIGH" means that the sharpness is emphasized.

Any one of the steps ST712, ST714 and ST716 which are interpolating processes is executed on the basis of the result of selection. In the expansion process, the sharpness can be varied when the interpolating process is selected as will be described later. Thus, the sharpness emphasis is automatically inquired when the expansion process has been selected. In the example, the steps ST704 and ST708 correspond to an image process selecting step. The step ST710 corresponds to a simultaneous processing determining step.

Figure 58:
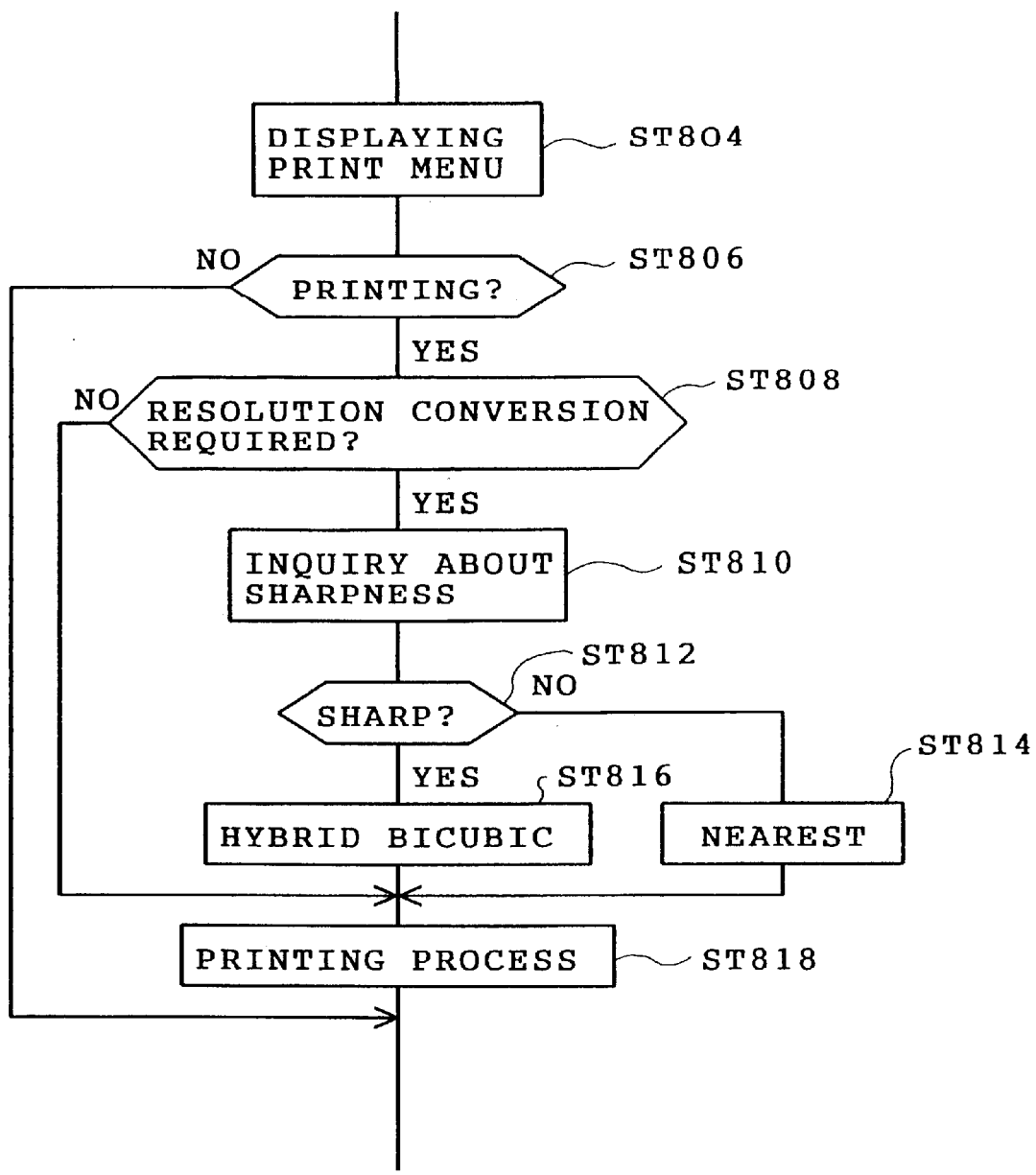
FIG. 58 is a flowchart for printing process.
Figure 59:
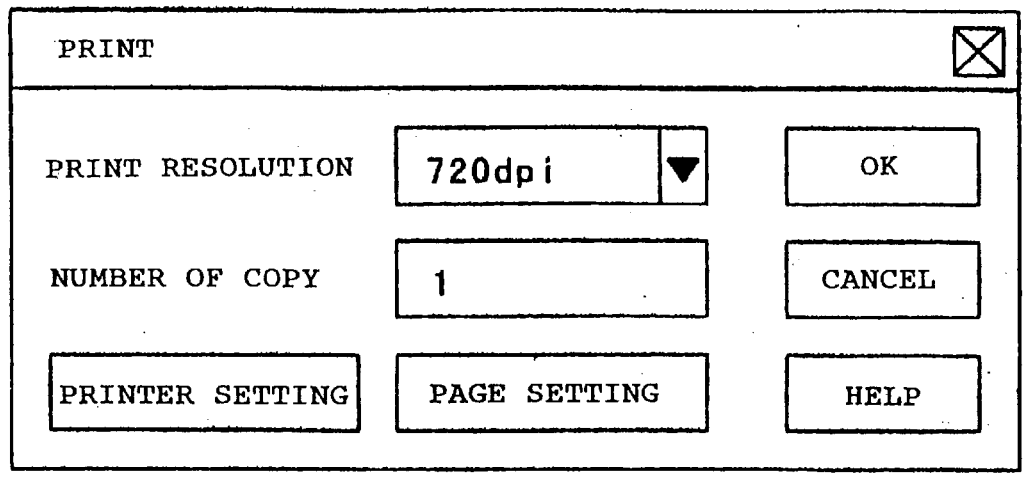
FIG. 59 illustrates a screen of parameters in the printing.
Figure 60:
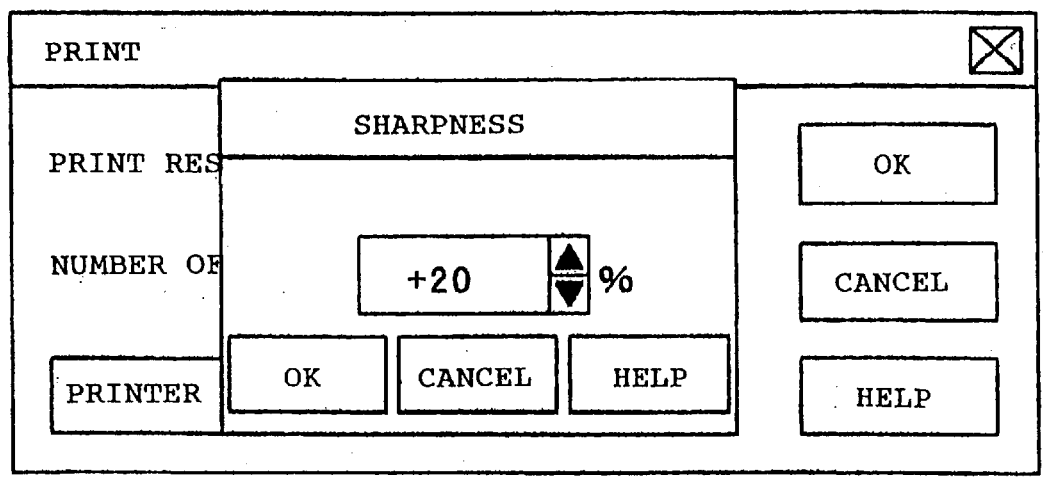
FIG. 60 illustrates a screen designating sharpness.

Further, FIGS. 58 to 60 show a case where the expansion process is internally carried out although the image processing is not deemed to be directly selected. A more specific case is an printing process. When "PRINT" has been selected in a file menu (not shown), a print menu as shown in FIG. 59 is displayed at a step ST804. Various parameters are settable in the print menu. A selecting box of "PRINT RESOLUTION" is one of the parameters. The resolutions of the application 12d and the printer 17b need to be equalized depending on with which resolution printing is carried out, regardless of the resolution internally treated by the application 12d. When the resolution of the color printer 17b2 is 720 dpi and the printing resolution is 720 dpi, one dot of the image data corresponds to one dot in the printing, and accordingly, the resolution conversion is not required. However, when the printing is carried with the resolution of 300 dpi, the resolutions of the color printer 17b2 and the printer driver 12c need to be equalized, whereupon the resolution conversion is required.

Accordingly, it is determined at a step ST808 whether parameters of a printing resolution box and the resolution of the color printer 17b2 controlled by the operating system 12a need to be compared so that the resolution conversion is carried out. When the resolution conversion is required, a sharpness inquiry window as shown in FIG. 60 is displayed at a step ST812. In this example, sharpness adjustment degree is selected and input by percent in the same manner as in the case of FIG. 54. The process is selected according to the input parameters at a step ST812. When the adjustment process is not required, the control sequence advances to step ST814. When the adjustment process is required, the control sequence advances to a step ST816. Thereafter, the printing process is executed at a step ST818 with the equalized resolutions.

In this example, the steps ST804 and ST810 correspond to an image process selecting step. The step ST812 corresponds to a simultaneous processing determining step. Of course, the image process selecting unit F2 and the simultaneous processing determining unit F3 may be realized by other techniques.

The interpolating process is carried through the above-described determinations. More specifically, when only the expansion process is selected and the sharpness emphasis process is not selected, the interpolating process by the nearest method is executed (steps ST614, ST714 and ST814). When both the expansion process and the sharpness emphasis process are executed, the interpolating process by the hybrid bicubic method (steps ST612 and ST816) is executed and the interpolating process by the cubic method (step ST714) is executed. Accordingly, the latter steps ST612, ST714 and ST816 constitute the picture element interpolating unit F4.

The arrangement that the sharpness can be adjusted during the expansion process as in this embodiment has advantages as compared with the arrangement that the expansion process and the sharpness adjusting process are independently executed. For example, even when the expansion process is to be executed after the sharpness emphasis, jags are conspicuous if the expansion process by the nearest method has been executed. As a result, the sharpness of the image cannot be retained. Further, when the sharpness is emphasized after the expansion by the nearest method, the image is rendered sharp in a jag-conspicuous state. In this case, it cannot be said that the image quality is improved. On the other hand, these disadvantages can be prevented when the sharpness emphasis is executed during the expansion process.

Upon completion of the interpolating process and other image processes for the image data, the image data is output at a step ST616. The output of the image data has a wide meaning in the embodiment and is not limited to output to the color printer 17b2 or write onto the hard disk 13b. The image data may be displayed for a subsequent image processing while being maintained as the data. Of course, the step ST616 constitutes the image data output unit F5.

In the computer system 10 including the image input and output devices, the application 12d is capable of executing various image processes. The image process to be executed is selected at the step ST604. In this case, when both the expansion process and the sharpness changing process are simultaneously designated, the interpolating process is executed to increase the sharpness at the step ST612 through the determination at the step ST608. When only the expansion process is selected, the normal interpolating process which doe not affect the image sharpness is executed at the step ST614. Consequently, an excessive time for independently executing the expansion process and the sharpness changing process is not required. Further, the image sharpness can reliably be adjusted since both processes are simultaneously carried out.

As described above, the invention comprises the image data obtaining unit for obtaining the image data representing the image as dot matrix picture elements, the image process selecting unit for displaying and selecting executable image processes so that the various image processes are executable, by changing the image data of each picture element of the obtained image data, the image process selecting unit inputting selection, the simultaneous process determining unit for determining whether both the image expansion process and the sharpness changing process are simultaneously selected, the picture element interpolating unit capable of executing the interpolating process so that when the simultaneous process determining unit determines that both the image expansion process and the sharpness changing process have been selected, the variation degree of the interpolated image data is adjusted when the number of the constituent picture elements is increased so that the selected image sharpness is achieved.

In the invention thus constituted, when the image data obtaining unit obtains the image data representing the image as the dot matrix picture elements, the image processing selecting unit displays the executable image processes so that various image processes are executed by changing the image data of each picture element of the image data, the image processing selecting unit inputting the selection. The simultaneous process determining unit determines whether both the image expansion process and the image sharpness changing process have been selected by the image processing selecting unit. When determining that both processes have been selected, the picture element interpolating unit executes the interpolating process so that the selected image sharpness is achieved by adjusting the variation degree of the image data to be interpolated, when expanding the image by increasing the constituent picture elements of the image data. The image data output unit outputs generated image data.

In other words, the image data to be generated in the interpolating process is adjusted so that the image data is expanded while the sharpness is being changed, when the image expansion and the sharpness changing process need to be executed simultaneously.

As described above, the invention can provide the image data interpolating apparatus wherein the image sharpness is changed by the interpolating process required in the expansion process. Consequently, the expansion process and the sharpness changing process need not be carried out independently, and the processing time can be shortened. Further, since the expansion process and the sharpness changing process are simultaneously be executed, a good result cannot be obtained when the sharpness changing process is executed subsequently. Further, the sharpness changing process can be prevented from becoming wastful.

The image processing selecting unit displays and inputs executable image processes. The simultaneous processing determining unit determines whether both the image expansion process and the sharpness changing process have been selected. These units determine whether these processes should be simultaneously executed. A manner of selection may be changed.

As one example, the image process selecting unit may be selectable the selection of the expanded process and the selection of the sharpness changing. The simultaneous processing determining unit may determine whether the selection of expanded process and the selection of sharpness changing process have simultaneously been selected by the image processing selecting unit. In this arrangement, since the expansion process and the sharpness changing process can be selected independently, only the expansion process or only the sharpness changing process can be selected. The simultaneous process determining unit determines whether the selection of the expansion process and the sharpness changing process have simultaneously been selected. Consequently, the image processing apparatus of the invention is suitable for the case where the expansion process and the sharpness can independently be selected.

As another example, the image process selecting unit may be capable of selecting the expansion process, and the simultaneous processing determining unit may select a sharpness variation degree when the expansion process has been selected by the image process selecting unit. In this arrangement, only the expansion process can be selected by the image process selecting unit, and the unit does not input the sharpness changing. However, when the expansion process is selected by the image process selecting unit, the simultaneous processing determining unit determines so that the sharpness changing degree is selected. Of course, it is possible to select not changing the sharpness. In this case, only the expansion process is executed. Conversely, when the sharpness changing has been selected, it is determined that both the expansion process and the sharpness changing process have simultaneously been selected. Accordingly, even in a case where only the expansion process can be selected, the sharpness change can be executed as well as the expansion process.

Further, although the expansion process is selected explicitly in the above-described embodiment, the expansion process need not be explicit. As one example, the simultaneous process determining unit may cause to select the sharpness change degree when the image process selecting unit performs a resolution conversion process with the image processing. In this arrangement, the necessity to perform the resolution conversion process arises with the image processing selected by the image process selecting unit. In this case, the simultaneous process determining unit causes the sharpness change degree to be selected. When changing the sharpness has been selected, it is determined that both the expansion process and the sharpness changing process are simultaneously selected. Consequently, the sharpness can be changed even when the expansion process is executed. Display and input operation in these cases may be realized by screen display under the GUI and a mouse operation. A hardware switch may be possible.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. An image data interpolation apparatus comprising:
an image data obtaining unit for obtaining image data representing an image as dot-matrix picture elements;
a picture element interpolating unit capable of selectively executing one of a plurality of interpolating processes when the image data is interpolated so that the number of constituent picture elements thereof is increased;
a feature amount obtaining unit for obtaining a feature amount concerning the image data with respect to the selected interpolating process, the feature amount obtaining unit obtaining the feature amount by carrying out a totaling process with a plurality of individual image data of a plurality of dot-matrix picture elements of the image; and
an interpolating process selecting unit for selecting one of the interpolating processes capable of obtaining an optimum result of interpolation according to the feature amount obtained by the feature amount obtaining unit and causing the picture element interpolating unit to execute the selected interpolating unit to execute the selected interpolating process.

2. An image data interpolation apparatus according to claim 1, wherein the picture element interpolating unit is capable of executing the interpolating process suitable for each of natural image data and non-natural image data, the feature amount obtaining unit obtains a feature amount to determine which an image represented by the image data is, a natural image or a non-natural image, and the interpolating process selecting unit causes the picture element interpolating unit to execute the interpolating process suitable for the natural image when it is determined on the basis of the obtained feature amount that the image is a natural image and to execute the interpolating process suitable for the non-natural image when it is determined on the basis of the obtained feature amount that the image is a non-natural image.

3. An image data interpolating apparatus according to claim 2, wherein the picture element interpolating unit executes the interpolating process by a nearest neighbor interpolation method for the non-natural image and the interpolating process by a cubic convolution interpolation method for the natural image.

4. An image data interpolating apparatus according to claim 1, wherein the picture element interpolating unit is capable of executing an optimum interpolating process according to degrees of variations in different picture elements, the feature amount obtaining unit obtains a feature amount for evaluating degrees of variations in picture elements based on the image data, and the interpolating process selecting unit selects an interpolating process from which an optimum result of interpolation according to the degrees of variations in the picture elements obtained by the feature amount obtaining unit, based on the degrees of variations, the interpolating process selecting unit causing the picture element interpolating unit to execute the selected interpolating process.

5. An image data interpolating apparatus according to claim 4, wherein the picture element interpolating unit is capable of executing, as an interpolating process suitable to be applied to a region where the degree of variation is small, an interpolating process in which image data of a nearest neighbor picture element is used for image data of a new constituent picture element.

6. An image data interpolating apparatus according to claim 4, wherein the picture element interpolating unit is capable of executing, as an interpolating process suitable to be applied to a region where the degree of variation is large, an interpolating process in which image data of a post-interpolation picture element is obtained by an operation from image data of circumferential picture elements so that the image data of the post-interpolation picture element is smoothly varied.

7. An image data interpolating apparatus according to claim 1, wherein the feature amount obtaining unit obtains a feature amount for every region of the image, and the interpolating process selecting unit selects one of the interpolating process in the picture element interpolating unit based on the feature amount obtained for every region of the image.

8. The image data interpolation apparatus as set forth in claim 1, wherein said feature amount obtaining unit carries out said totaling process while thinning out the picture elements to the elements which are determined to be sharp.

9. An image data interpolation apparatus comprising:
an image data obtaining unit for obtaining image data representing an image as dot-matrix picture elements;
a picture element interpolating unit capable of selectively executing one of a plurality of interpolating processes when the image data is interpolated so that the number of constituent picture elements thereof is increased;
a feature amount obtaining unit for obtaining a feature amount concerning the image data with respect to the selected interpolating process; and
an interpolating process selecting unit for selecting one of the interpolating processes capable of obtaining an optimum result of interpolation according to the feature amount obtained by the feature amount obtaining unit and causing the picture element interpolating unit to execute the selected interpolating process;
wherein the picture element interpolating unit has as one of the plurality of interpolating processes an interpolating process in which a plurality of interpolating processes are successively executed.

10. An image data interpolation apparatus comprising:
an image data obtaining unit for obtaining image data representing an image as dot-matrix picture elements;
a picture element interpolating unit capable of selectively executing one of a plurality of interpolating processes when the image data is interpolated so that the number of constituent picture elements thereof is increased;
a feature amount obtaining unit for obtaining a feature amount concerning the image data with respect to the selected interpolating, process; and
an interpolating process selecting unit for selecting one of the interpolating processes capable of obtaining an optimum result of interpolation according to the feature amount obtained by the feature amount obtaining unit and causing the picture element interpolating unit to execute the selected interpolating process;
wherein the picture element interpolating unit adjusts operation parameters in a cubic convolution interpolation method so that a process of interpolating a plurality o f picture elements is realized.

11. An image data interpolation apparatus comprising:
an image data obtaining unit for obtaining image data representing an image as dot-matrix picture elements;
a picture element interpolating unit capable of selectively executing one of a plurality of interpolating processes when the image data is interpolated so that the number of constituent picture elements thereof is increased;
a feature amount obtaining unit for obtaining a feature amount concerning the image data with respect to the selected interpolating process;

an interpolating process selecting unit for selecting one of the interpolating processes capable of obtaining an optimum result of interpolation according to the feature amount obtained by the feature amount obtaining unit and causing the picture element interpolating unit to execute the selected interpolating process;

an image process selecting unit for displaying executable image processes and inputting a selected one of the image processes; and a simultaneous process determining unit for determining whether the image process selecting unit has selected both an image enlarging process and an image sharpness changing process;

wherein the picture element interpolating unit is capable of executing an interpolating process so that a variation degree of image data to be interpolated is adjusted so that the selected sharpness of image is obtained in a case where the image is enlarged by increasing the number of constituent picture elements thereof when the simultaneous process determining unit has determined that both the image enlarging process and the image sharpness changing process have been selected.

12. An image data interpolation processing computer comprising:

a CPU;

an image memory for storing image data representing image as dot-matrix picture elements;

a program memory for storing a processing program for;
  obtaining a feature amount, in relation to an interpolating process for the image data stored on the image memory, by carrying out a totaling process with a plurality of individual image data of a plurality of dot-matrix picture elements of the image,
  selecting one of a plurality of interpolating processes from which an optimum result of interpolation is achieved according to the feature amount, and
  causing the CPU to execute the selected interpolating process and to write the interpolating process onto the image memory; and
an interface for inputting and outputting the image data.

13. An image data interpolation method comprising the steps of:

obtaining image data representing an image as dot-matrix picture elements;

obtaining a related feature amount, when an interpolating process is executed for the image data, by carrying out a totaling process with a plurality of individual image data of a plurality of dot-matrix picture elements of the image;

selecting an interpolating process capable of achieving an optimum result of interpolation according to the obtained feature amount; and processing the image data by the selected interpolating process.

14. An image data interpolation method according to claim 13, wherein in the feature amount obtaining step, the feature amount is obtained which is used to determine which an image represented by the image data is, a natural image or a non-natural image, and an interpolating process suitable for a natural image is executed when it is determined on the basis of the obtained feature amount that the image is the natural image and an interpolating process suitable for a non-natural image is executed when it is determined on the basis of the obtained feature amount that the image is the non-natural image.

15. An image data interpolation method according to claim 14, wherein the interpolating process by a nearest neighbor interpolation method is executed for the non-natural image and the interpolating process by a cubic convolution interpolation method is executed for the natural image.

16. An image data interpolation method according to claim 13, wherein the feature amount is obtained for evaluating degrees of variations in picture elements on the basis of the image data, and an interpolating process from which an optimum result of interpolation according to the degrees of variations in the picture elements is obtained is selected.

17. An image data interpolation method according to claim 16, wherein as an interpolating process suitable to be applied to a region where the degree of variation is small, an interpolating process is executed in which image data of a nearest neighbor picture element is used for image data of a new constituent picture element.

18. An image data interpolation method according to claim 16, wherein as an interpolating process suitable to be applied to a region where the degree of variation is large, an interpolating process is executed in which image data of a post-interpolation picture element is obtained by an operation from image data of circumferential picture elements so that the image data of the post-interpolation picture element is smoothly varied.

19. An image data interpolation method according to claim 13, wherein a feature amount is obtained for every region of the image, and one of the interpolating processes is selected on the basis of the feature amount obtained for every region of the image.

20. The image data interpolation method as set forth in claim 13, wherein said totaling process includes thinning out the picture elements to the elements which are determined to be sharp.

21. An image data interpolation method comprising the steps of:

obtaining image data representing an image as dot-matrix picture elements;

obtaining a related feature amount when an interpolating process is executed for the image data;

selecting an interpolating process capable of achieving an optimum result of interpolation according to the obtained feature amount; and processing the image data by the selected interpolating process;

wherein as one of the plurality of interpolating processes, an interpolating process is executed in which a plurality of interpolating processes are successively executed.

22. An image data interpolation method comprising the steps of:

obtaining image data representing an image as dot-matrix picture elements;

obtaining a related feature amount w hen an interpolating process is executed for the image data;

selecting an interpolating process capable of achieving an optimum result of interpolation according to the obtained feature amount; and processing the image data by the selected interpolating process;

wherein operation parameters in a cubic convolution interpolation method are adjusted so that a process of interpolating a plurality of picture elements is realized.

23. An image data interpolation method comprising the steps of:
obtaining image data representing an image as dot-matrix picture elements;
obtaining a related feature amount when an interpolating process is executed for the image data;
selecting an interpolating process capable of achieving an optimum result of interpolation according to the obtained feature amount;
processing the image data by the selected interpolating process; and
displaying executable image processes and inputting a selected one of the image processes, and wherein an interpolating process is executed so that a variation degree of image data to be interpolated is adjusted so that the selected sharpness of image is obtained in a case where the image is enlarged by increasing the number of constituent picture elements thereof when both the image enlarging process and the image sharpness changing process have simultaneously been selected.

24. A medium on which an image data interpolation program is recorded, the program causing a computer to execute an interpolating process so that the number of constituent picture elements is increased by a predetermined interpolating scale factor for image data representing an image as dot-matrix picture elements in the computer, the program executing:
an image obtaining step of obtaining the image data as dot-matrix picture elements;
a feature amount obtaining step of obtaining a related feature amount, when an interpolating process is executed for the image data, by carrying out a totaling process with a plurality of individual image data of a plurality of dot-matrix picture elements of the image; and
an interpolating process selecting step of selecting an interpolating process capable of achieving an optimum result of interpolation according to the obtained feature amount and causing the picture element interpolating step to execute the selected interpolating process.

25. A medium according to claim 24, wherein in the picture element interpolating step, the interpolating process suitable for each of the natural image data and non-natural image data is executable, in the feature amount obtaining step, a feature amount is obtained to determine which an image represented by the image data is, a natural image or a non-natural image, and in the interpolating process selecting step, the interpolating process suitable for the natural image is executed when it is determined on the basis of the obtained feature amount that the image is a natural image and the interpolating process suitable for the non-natural image is executed when it is determined on the basis of the obtained feature amount that the image is a non-natural image.

26. A medium according to claim 25, wherein in the picture element interpolating step, the interpolating process by a nearest neighbor interpolation method is executed for the non-natural image and the interpolating process by a cubic convolution interpolation method is executed for the natural image.

27. A medium according to claim 24, wherein in the picture element interpolating step, an optimum interpolating process is executable according to degrees of variations in different picture elements, in the feature amount obtaining step, a feature amount for evaluating degrees of variations in picture elements based on the image data is obtained, and in the interpolating process selecting step, an interpolating process from which an optimum result of interpolation according to the degrees of variations in the picture elements obtained at the feature amount obtaining step is obtained on the basis of the degrees of variations and the picture element interpolating step is caused to execute the selected interpolating process.

28. A medium according to claim 27, wherein in the picture element interpolating step, as an interpolating process suitable to be applied to a region where the degree of variation is small, an interpolating process is executable in which image data of a nearest neighbor picture element before interpolation is used for image data of a new constituent picture element.

29. A medium according to claim 27, wherein in the picture element interpolating step, as an interpolating process suitable to be applied to a region where the degree of variation is large, an interpolating process is executable in which image data of a post-interpolation picture element is obtained by an operation from image data of circumferential picture elements so that the image data of the post-interpolation picture element is smoothly varied.

30. A medium according to claim 24, wherein in the picture element interpolating step, the plurality of interpolating processes includes an interpolating process in which a plurality of interpolating processes are successively executed.

31. A medium according to claim 24, wherein in the feature amount obtaining step, a feature amount is obtained for every region of the image, and in the interpolating process selecting step, one of the interpolating process in the picture element interpolating process is selected on the basis of the feature amount obtained for every region of the image and executed.

32. A medium according to claim 24, wherein in the picture element interpolating step, operation parameters in a cubic convolution interpolation method are adjusted so that a process of interpolating a plurality of picture elements is realized.

33. A medium according to claim 24, the program further executing:
an image process selecting step for displaying executable image processes and inputting a selected one of the image processes; and
a simultaneous process determining step for determining whether the image process selecting unit has selected both an image enlarging process and an image sharpness changing process; and wherein:
in the picture element interpolating step, an interpolating process is executable so that a variation degree of image data to be interpolated is adjusted so that the selected sharpness of image is obtained in a case where the image is enlarged by increasing the number of constituent picture elements thereof when the simultaneous process determining unit has determined that both the image enlarging process and the image sharpness changing process have been selected.

34. The medium as set forth in claim 24, wherein said totaling process includes thinning out the picture elements to the elements which are determined to be sharp.

* * * * *